US011438931B2

United States Patent
Rastegardoost et al.

(10) Patent No.: US 11,438,931 B2
(45) Date of Patent: Sep. 6, 2022

(54) SELECTING A RANDOM ACCESS PROCEDURE TYPE IN A WIRELESS SYSTEM

(71) Applicant: Ofinno, LLC, Reston, VA (US)

(72) Inventors: Nazanin Rastegardoost, McLean, VA (US); Esmael Hejazi Dinan, McLean, VA (US); Hyoungsuk Jeon, Centreville, VA (US); Yunjung Yi, Vienna, VA (US); Kyungmin Park, Vienna, VA (US); Hua Zhou, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 16/827,056

(22) Filed: Mar. 23, 2020

(65) Prior Publication Data

US 2020/0314913 A1 Oct. 1, 2020

Related U.S. Application Data

(60) Provisional application No. 62/825,645, filed on Mar. 28, 2019.

(51) Int. Cl.
*H04W 74/08* (2009.01)
*H04W 74/04* (2009.01)
*H04L 5/00* (2006.01)
*H04W 36/00* (2009.01)

(52) U.S. Cl.
CPC ....... *H04W 74/0833* (2013.01); *H04L 5/0048* (2013.01); *H04W 36/0055* (2013.01); *H04W 74/04* (2013.01)

(58) Field of Classification Search
None
See application file for complete search history.

(56) References Cited

U.S. PATENT DOCUMENTS

| | | | |
|---|---|---|---|
| 10,568,007 B2 | 2/2020 | Park et al. | |
| 2019/0380071 A1* | 12/2019 | Liu | H04W 76/27 |
| 2020/0100297 A1* | 3/2020 | Agiwal | H04W 74/0833 |

(Continued)

OTHER PUBLICATIONS

3GPP TS 36.300 V15.4.0 (Dec. 2018); Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description;; Stage 2.

(Continued)

*Primary Examiner* — Steve R Young
(74) *Attorney, Agent, or Firm* — Trent W. Merrell; Kavon Nasabzadeh; Jacob L. Mangan

(57) ABSTRACT

A wireless device receives radio resource control message(s) from a base station indicating random access resources of an uplink bandwidth part of a cell, that comprise two-step random access resources and four-step random access resources. Determining that the two-step random access resources comprise contention-free two-step random access resources, the wireless device selects from among a two-step random access type and a four-step random access type, the two-step random access type. Based on the two-step random access type, a preamble is transmitted to the base station using the two-step random access resources.

20 Claims, 32 Drawing Sheets

(56) References Cited

U.S. PATENT DOCUMENTS

| | | | | |
|---|---|---|---|---|
| 2020/0100299 | A1* | 3/2020 | Loehr | H04W 80/02 |
| 2020/0252967 | A1* | 8/2020 | Ozturk | H04W 68/005 |
| 2020/0305202 | A1* | 9/2020 | Zhang | H04W 74/0833 |
| 2021/0120581 | A1* | 4/2021 | Kim | H04L 1/0025 |
| 2021/0378021 | A1* | 12/2021 | You | H04W 74/002 |

OTHER PUBLICATIONS

3GPP TS 36.321 V15.4.0 (Dec. 2018); Technical Specification; 3rd Generation Partnership Project; Technical Specification Group Radio Access Network; Evolved Universal Terrestrial Radio Access (E-UTRA); Medium Access Control (MAC) protocol specification; (Release 15).

3GPP TS 36.331 V15.4.0 (Dec. 2018); Technical Specification; 3rd Generation Partnership Project; Technical Specification Group Radio Access Network; Evolved Universal Terrestrial Radio Access (E-UTRA); Radio Resource Control (RRC);; Protocol specification.

3GPP TS 38.300 V15.4.0 (Dec. 2018); Technical Specification; 3rd Generation Partnership Project; Technical Specification Group Radio Access Network; NR; NR and NG-RAN Overall Description; Stage 2; (Release 15).

3GPP TS 38.321 V15.4.0 (Dec. 2018); Technical Specification; 3rd Generation Partnership Project; Technical Specification Group Radio Access Network; NR; Medium Access Control (MAC) protocol specification; (Release 15).

3GPP TS 38.331 V15.4.0 (Dec. 2018); Technical Specification; 3rd Generation Partnership Project; Technical Specification Group Radio Access Network; NR; Radio Resource Control (RRC) protocol specification; (Release 15).

3GPP TSG RAN WG1 Meeting #94 ; Gothenburg, Sweden, Aug. 20-24, 2018; Title: RAN1 Chairman's Notes ; 1 Opening of the Meeting (Day 1: 9.00 AM) 3.

3GPP TSG RAN WG1 Meeting #94bis ; Chengdu, China, Oct. 8-12, 2018; Title: RAN1 Chairman's Notes ; 1 Opening of the Meeting (Day 1: 9.00 AM) 3.

3GPP TSG RAN WG1 Meeting #95 ; Spokane, USA, Nov. 12-16, 2018; Title: RAN1 Chairman's Notes ; 1 Opening of the Meeting (Day 1: 9.00 AM) 3.

3GPP TSG RAN WG1 Meeting Ad-Hoc Meeting 1901; Taipei, Taiwan, Jan. 21-25, 2019; Title: RAN1 Chairman's Notes ; 1 Opening of the Meeting (Day 1: 9.00 AM) 2.

3GPP TSG RAN WG1 Meeting #96; Athens, Greece, Feb. 25-Mar. 1, 2019; Title: RAN1 Chairman's Notes;1 Opening of the Meeting (Day 1: 9.00 AM) 3.

R1-1901627 consideration on 2-step RACH procedures; 3GPP TSG RAN WG1 Meeting #96 ; Athens, Greece, Feb. 25-Mar. 1, 2019;; Source:ZTE, Sanechips; Title: Considerations on 2-Step RACH Procedures; Agenda Item:7.2.1.2.

R1-1901669_Discussion on channel structure for 2-step RACH; 3GPP TSG RAN WG1 #96; Athens, Greece, Feb. 25-Mar. 1, 2019 ; ; Source:vivo; Title:Discussion on channel structure for 2-step RACH; Agenda Item:7.2.1.1.

R1-1901670_Discussion on procedure for 2-step RACH; 3GPP TSG RAN WG1 #96R1-1901670Athens, Greece, Feb. 25-Mar. 1, 2019 ; ; Source:vivo; Title:Discussion on 2-step RACH procedure; Agenda Item:7.2.1.2.

R1-1901779 Discussion on NR mobility enhancements in physical layer; 3GPP TSG RAN WG1 #96 ; Athens, Greece, Feb. 25-Mar. 1, 2019; Source:ZTE; Title: Discussion on NR Mobility Enhancements in Physical Layer Agenda Item:7.2.12.1; Document for: Discussion and Decision.

R1-1902133 2-step rach channel structure; 3GPP TSG RAN WG1 #96; Athens, Greece, Feb. 25-Mar. 1, 2019; ; Agenda item:7.2.1.1 Channel Structure for Two-Step RACH; Source: Sierra Wireless; Title: Channel Structure tor Two-Step RACH Considerations.

R1-1902135 On 2-Step RACH Channel Structure; 3GPP TSG RAN WG1 #96; Athens, Greece, Feb. 25-Mar. 1, 2019; ; Agenda item:7.2.1.1; Source: Nokia, Nokia Shanghai Bell; Title:On 2-step RACH Channel Structure.

R1-1902136 On 2-Step RACH Procedure; 3GPP TSG RAN WG1 #96; Athens, Greece, Feb. 25-Mar. 1, 2019; ; Agenda item:7.2.1.2; Source:Nokia, Nokia Shanghai Bell; Title:On 2-step RACH Procedure.

R1-1902242; 3GPP TSG RAN WG1 #96 ; Athens, Greece, Feb. 25-Mar. 1, 2019; Agenda item:7.2.1.2; Source:Samsung; Title:Procedure for Two-step RACH; Document for:Discussion and Decision.

R1-1902249 NR eMob; 3GPP TSG RAN WG1 #96; Athens, Greece, Feb. 25-Mar. 1, 2019; Agenda item:7.2.12; Source:Samsung; Title:Physical Layer Aspects for Mobility Enhancements ; Document for:Discussion and decision.

R1-1902463 Intel NR e-mobilty; 3GPP TSG RAN WG1 Meeting #96 Athens, Greece, Feb. 25-Mar. 1, 2019; ; Source: Intel Corporation ; Title:Physical layer aspects of enhanced mobility; Agenda item:7.2.12.1.

R1-1902528 Lower-layer mobility enhancements; 3GPP TSG-RAN WG1 Meeting #96Tdoc ; Athens, Greece, Feb. 25-Mar. 1, 2019; ; Agenda Item:7.2.12.1; Source:Ericsson; Title:Lower-layer mobility enhancements.

R1-1902748; 3GPP TSG RAN WG1 #96; Athens, Greece, Feb. 25-Mar. 1, 2019; ; Agenda ltem:7.2.1.2; Source: OPPO; Title:On Procedure for 2-step RACH.

R1-1902977 Channel Structure for Two-Step RACH; 3GPP TSG-RAN WG1 Meeting #96; Feb. 25-Mar. 1, 2019; Athens, Greece; Agenda item:7.2.1.1; Source: Qualcomm Incorporated.

R1-1903024 On Mobility Enhancements during HO; 3GPP TSG-RAN WG1 Meeting 1901 ; Athens, Greece, Feb 25-Mar. 1, 2019; ; Agenda item:7.2.12.1; Source: Qualcomm Incorporated; Title: On Mobility Enhancements during HO.

R1-1903436 Summary of 7.2.1.2 Procedures for Two-step RACH; 3GPP TSG RAN WG1 #96; Athens, Greece, Feb. 25-Mar. 1, 2019; ; Agenda Item:7.2.1.2; Source:ZTE; Title:Summary of 7.2.1.2 Procedure for Two-step RACH.

R2-1900106—Supporting RACH-less for fast SN addition; 3GPP TSG RAN WG2 Meeting #105; Athens, Greece, Feb. 25-Mar. 1, 2019; Agenda item:11.10.4; Source:Qualcomm Incorporated; Title:Supporting RACH-less for fast SN addition; WID/SID: LTE_NR_DC_CA_enh-Core—Release 16.

R2-1900363; 3GPP TSG-RAN WG2 Meeting #105R2-1900363; Athens, Greece, Feb 25-Mar. 1, 2019; ; Agenda item:11.9.2 ; Source:Qualcomm Incorporated.

R2-1900403—RACH-less handover in NR; 3GPP TSG-RAN WG2#105Tdoc R2-1900403 Athens, Greece, Feb. 25-Mar. 1, 2019; ; Agenda ltem:11.9.2; Source:Ericsson; Title: RACH-less handover in NR.

R2-1900501 2-step RACH in mobility enhancement; 3GPP TSG-RAN WG2 Meeting #105R2-1900501; Athens, Greece, Feb. 25-Mar. 1, 2019; ; Source:vivo; Title:2-step RACH in mobility enhancement.

R2-1900502 RACH-less with SSB association; 3GPP TSG-RAN WG2 Meeting #105; Athens, Greece, Feb. 25-Mar. 1, 2019 ; ; Source: vivo ; Title:RACH-less with SSB association; Agenda item:11.9.2.

R2-1900607 RACH-less HO in beam-based system; 3GPP TSG-RAN WG2 Meeting #105 Athens, Greece, Feb. 25-Mar. 1, 2019; ; ; Agenda item:11.9.3; Source:Nokia, Nokia Shanghai Bell.

R2-1900704 Discussion on RACH-less solution; 3GPP TSG-RAN WG2#105; R2-170xxxx Athens, Greece, Feb. 25-Mar. 1, 2019; ; Source: Huawei, HiSilicon ; Title: Discussion on RACH-less solution ; Agenda Item:11.9.2.

R2-1900991; 3GPP TSG-RAN WG2#105; Athens, Greece, Feb. 25-Mar. 1, 2019; Agenda ltem:11.9.2; Souce:Samsung; Title:On Supporting RACH-less in NR; Document for Discussion.

R2-1900996-RACH-less Change Request for 38331; 3GPP TSG-RAN WG2 Meeting #105; Athens, Greece, Feb. 25-Mar. 1, 2019; CR-Form-v11.1; Change Request.

R2-1900997-RACH-less Change Request for 38321; 3GPP TSG-RAN WG2 Meeting #105; Athens, Greece, Feb. 25-Mar. 1, 2019; CR-Form-v11.1; Change Request.

* cited by examiner

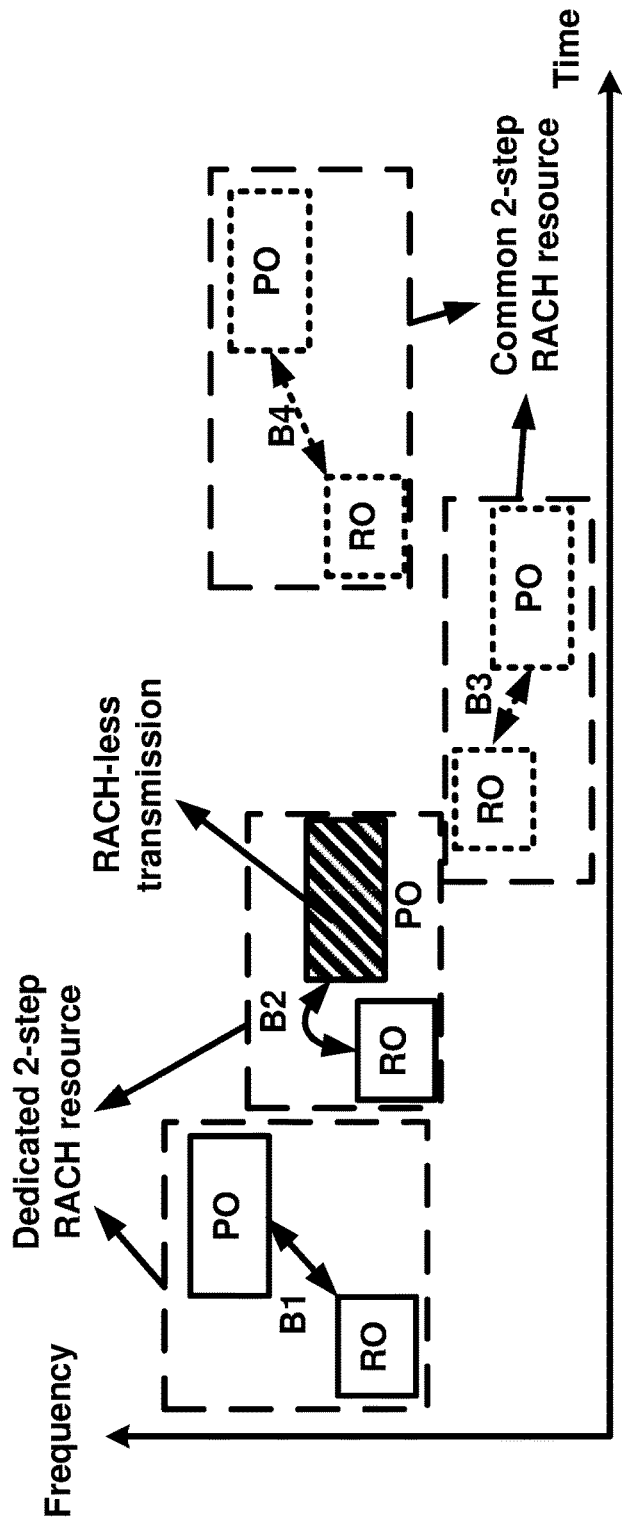

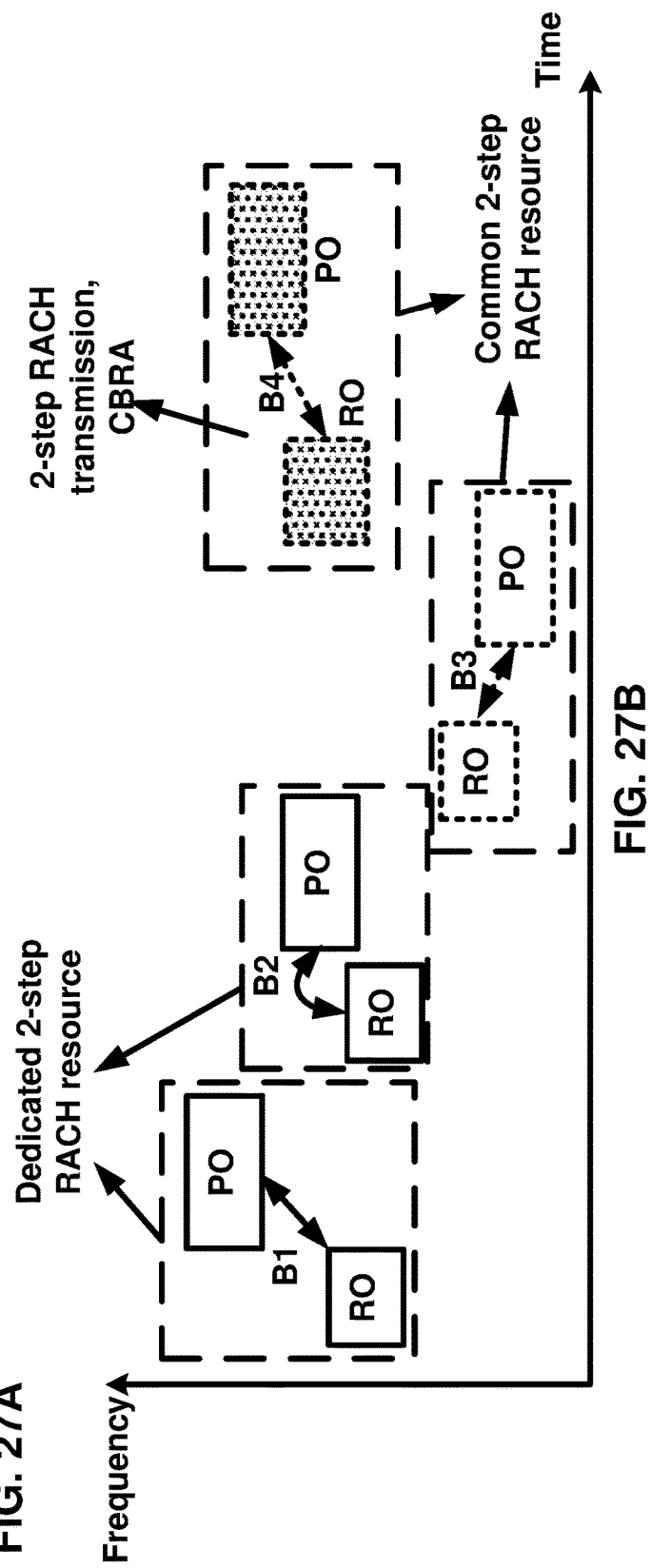
FIG. 27A
FIG. 27B
FIG. 27C

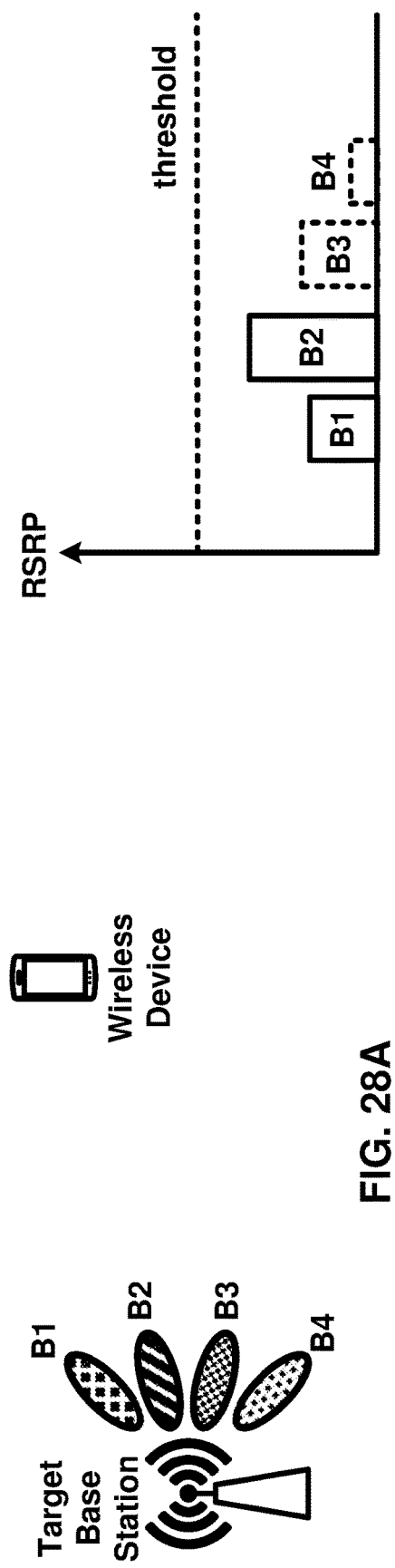
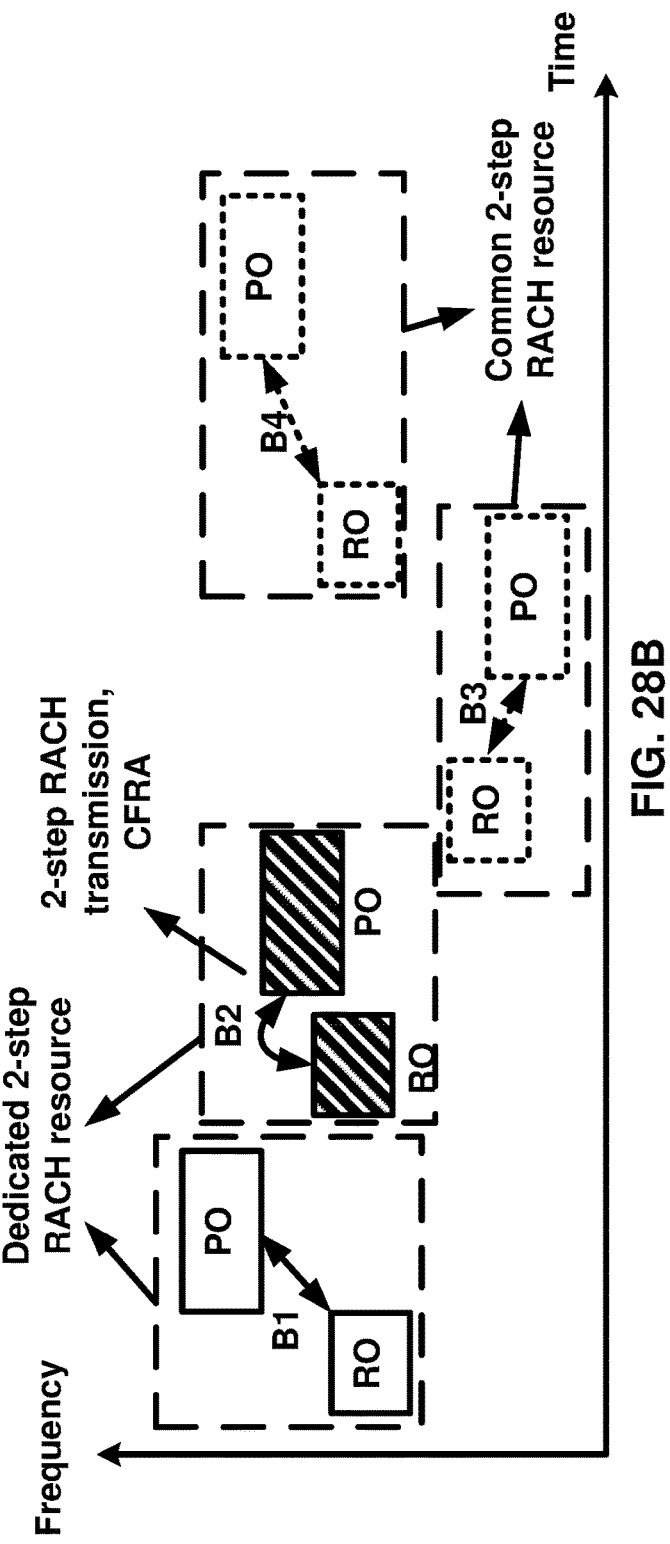
FIG. 28A
FIG. 28B
FIG. 28C

US 11,438,931 B2

SELECTING A RANDOM ACCESS PROCEDURE TYPE IN A WIRELESS SYSTEM

CROSS-REFERENCE TO RELATED APPLICATIONS

This application claims the benefit of U.S. Provisional Application No. 62/825,645, filed Mar. 28, 2019, which is hereby incorporated by reference in its entirety.

BRIEF DESCRIPTION OF THE SEVERAL VIEWS OF THE DRAWINGS

Examples of several of the various embodiments of the present disclosure are described herein with reference to the drawings.

FIG. 26A, FIG. 26B, and FIG. 26C are example diagrams of an access procedure selection resulting in a RACH-less handover as per an aspect of an embodiment of the present disclosure.

FIG. 27A, FIG. 27B, and FIG. 27C are example diagrams of an access procedure selection resulting in a 2-step RACH CBRA handover as per an aspect of an embodiment of the present disclosure.

FIG. 28A, FIG. 28B, and FIG. 28C are example diagrams of an access procedure selection resulting in a 2-step RACH CFRA handover as per an aspect of an embodiment of the present disclosure.

DETAILED DESCRIPTION OF EMBODIMENTS

Figure 1:
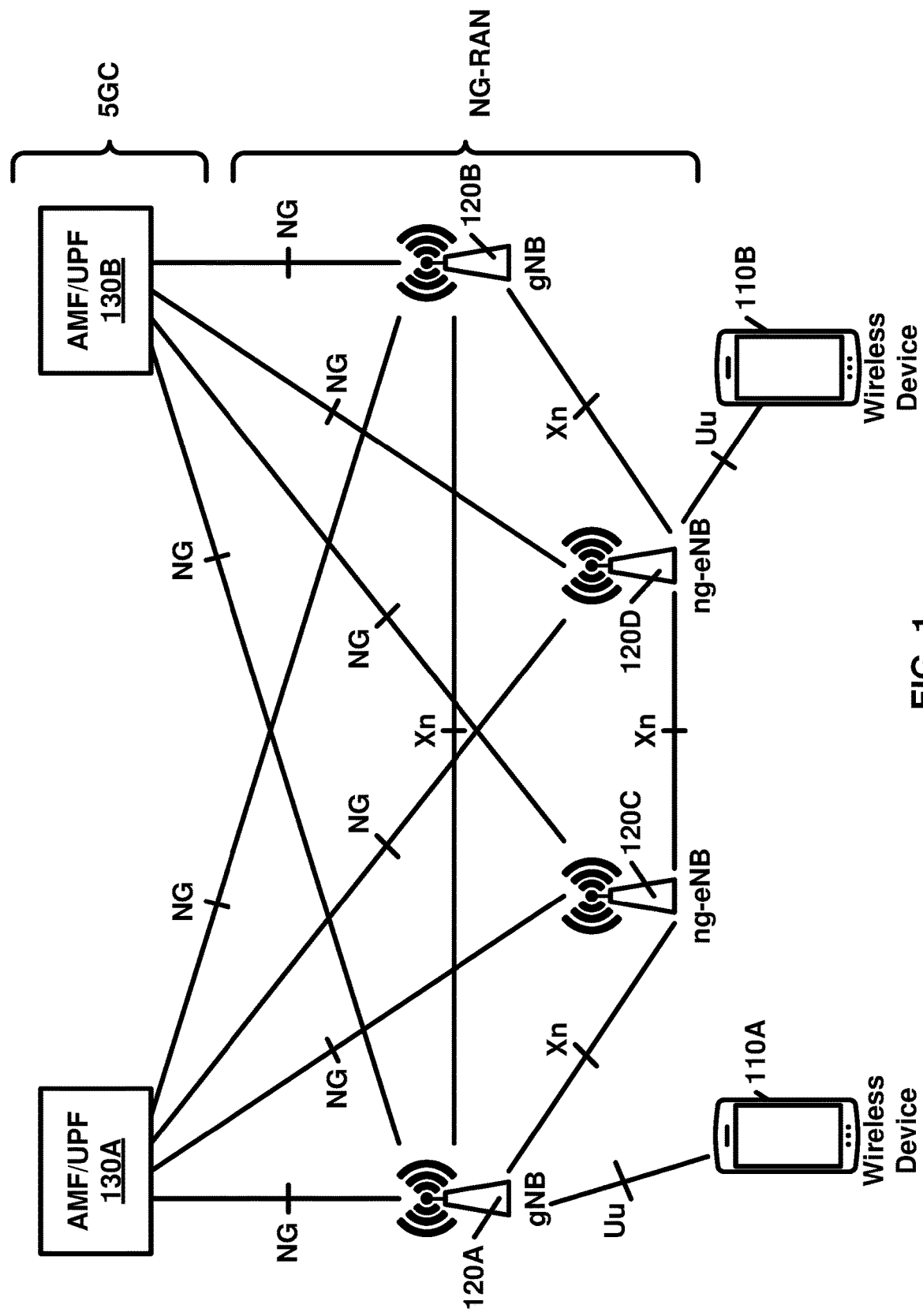
FIG. 1 is a diagram of an example RAN architecture as per an aspect of an embodiment of the present disclosure.

Example embodiments of the present disclosure enable operation of handover in wireless networks. Embodiments of the technology disclosed herein may be employed in the technical field of multicarrier communication systems. More particularly, the embodiments of the technology disclosed herein may relate to selection of access schemes for a handover in a multicarrier communication system.

The following Acronyms are used throughout the present disclosure:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CN Core Network
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control CHannel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic CHannel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel IDentifier
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank Indicator
RLC Radio Link Control
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SMF Session Management Function
SN Secondary Node
SpCell Special Cell
SRB Signaling Radio Bearer
SRS Sounding Reference Signal
SS Synchronization Signal
SSS Secondary Synchronization Signal sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TDD Time Division Duplex
TDMA Time Division Multiple Access
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Example embodiments of the disclosure may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g. 110A). In an example, a RAN node may be a next generation evolved Node B (ng-eNB) (e.g. 120C, 120D), providing Evolved UMTS Terrestrial Radio Access (E-UTRA) user plane and control plane protocol terminations towards a second wireless device (e.g. 110B). The first wireless device may communicate with a gNB over a Uu interface. The second wireless device may communicate with a ng-eNB over a Uu interface.

A gNB or an ng-eNB may host functions such as radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, dual connectivity or tight interworking between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g. 130A or 130B). A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide functions such as NG interface management, UE context management, UE mobility management, transport of NAS messages, paging, PDU session management, configuration transfer or warning message transmission.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
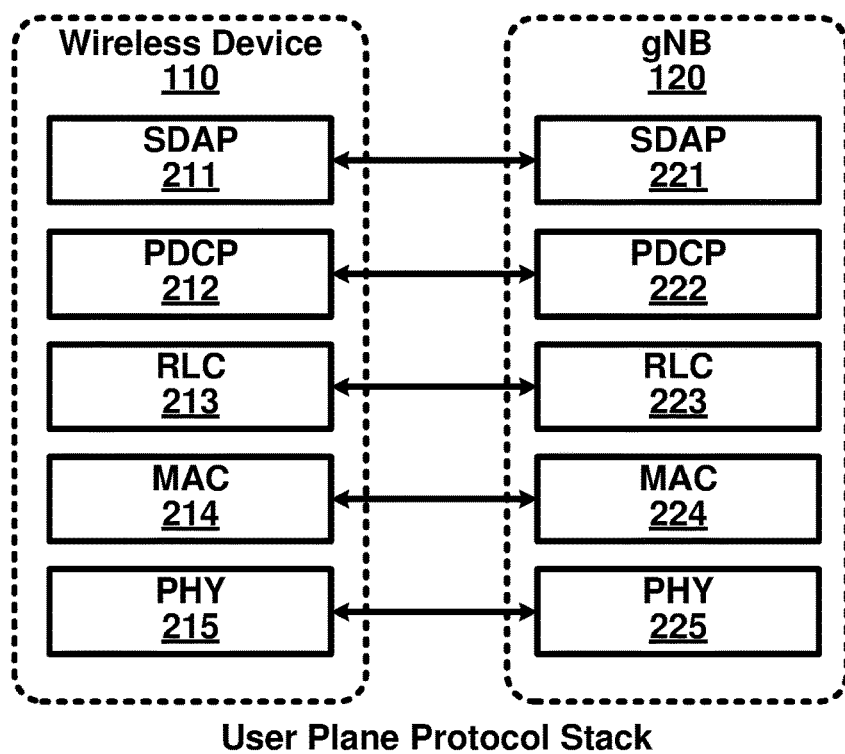
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and gNB (e.g. 120) on the network side. In an example, a PHY layer provides transport services to higher layers (e.g. MAC and/or RRC). In an example, services and functions of a MAC sublayer may comprise mapping between logical channels and transport channels, multiplexing/demultiplexing of MAC Service Data Units (SDUs) belonging to one or different logical channels into/from Transport Blocks (TBs) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
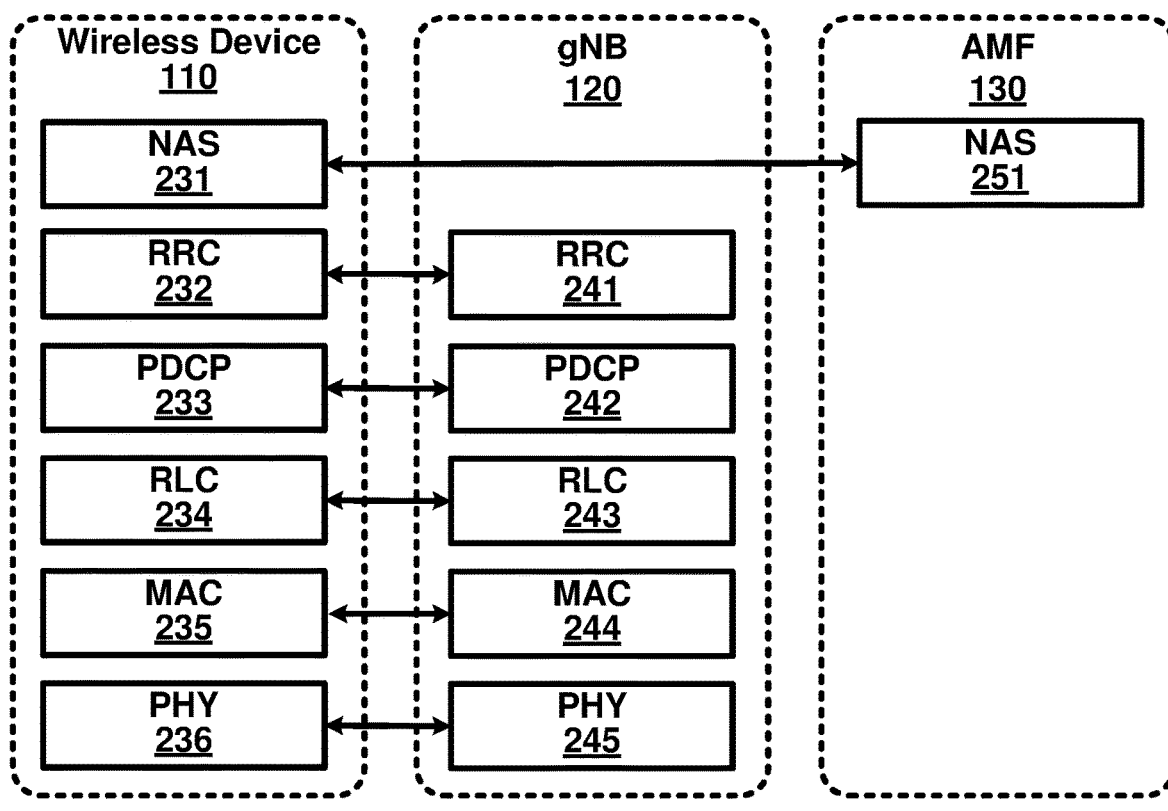
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245) layer may be terminated in wireless device (e.g. 110) and gNB (e.g. 120) on a network side and perform service and functions described above. In an example, RRC (e.g. 232 and 241) may be terminated in a wireless device and a gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRBs) and Data Radio Bearers (DRBs), mobility functions, QoS management functions, UE measurement reporting and control of the reporting, detection of and recovery from radio link failure, and/or NAS message transfer to/from NAS from/to a UE. In an example, NAS control protocol (e.g. 231 and 251) may be terminated in the wireless device and AMF (e.g. 130) on a network side and may perform functions such as authentication, mobility management between a UE and a AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/semi-statically configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
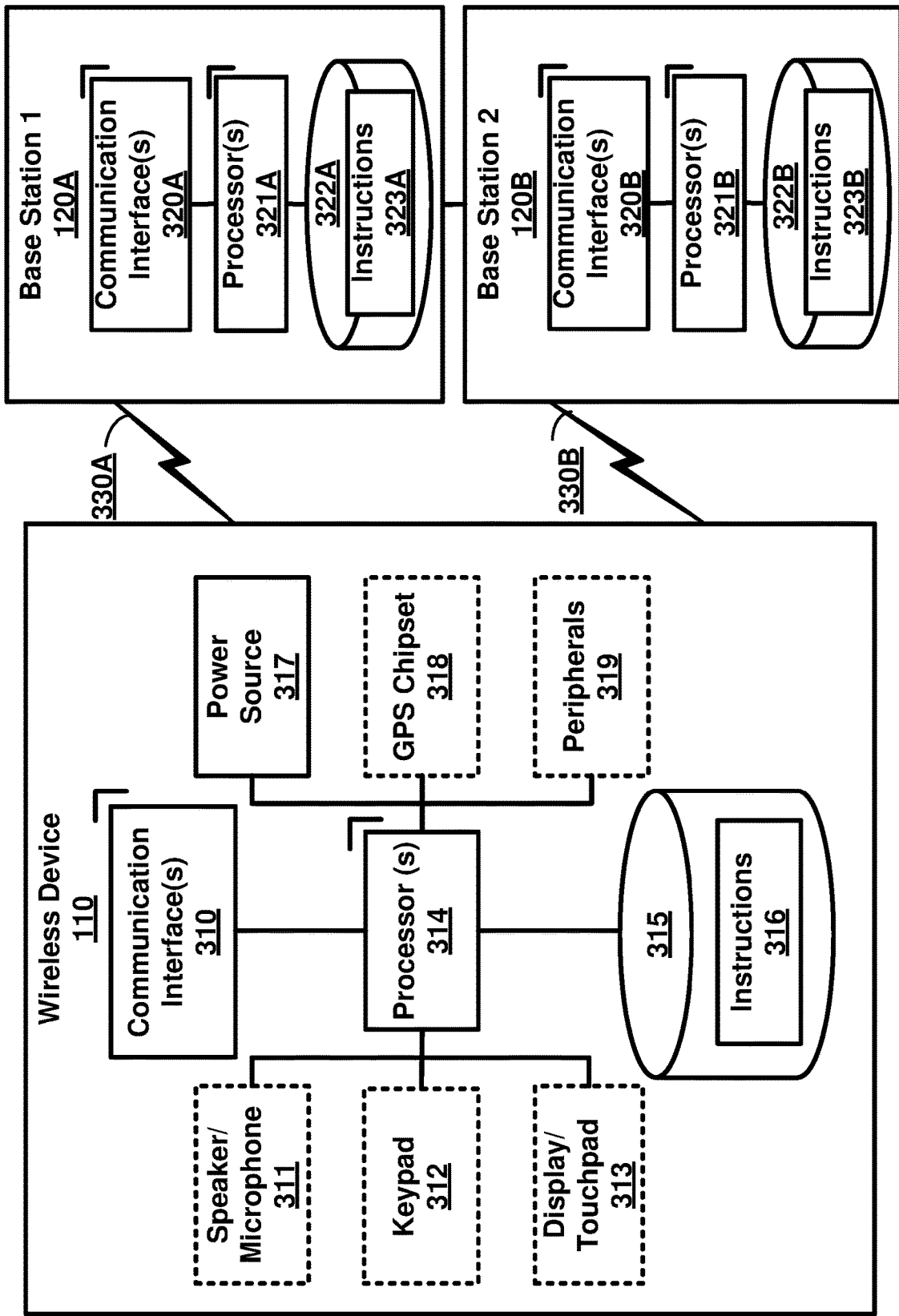
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called an UE. A base station may be called a NB, eNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). Another SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signaling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etc.) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

Figure 4A:
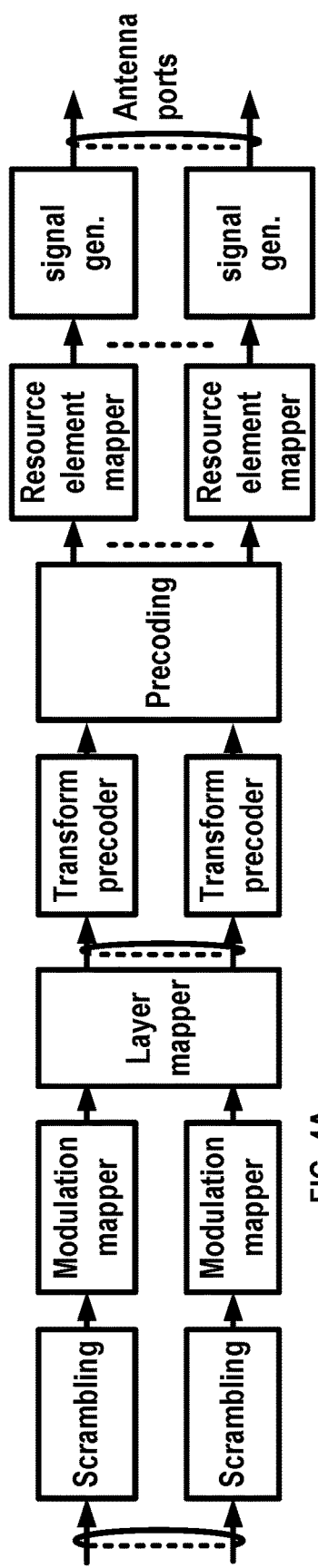
FIG. 4A, FIG. 4B, FIG. 4C and FIG. 4D are example diagrams for uplink and downlink signal transmission as per an aspect of an embodiment of the present disclosure.

FIG. 4A, FIG. 4B, FIG. 4C and FIG. 4D are example diagrams for uplink and downlink signal transmission as per an aspect of an embodiment of the present disclosure. FIG. 4A shows an example uplink transmitter for at least one physical channel. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

Figure 4B:
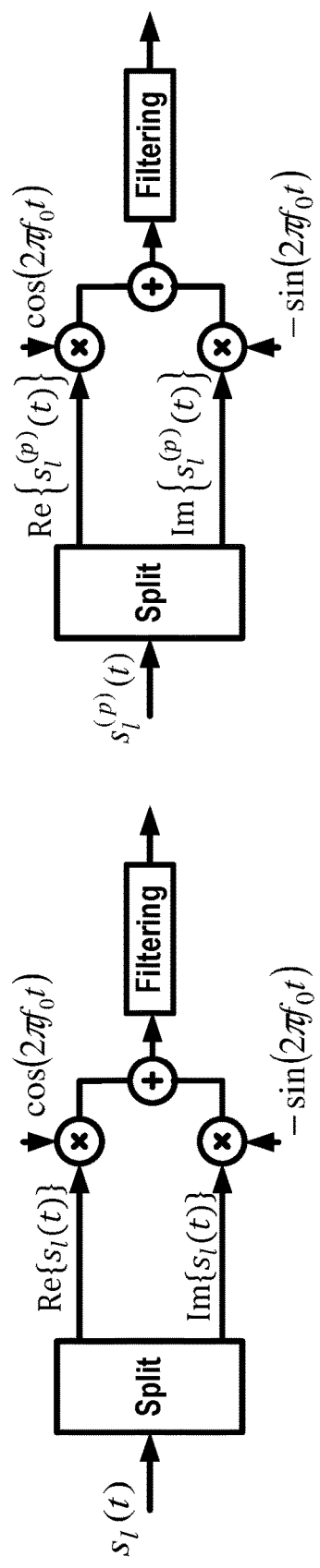

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

Figure 4D:
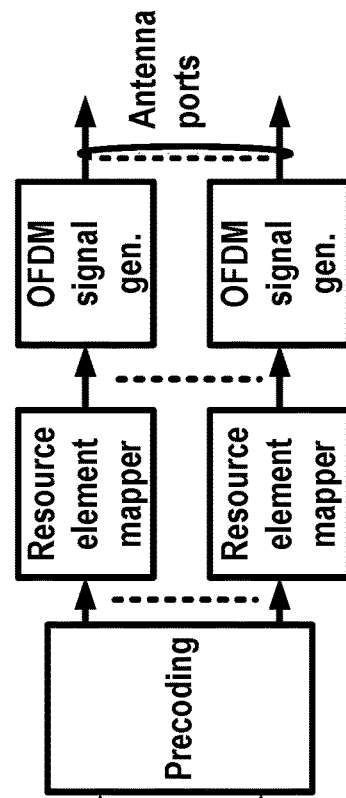
Figure 4C:
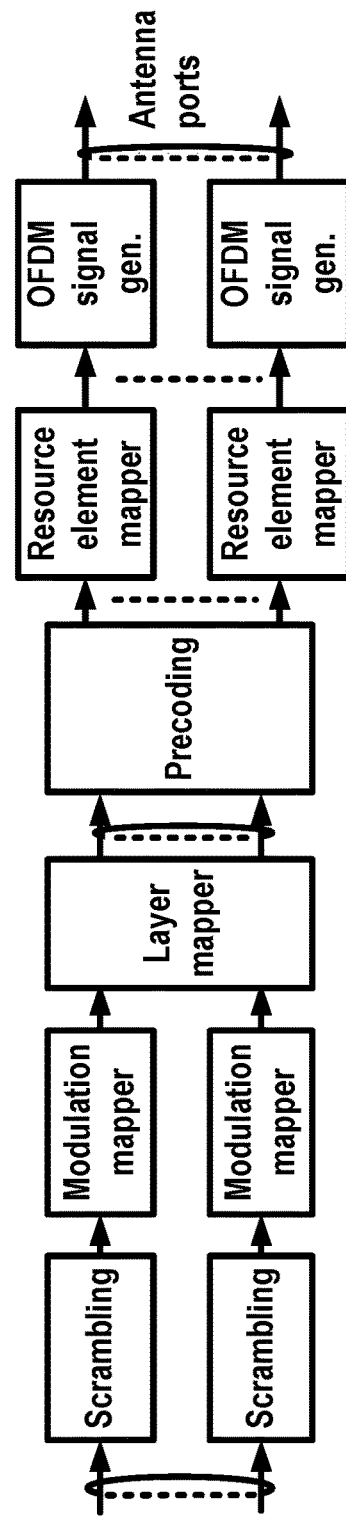

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a gNB may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
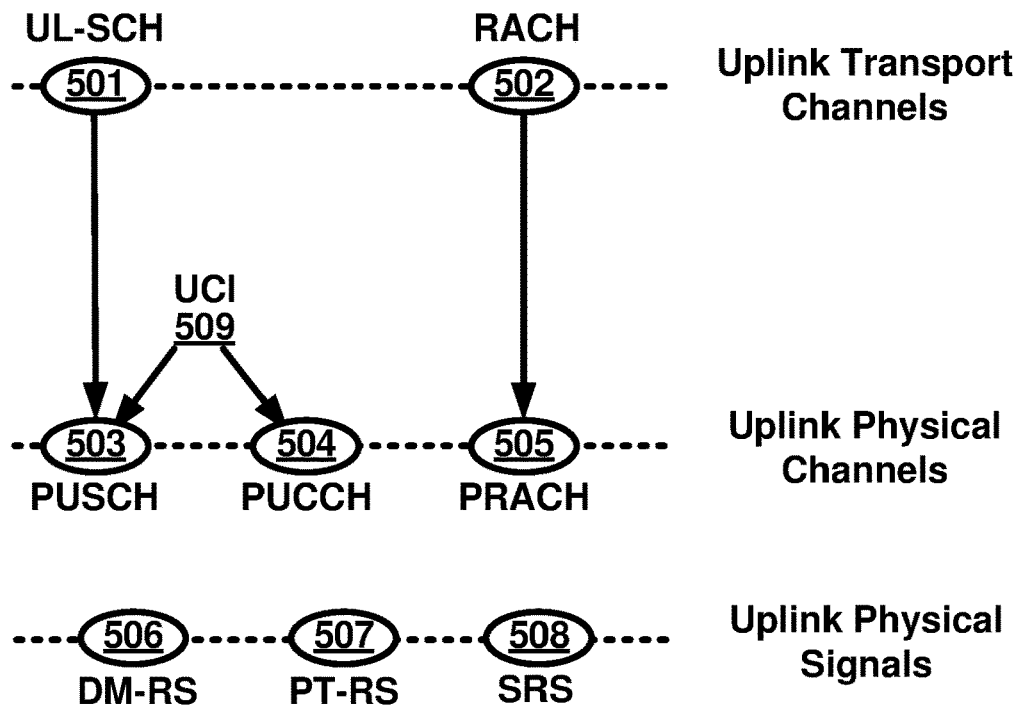
FIG. 5A is a diagram of an example uplink channel mapping and example uplink physical signals as per an aspect of an embodiment of the present disclosure.
Figure 5B:
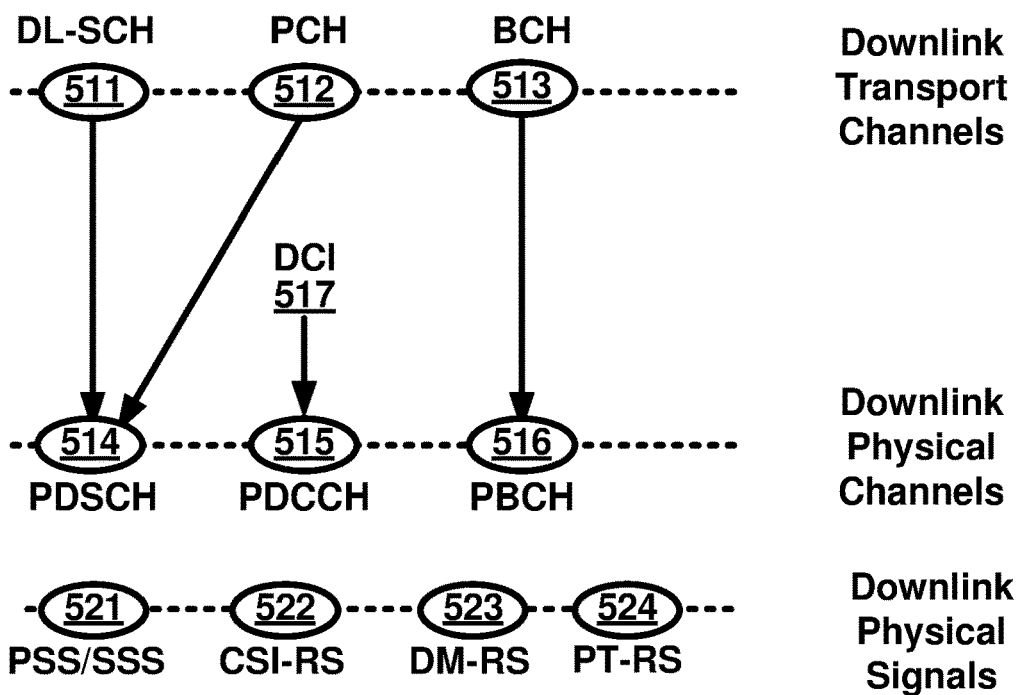
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/Negative Acknowledgement (NACK), and/or scheduling request. The DCI 517 on PDCCH 515 may indicate at least one of following: one or more downlink assignments and/or one or more uplink scheduling grants In uplink, a UE may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DM-RS 523, and/or PT-RS 524.

In an example, a UE may transmit one or more uplink DM-RSs 506 to a base station for channel estimation, for example, for coherent demodulation of one or more uplink physical channels (e.g., PUSCH 503 and/or PUCCH 504). For example, a UE may transmit a base station at least one uplink DM-RS 506 with PUSCH 503 and/or PUCCH 504, wherein the at least one uplink DM-RS 506 may be spanning a same frequency range as a corresponding physical channel. In an example, a base station may configure a UE with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statically configure a UE with a maximum number of front-loaded DM-RS symbols for PUSCH and/or PUCCH. For example, a UE may schedule a single-symbol DM-RS and/or double symbol DM-RS based on a maximum number of front-loaded DM-RS symbols, wherein a base station may configure the UE with one or more additional uplink DM-RS for PUSCH and/or PUCCH. A new radio network may support, e.g., at least for CP-OFDM, a common DM-RS structure for DL and UL, wherein a DM-RS location, DM-RS pattern, and/or scrambling sequence may be same or different.

In an example, whether uplink PT-RS 507 is present or not may depend on a RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statically configure a UE with one or more SRS resource sets. For an SRS resource set, a base station may configure a UE with one or more SRS resources. An SRS resource set applicability may be configured by a higher layer (e.g., RRC) parameter. For example, when a higher layer parameter indicates beam management, a SRS resource in each of one or more SRS resource sets may be transmitted at a time instant. A UE may transmit one or more SRS resources in different SRS resource sets simultaneously. A new radio network may support aperiodic, periodic and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in a same slot, a UE may be configured to transmit SRS 508 after a transmission of PUSCH 503 and corresponding uplink DM-RS 506.

In an example, a base station may semi-statically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with a same block index may be quasi co-located, e.g., with respect to Doppler spread, Doppler shift, average gain, average delay, and spatial Rx parameters. A UE may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statically configure and/or reconfigure a UE with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semi-statically configure a UE with one or more CSI-RS resource sets. One or more CSI-RS resources may be allocated from one or more CSI-RS resource sets to one or more UEs. For example, a base station may semi-statically configure one or more parameters indicating CSI RS resource mapping, for example, time-domain location of one or more CSI-RS resources, a bandwidth of a CSI-RS resource, and/or a periodicity. In an example, a UE may be configured to employ a same OFDM symbols for downlink CSI-RS 522 and control resource set (coreset) when the downlink CSI-RS 522 and coreset are spatially quasi co-located and resource elements associated with the downlink CSI-RS 522 are the outside of PRBs configured for coreset. In an example, a UE may be configured to employ a same OFDM symbols for downlink CSI-RS 522 and SSB/PBCH when the downlink CSI-RS 522 and SSB/PBCH are spatially quasi co-located and resource elements associated with the downlink CSI-RS 522 are the outside of PRBs configured for SSB/PBCH.

In an example, a UE may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statically configure a UE with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM-RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on a RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, downlink PT-RS 524 may be confined in the scheduled time/frequency duration for a UE.

Figure 6:
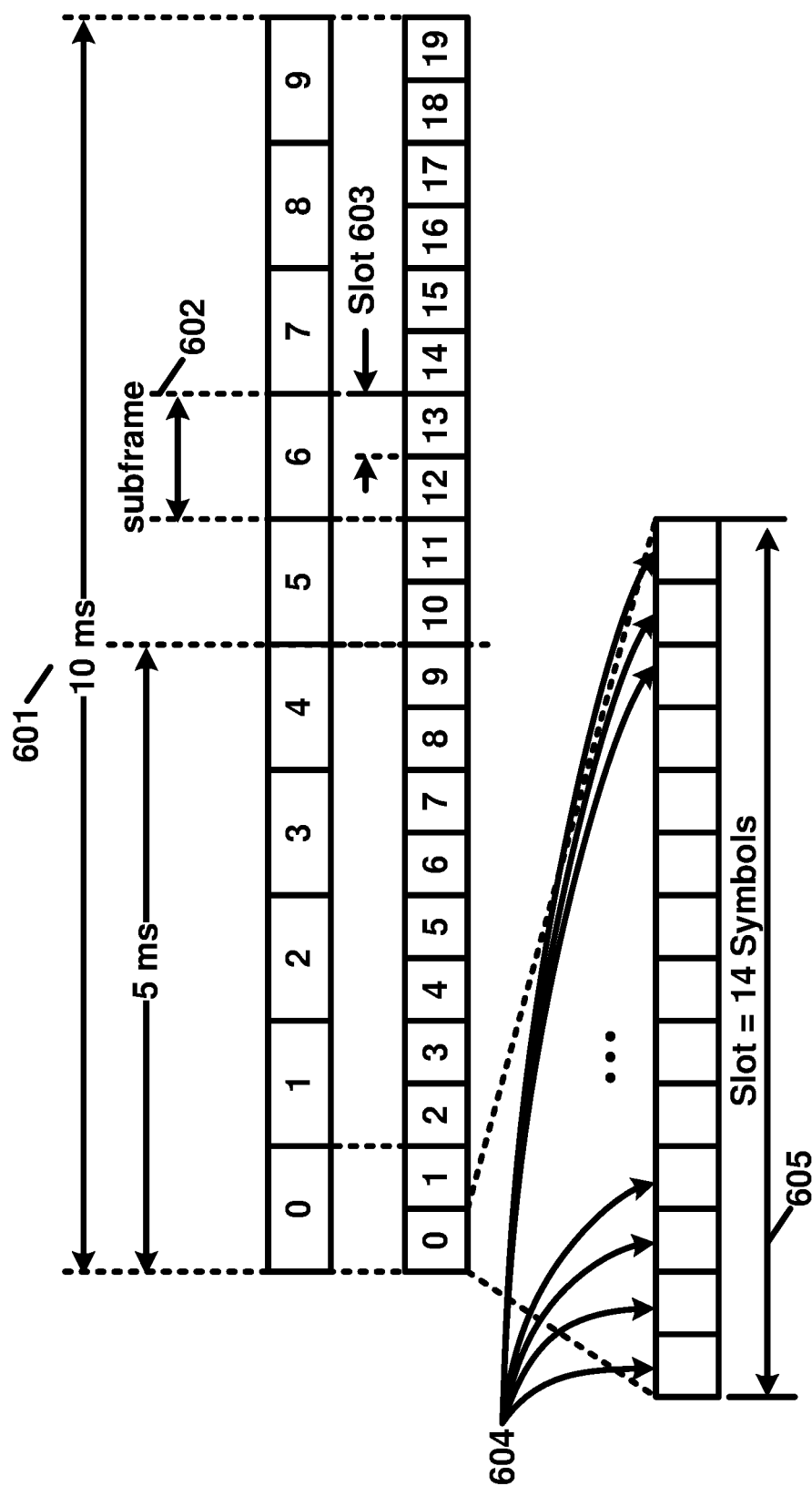
FIG. 6 is a diagram depicting an example frame structure as per an aspect of an embodiment of the present disclosure.

FIG. 6 is a diagram depicting an example frame structure for a carrier as per an aspect of an embodiment of the present disclosure. A multicarrier OFDM communication system may include one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame structure. Downlink and uplink transmissions may be organized into radio frames 601. In this example, radio frame duration is 10 ms. In this example, a 10 ms radio frame 601 may be divided into ten equally sized subframes 602 with 1 ms duration. Subframe(s) may comprise one or more slots (e.g. slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may include a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

Figure 7A:
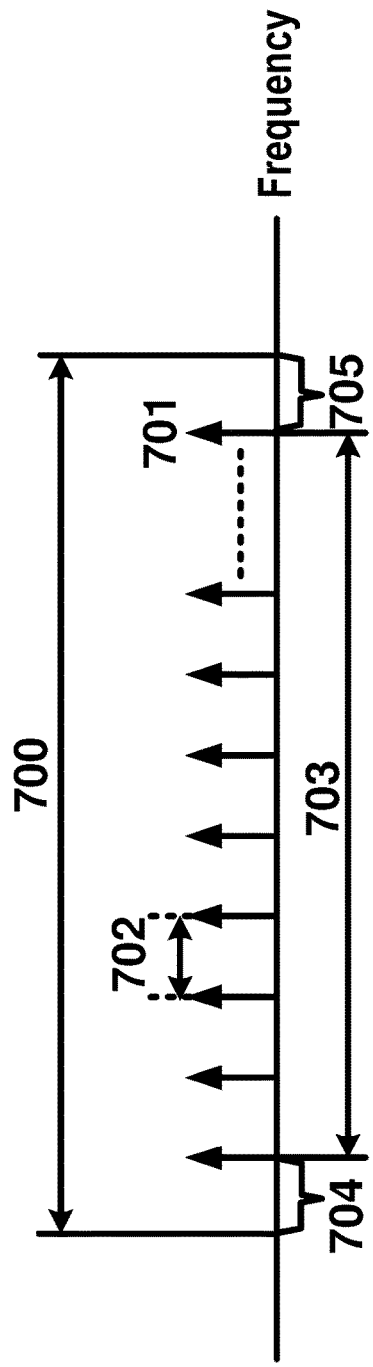
FIG. 7A and FIG. 7B are diagrams depicting example sets of OFDM subcarriers as per an aspect of an embodiment of the present disclosure.

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

Figure 7B:
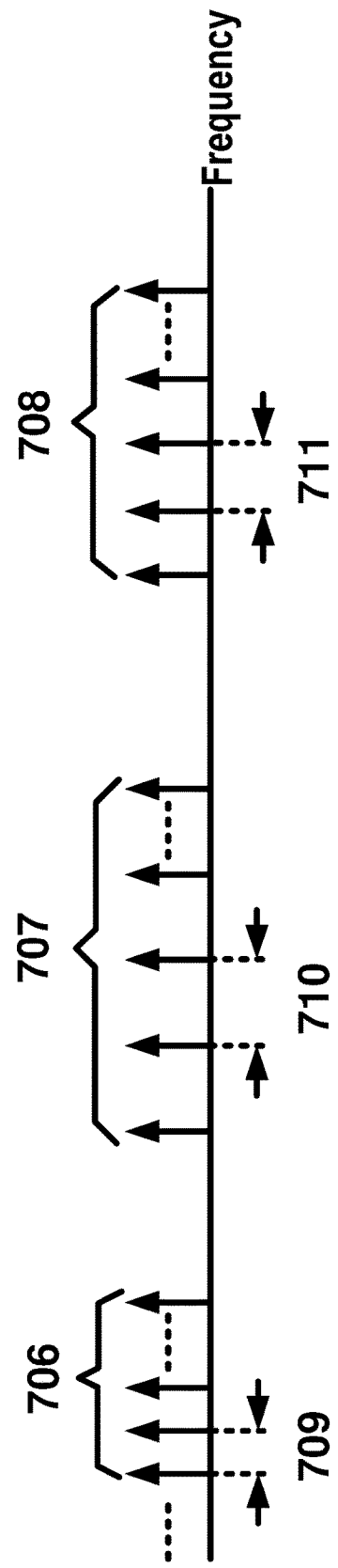

In an example, a gNB and a wireless device may communicate with multiple CCs when configured with CA. In an example, different component carriers may have different bandwidth and/or subcarrier spacing, if CA is supported. In an example, a gNB may transmit a first type of service to a UE on a first component carrier. The gNB may transmit a second type of service to the UE on a second component carrier. Different type of services may have different service requirement (e.g., data rate, latency, reliability), which may be suitable for transmission via different component carrier having different subcarrier spacing and/or bandwidth. FIG. 7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
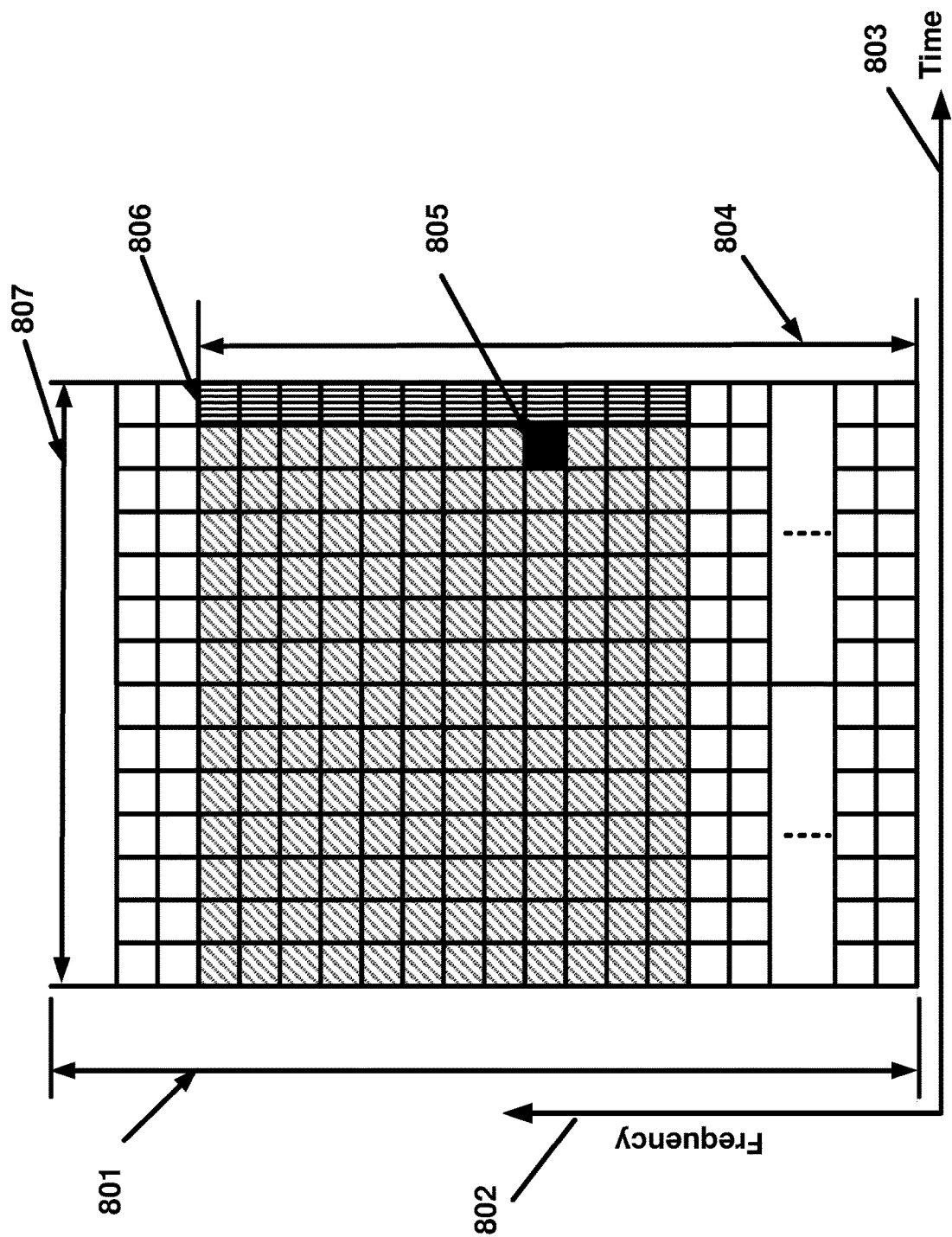
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of a RBG may depend on at least one of: a RRC message indicating a RBG size configuration; a size of a carrier bandwidth; or a size of a bandwidth part of a carrier. In an example, a carrier may comprise multiple bandwidth parts. A first bandwidth part of a carrier may have different frequency location and/or bandwidth from a second bandwidth part of the carrier.

In an example, a gNB may transmit a downlink control information comprising a downlink or uplink resource block assignment to a wireless device. A base station may transmit to or receive from, a wireless device, data packets (e.g. transport blocks) scheduled and transmitted via one or more resource blocks and one or more slots according to parameters in a downlink control information and/or RRC message(s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The gNB may transmit one or more RRC messages indicating a periodicity of the CS grant. The gNB may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The gNB may transmit one or more RRC messages indicating a periodicity of the CS grant. The gNB may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a semi-statically configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

A NR system may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources, associated with a CSI-RS resource index (CRI), or one or more DM-RSs of PBCH, may be used as RS for measuring quality of a beam pair link. Quality of a beam pair link may be defined as a reference signal received power (RSRP) value, or a reference signal received quality (RSRQ) value, and/or a CSI value measured on RS resources. The base station may indicate whether an RS resource, used for measuring a beam pair link quality, is quasi-co-located (QCLed) with DM-RSs of a control channel. A RS resource and DM-RSs of a control channel may be called QCLed when a channel characteristics from a transmission on an RS to a wireless device, and that from a transmission on a control channel to a wireless device, are similar or same under a configured criterion. In a multi-beam operation, a wireless device may perform an uplink beam sweeping to access a cell.

In an example, a wireless device may be configured to monitor PDCCH on one or more beam pair links simultaneously depending on a capability of a wireless device. This may increase robustness against beam pair link blocking. A base station may transmit one or more messages to configure a wireless device to monitor PDCCH on one or more beam pair links in different PDCCH OFDM symbols. For example, a base station may transmit higher layer signaling (e.g. RRC signaling) or MAC CE comprising parameters related to the Rx beam setting of a wireless device for monitoring PDCCH on one or more beam pair links. A base station may transmit indication of spatial QCL assumption between an DL RS antenna port(s) (for example, cell-specific CSI-RS, or wireless device-specific CSI-RS, or SS block, or PBCH with or without DM-RSs of PBCH), and DL RS antenna port(s) for demodulation of DL control channel. Signaling for beam indication for a PDCCH may be MAC CE signaling, or RRC signaling, or DCI signaling, or specification-transparent and/or implicit method, and combination of these signaling methods.

For reception of unicast DL data channel, a base station may indicate spatial QCL parameters between DL RS antenna port(s) and DM-RS antenna port(s) of DL data channel. The base station may transmit DCI (e.g. downlink grants) comprising information indicating the RS antenna port(s). The information may indicate RS antenna port(s) which may be QCL-ed with the DM-RS antenna port(s). Different set of DM-RS antenna port(s) for a DL data channel may be indicated as QCL with different set of the RS antenna port(s).

Figure 9A:
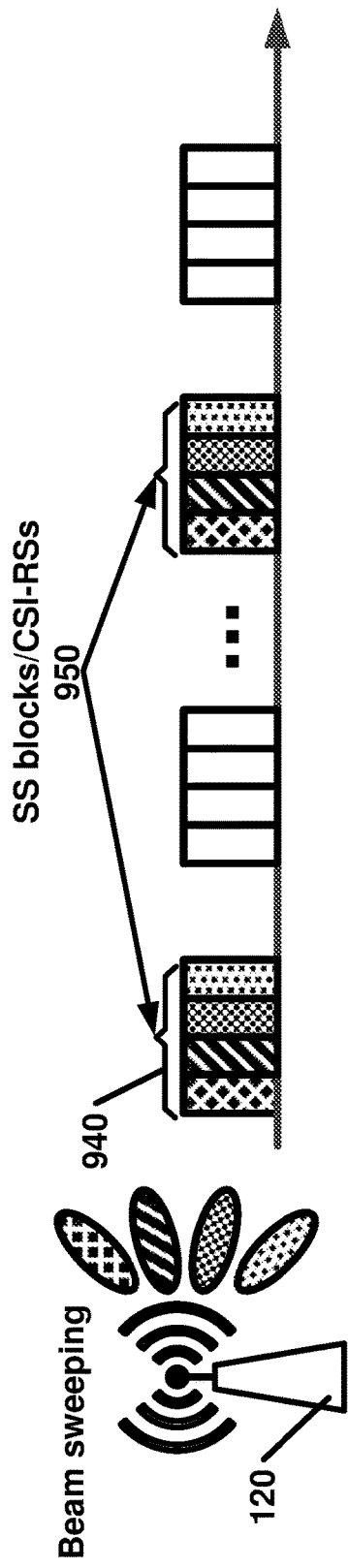
FIG. 9A is a diagram depicting an example CSI-RS and/or SS block transmission in a multi-beam system.

FIG. 9A is an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. For example, in a multi-beam operation, a base station 120 may transmit SS blocks in multiple beams, together forming a SS burst 940. One or more SS blocks may be transmitted on one beam. If multiple SS bursts 940 are transmitted with multiple beams, SS bursts together may form SS burst set 950.

A wireless device may further use CSI-RS in the multi-beam operation for estimating a beam quality of a links between a wireless device and a base station. A beam may be associated with a CSI-RS. For example, a wireless device may, based on a RSRP measurement on CSI-RS, report a beam index, as indicated in a CRI for downlink beam selection, and associated with a RSRP value of a beam. A CSI-RS may be transmitted on a CSI-RS resource including at least one of one or more antenna ports, one or more time or frequency radio resources. A CSI-RS resource may be configured in a cell-specific way by common RRC signaling, or in a wireless device-specific way by dedicated RRC signaling, and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be transmitted periodically, or using aperiodic transmission, or using a multi-shot or semi-persistent transmission. For example, in a periodic transmission in FIG. 9A, a base station 120 may transmit configured CSI-RS resources 940 periodically using a configured periodicity in a time domain. In an aperiodic transmission, a configured CSI-RS resource may be transmitted in a dedicated time slot. In a multi-shot or semi-persistent transmission, a configured CSI-RS resource may be transmitted within a configured period. Beams used for CSI-RS transmission may have different beam width than beams used for SS-blocks transmission.

Figure 9B:
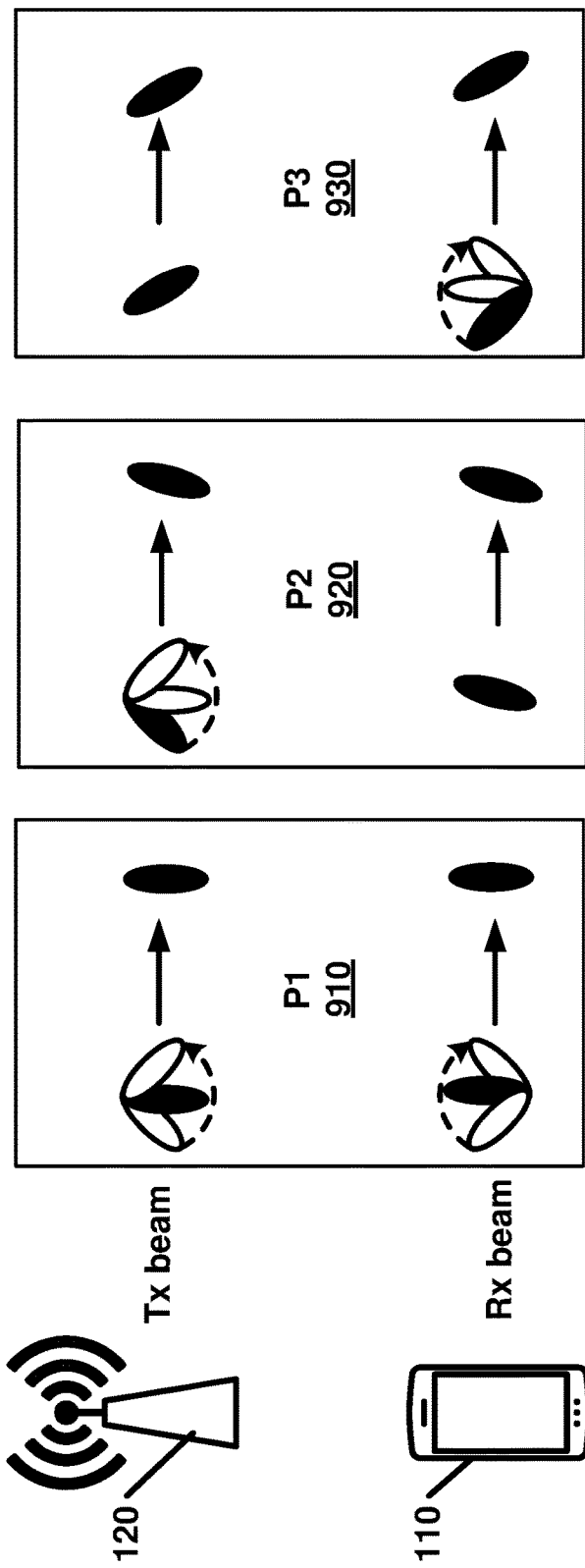
FIG. 9B is a diagram depicting an example downlink beam management procedure as per an aspect of an embodiment of the present disclosure.

FIG. 9B is an example of a beam management procedure in an example new radio network. A base station 120 and/or a wireless device 110 may perform a downlink L1/L2 beam management procedure. One or more of the following downlink L1/L2 beam management procedures may be performed within one or more wireless devices 110 and one or more base stations 120. In an example, a P-1 procedure 910 may be used to enable the wireless device 110 to measure one or more Transmission (Tx) beams associated with the base station 120 to support a selection of a first set of Tx beams associated with the base station 120 and a first set of Rx beam(s) associated with a wireless device 110. For beamforming at a base station 120, a base station 120 may sweep a set of different TX beams. For beamforming at a wireless device 110, a wireless device 110 may sweep a set of different Rx beams. In an example, a P-2 procedure 920 may be used to enable a wireless device 110 to measure one or more Tx beams associated with a base station 120 to possibly change a first set of Tx beams associated with a base station 120. A P-2 procedure 920 may be performed on a possibly smaller set of beams for beam refinement than in the P-1 procedure 910. A P-2 procedure 920 may be a special case of a P-1 procedure 910. In an example, a P-3 procedure 930 may be used to enable a wireless device 110 to measure at least one Tx beam associated with a base station 120 to change a first set of Rx beams associated with a wireless device 110.

A wireless device 110 may transmit one or more beam management reports to a base station 120. In one or more beam management reports, a wireless device 110 may indicate some beam pair quality parameters, comprising at least, one or more beam identifications; RSRP; Precoding Matrix Indicator (PMI)/Channel Quality Indicator (CQI)/Rank Indicator (RI) of a subset of configured beams. Based on one or more beam management reports, a base station 120 may transmit to a wireless device 110 a signal indicating that one or more beam pair links are one or more serving beams. A base station 120 may transmit PDCCH and PDSCH for a wireless device 110 using one or more serving beams.

In an example embodiment, new radio network may support a Bandwidth Adaptation (BA). In an example, receive and/or transmit bandwidths configured by an UE employing a BA may not be large. For example, a receive and/or transmit bandwidths may not be as large as a bandwidth of a cell. Receive and/or transmit bandwidths may be adjustable. For example, a UE may change receive and/or transmit bandwidths, e.g., to shrink during period of low activity to save power. For example, a UE may change a location of receive and/or transmit bandwidths in a frequency domain, e.g. to increase scheduling flexibility. For example, a UE may change a subcarrier spacing, e.g. to allow different services.

In an example embodiment, a subset of a total cell bandwidth of a cell may be referred to as a Bandwidth Part (BWP). A base station may configure a UE with one or more BWPs to achieve a BA. For example, a base station may indicate, to a UE, which of the one or more (configured) BWPs is an active BWP.

Figure 10:
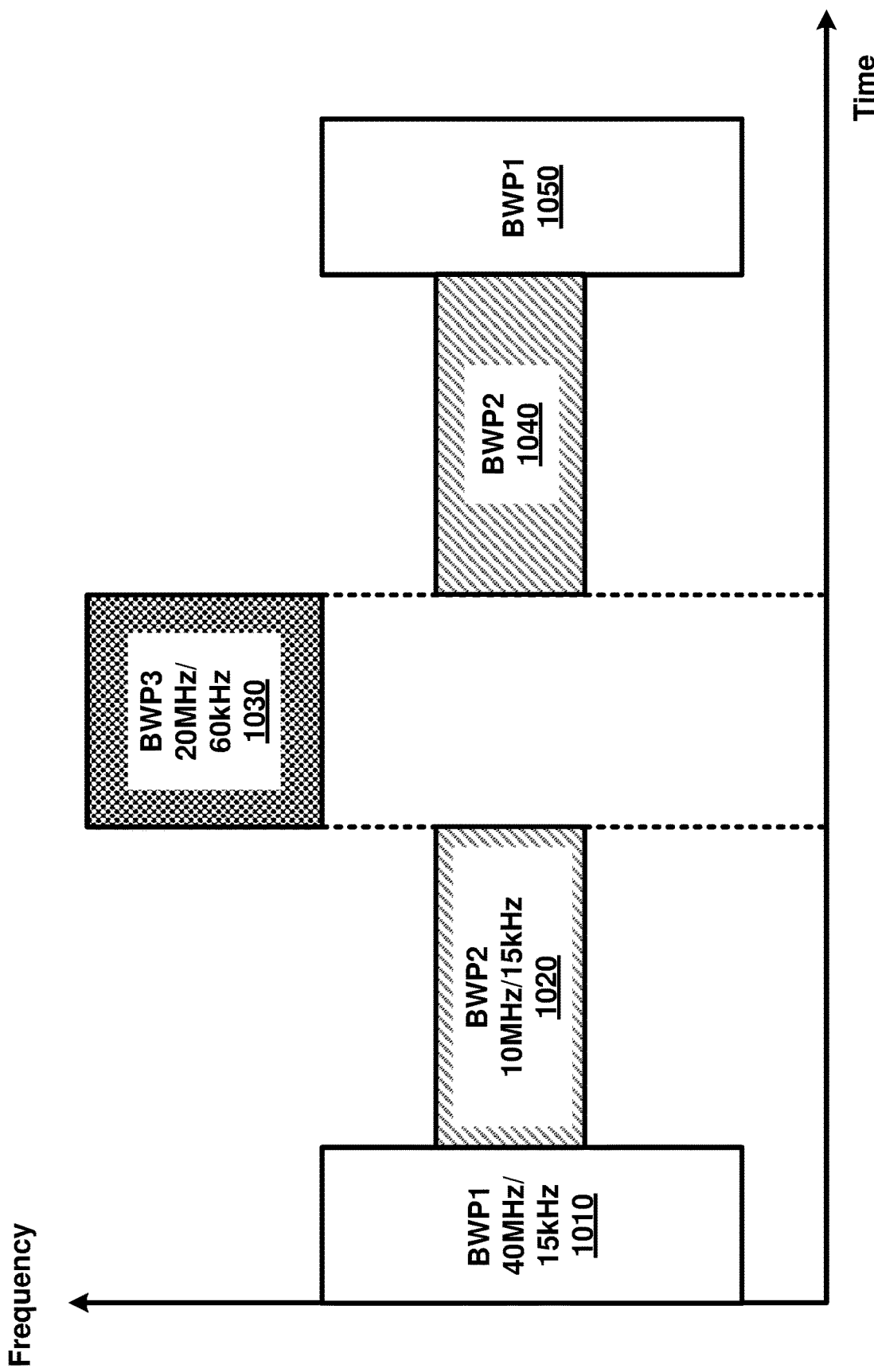
FIG. 10 is an example diagram of configured BWPs as per an aspect of an embodiment of the present disclosure.

FIG. 10 is an example diagram of 3 BWPs configured: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz.

In an example, a UE, configured for operation in one or more BWPs of a cell, may be configured by one or more higher layers (e.g. RRC layer) for a cell a set of one or more BWPs (e.g., at most four BWPs) for receptions by the UE (DL BWP set) in a DL bandwidth by at least one parameter DL-BWP and a set of one or more BWPs (e.g., at most four BWPs) for transmissions by a UE (UL BWP set) in an UL bandwidth by at least one parameter UL-BWP for a cell.

To enable BA on the PCell, a base station may configure a UE with one or more UL and DL BWP pairs. To enable BA on SCells (e.g., in case of CA), a base station may configure a UE at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a UE is configured with a secondary carrier on a primary cell, the UE may be configured with an initial BWP for random access procedure on a secondary carrier.

In an example, for unpaired spectrum operation, a UE may expect that a center frequency for a DL BWP may be same as a center frequency for a UL BWP.

For example, for a DL BWP or an UL BWP in a set of one or more DL BWPs or one or more UL BWPs, respectively, a base statin may semi-statically configure a UE for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a UE with one or more control resource sets for at least one type of common search space and/or one UE-specific search space. For example, a base station may not configure a UE without a common search space on a PCell, or on a PSCell, in an active DL BWP.

For an UL BWP in a set of one or more UL BWPs, a base station may configure a UE with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statically configure a UE with a default DL BWP among configured DL BWPs. If a UE is not provided a default DL BWP, a default BWP may be an initial active DL BWP.

In an example, a base station may configure a UE with a timer value for a PCell. For example, a UE may start a timer, referred to as BWP inactivity timer, when a UE detects a DCI indicating an active DL BWP, other than a default DL BWP, for a paired spectrum operation or when a UE detects a DCI indicating an active DL BWP or UL BWP, other than a default DL BWP or UL BWP, for an unpaired spectrum operation. The UE may increment the timer by an interval of a first value (e.g., the first value may be 1 millisecond or 0.5 milliseconds) if the UE does not detect a DCI during the interval for a paired spectrum operation or for an unpaired spectrum operation. In an example, the timer may expire when the timer is equal to the timer value. A UE may switch to the default DL BWP from an active DL BWP when the timer expires.

In an example, a base station may semi-statically configure a UE with one or more BWPs. A UE may switch an active BWP from a first BWP to a second BWP in response to receiving a DCI indicating the second BWP as an active BWP and/or in response to an expiry of BWP inactivity timer (for example, the second BWP may be a default BWP). For example, FIG. 10 is an example diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a UE may switch an active BWP from BWP1 1010 to BWP2 1020 in response to an expiry of BWP inactivity timer. For example, a UE may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a UE is configured for a secondary cell with a default DL BWP among configured DL BWPs and a timer value, UE procedures on a secondary cell may be same as on a primary cell using the timer value for the secondary cell and the default DL BWP for the secondary cell.

In an example, if a base station configures a UE with a first active DL BWP and a first active UL BWP on a secondary cell or carrier, a UE may employ an indicated DL BWP and an indicated UL BWP on a secondary cell as a respective first active DL BWP and first active UL BWP on a secondary cell or carrier.

Figure 11A:
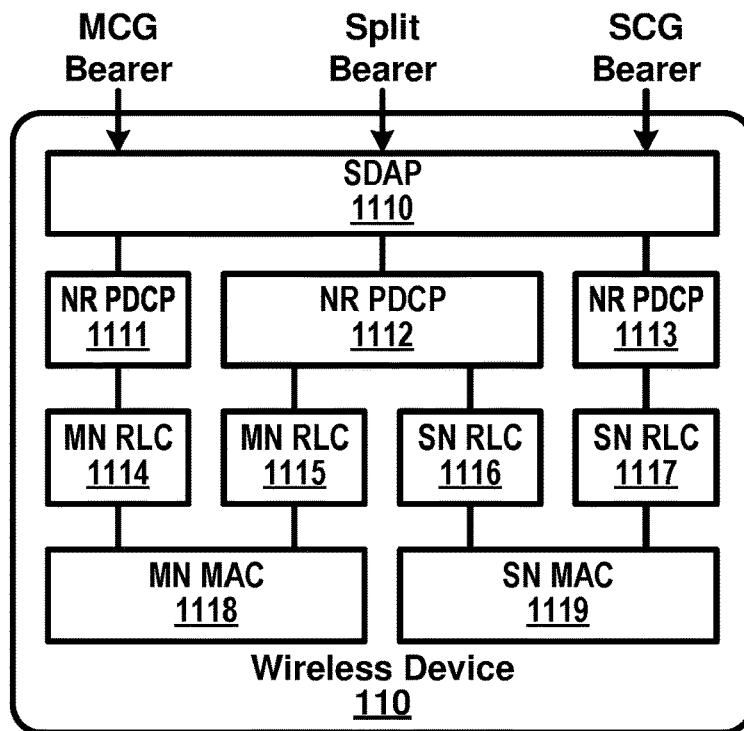
FIG. 11A, and FIG. 11B are diagrams of an example multi connectivity as per an aspect of an embodiment of the present disclosure.
Figure 11B:
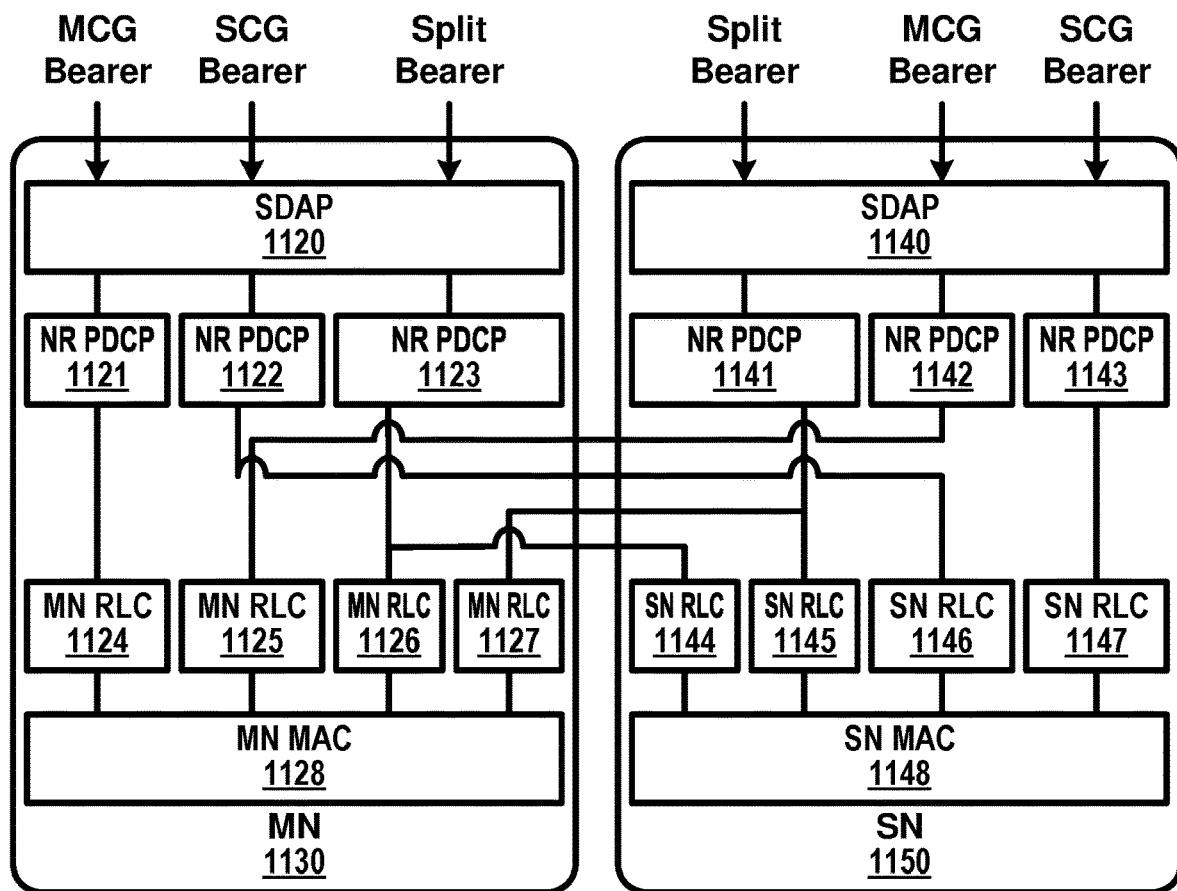

FIG. 11A and FIG. 11B show packet flows employing a multi connectivity (e.g. dual connectivity, multi connectivity, tight interworking, and/or the like). FIG. 11A is an example diagram of a protocol structure of a wireless device 110 (e.g. UE) with CA and/or multi connectivity as per an aspect of an embodiment. FIG. 11B is an example diagram of a protocol structure of multiple base stations with CA and/or multi connectivity as per an aspect of an embodiment. The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations. Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g. the SN 1150) may provide a secondary cell group (SCG) comprising a primary secondary cell (PSCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g. NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (PSCell, PCell of SCG, or sometimes called PCell), is configured with PUCCH resources; when an SCG is configured, there may be at least one SCG bearer or one Split bearer; upon detection of a physical layer problem or a random access problem on a PSCell, or a number of NR RLC retransmissions has been reached associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or PSCell may not be de-activated; PSCell may be changed with a SCG change procedure (e.g. with security key change and a RACH procedure); and/or a bearer type change between a split bearer and a SCG bearer or simultaneous configuration of a SCG and a split bearer may or may not supported.

With respect to interaction between a master base station and a secondary base stations for multi-connectivity, one or more of the following may be applied: a master base station and/or a secondary base station may maintain RRM measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a PSCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for a SFN acquired from a MIB of a PSCell of a SCG.

Figure 12:
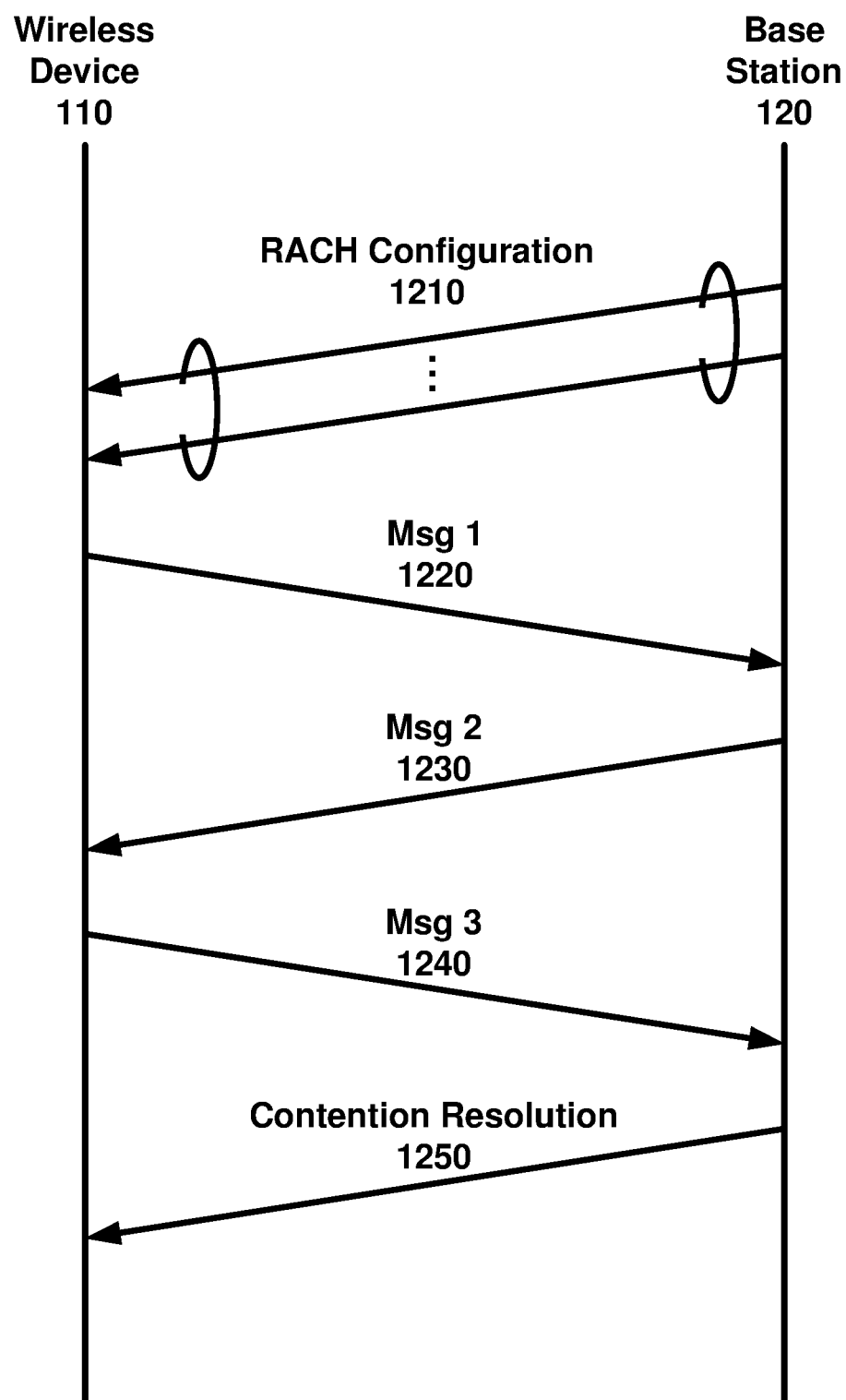
FIG. 12 is a diagram of an example random access procedure as per an aspect of an embodiment of the present disclosure.

FIG. 12 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronized, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg 1 1220 transmissions, one or more Msg2 1230 transmissions, one or more Msg3 1240 transmissions, and contention resolution 1250. For example, a contention free random access procedure may comprise one or more Msg 1 1220 transmissions and one or more Msg2 1230 transmissions.

In an example, a base station may transmit (e.g., unicast, multicast, or broadcast), to a UE, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response(s) on beam failure recovery request, and/or a contention resolution timer.

In an example, the Msg1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 1240 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1 1220.

In an example, a UE may receive, from a base station, a random access response, Msg 2 1230. A UE may start a time window (e.g., ra-ResponseWindow) to monitor a random access response. For beam failure recovery request, a base station may configure a UE with a different time window (e.g., bfr-ResponseWindow) to monitor response on beam failure recovery request. For example, a UE may start a time window (e.g., ra-ResponseWindow or bfr-ResponseWindow) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running.

In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises a random access preamble identifier, a UE may consider the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg 3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g. RRC) parameter. A UE may transmit a random access preamble via PRACH and Msg3 1240 via PUSCH on a same cell. A base station may indicate an UL BWP for a PUSCH transmission of Msg3 1240 via system information block. A UE may employ HARQ for a retransmission of Msg 3 1240.

In an example, multiple UEs may perform Msg 1 1220 by transmitting a same preamble to a base station and receive, from the base station, a same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may consider contention resolution 1250 successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3 1250, a UE may consider the contention resolution 1250 successful and may consider the random access procedure successfully completed.

Figure 13:
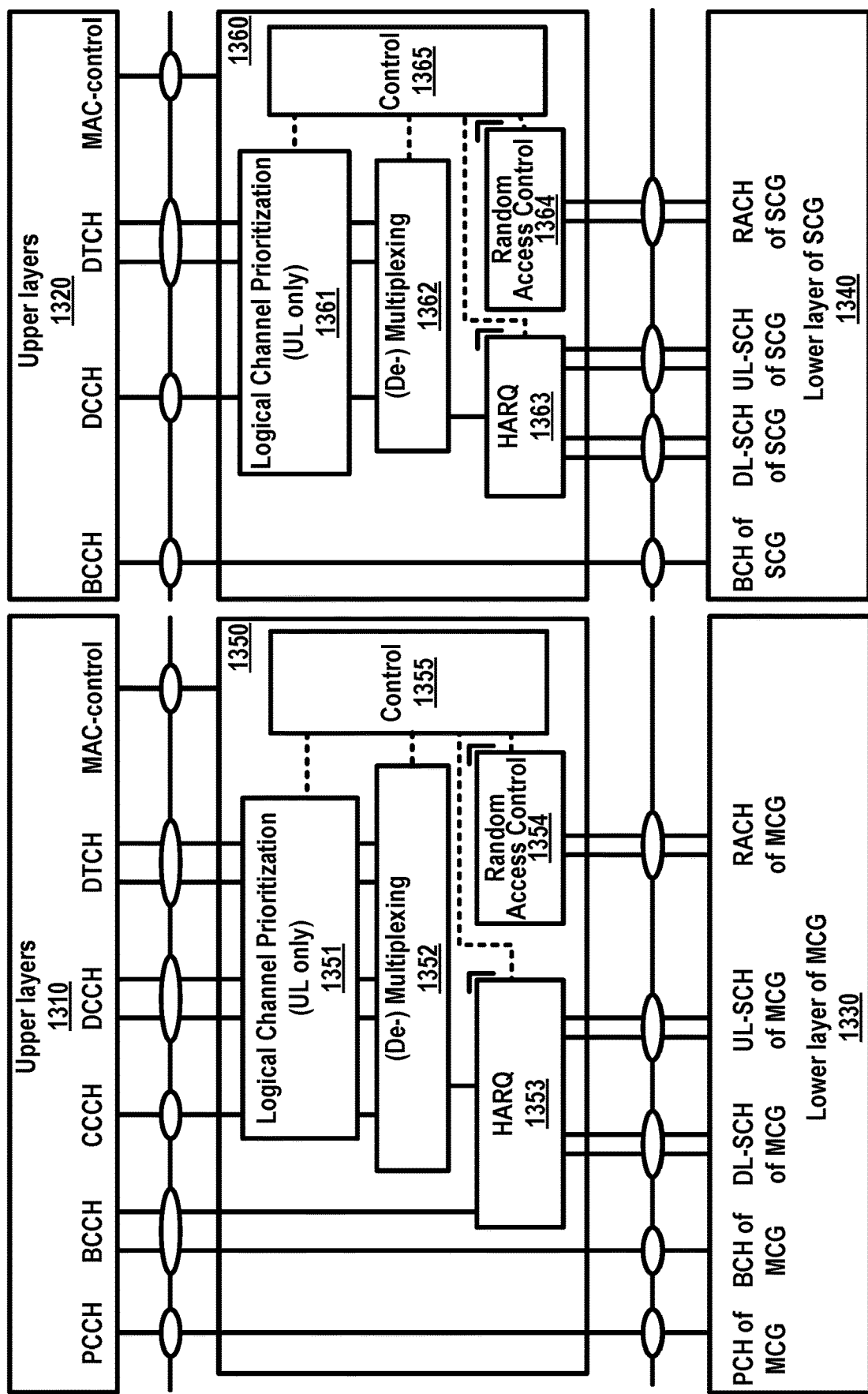
FIG. 13 is a structure of example MAC entities as per an aspect of an embodiment of the present disclosure.

FIG. 13 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called PSCell or PCell of SCG, or sometimes may be simply called PCell. A PSCell may be configured with PUCCH resources. In an example, when a SCG is configured, there may be at least one SCG bearer or one split bearer. In an example, upon detection of a physical layer problem or a random access problem on a PSCell, or upon reaching a number of RLC retransmissions associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

Figure 14:
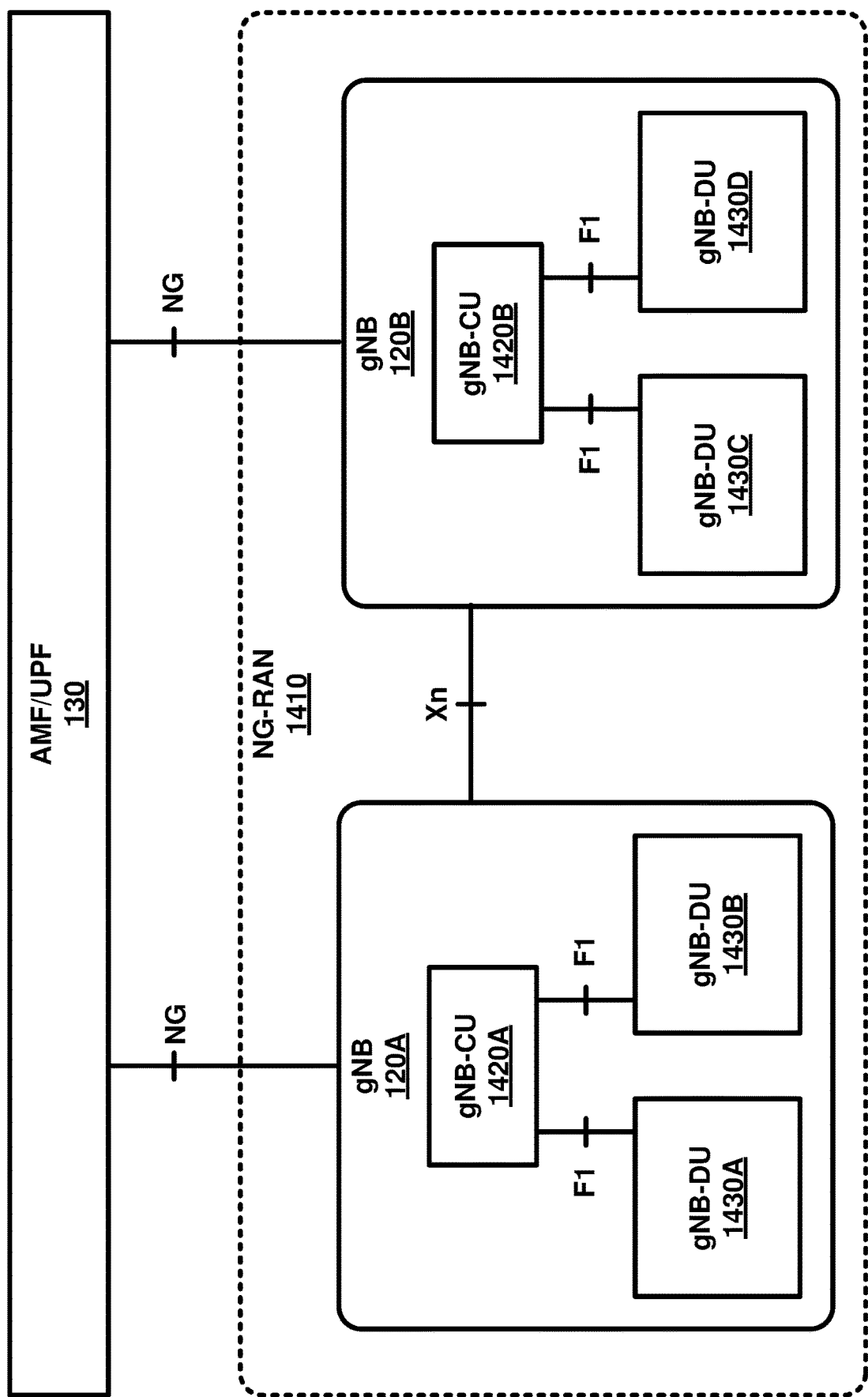
FIG. 14 is a diagram of an example RAN architecture as per an aspect of an embodiment of the present disclosure.

FIG. 14 is an example diagram of a RAN architecture comprising one or more base stations. In an example, a protocol stack (e.g. RRC, SDAP, PDCP, RLC, MAC, and PHY) may be supported at a node. A base station (e.g. gNB 120A or 120B) may comprise a base station central unit (CU) (e.g. gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

Figure 15:
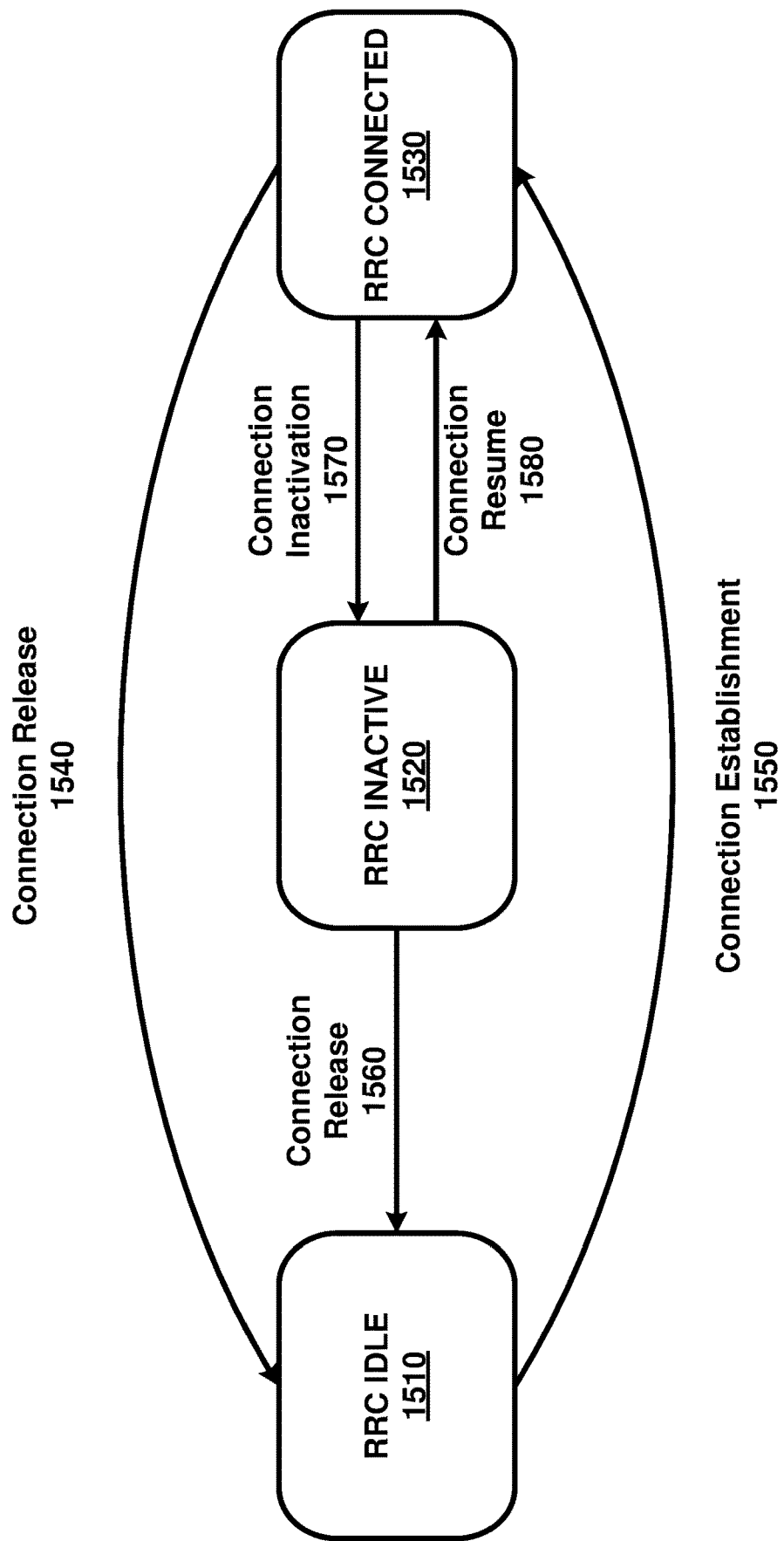
FIG. 15 is a diagram of example RRC states as per an aspect of an embodiment of the present disclosure.

FIG. 15 is an example diagram showing RRC state transitions of a wireless device. In an example, a wireless device may be in at least one RRC state among an RRC connected state (e.g. RRC Connected 1530, RRC_Connected), an RRC idle state (e.g. RRC Idle 1510, RRC_Idle), and/or an RRC inactive state (e.g. RRC Inactive 1520, RRC_Inactive). In an example, in an RRC connected state, a wireless device may have at least one RRC connection with at least one base station (e.g. gNB and/or eNB), which may have a UE context of the wireless device. A UE context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g. last serving base station).

In an example, a wireless device may transition a UE RRC state between an RRC idle state and an RRC connected state in both ways (e.g. connection release 1540 or connection establishment 1550; or connection reestablishment) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

In an example embodiment, a base station receiving one or more uplink packets from a wireless device in an RRC inactive state may fetch a UE context of a wireless device by transmitting a retrieve UE context request message for the wireless device to an anchor base station of the wireless device based on at least one of an AS context identifier, an RNA identifier, a base station identifier, a resume identifier, and/or a cell identifier received from the wireless device. In response to fetching a UE context, a base station may transmit a path switch request for a wireless device to a core network entity (e.g. AMF, MME, and/or the like). A core network entity may update a downlink tunnel endpoint identifier for one or more bearers established for the wireless device between a user plane core network entity (e.g. UPF, S-GW, and/or the like) and a RAN node (e.g. the base station), e.g. changing a downlink tunnel endpoint identifier from an address of the anchor base station to an address of the base station.

A gNB may communicate with a wireless device via a wireless network employing one or more new radio technologies. The one or more radio technologies may comprise at least one of: multiple technologies related to physical layer; multiple technologies related to medium access control layer; and/or multiple technologies related to radio resource control layer. Example embodiments of enhancing the one or more radio technologies may improve performance of a wireless network. Example embodiments may increase the system throughput, or data rate of transmission.

Example embodiments may reduce battery consumption of a wireless device. Example embodiments may improve latency of data transmission between a gNB and a wireless device. Example embodiments may improve network coverage of a wireless network. Example embodiments may improve transmission efficiency of a wireless network.

Random access (RA) procedures may be used to establish communications between a wireless device and a base station in a cell. Prior to initiation of a RA procedure, a base station may transmit one or more RRC messages to configure the wireless device with one or more parameters of RACH configuration. The base station may broadcast or multicast the one or more RRC messages to one or more wireless devices. The one or more RRC messages may be wireless device-specific messages, e.g., dedicated RRC messages transmitted to a wireless device in RRC INACTIVE 1520 or RRC CONNECTED 1530. The one or more RRC messages may comprise one or more parameters required for transmitting at least one preamble via one or more random access resources. For example, the one or more parameters may indicate at least one of the following: PRACH resource allocation, preamble format, SSB information (e.g., total number of SSBs, downlink resource allocation of SSB transmission, transmission power of SSB transmission, and/or other information), and/or uplink radio resources for one or more transport block transmissions.

A base station may transmit one or more downlink reference signals. For example, one or more downlink reference signals may comprise one or more discovery reference signals. A wireless device may select a first downlink reference signal among the one or more downlink reference signals. For example, the first downlink reference signal may comprise one or more synchronization signals and a physical broadcast channel (SS/PBCH). For example, the wireless device may adjust a downlink synchronization based on the one or more synchronization signals. For example, the one or more downlink reference signals may comprise one or more channel state information-reference signals (CSI-RS).

One or more RRC messages may further comprise one or more parameters indicating one or more downlink control channels, for example, PDDCH. Each of the one or more downlink control channels may be associated with at least one of the one or more downlink reference signals. For example, the first downlink reference signal may comprise one or more system information (e.g., master information block (MIB) and/or system information block (SIB)). A base station may transmit the one or more system information, for example, on a physical broadcast channel (PBCH), a physical downlink control channel (PDCCH), and/or a physical downlink shared channel (PDSCH).

One or more system information may comprise at least one information element (e.g., PDCCH-Config, PDCCH-ConfigSIB1, PDCCH-ConfigCommon). The at least one information element may be used, for example, to configure a wireless device with, among other things, one or more control parameters. The one or more control parameters may comprise one or more parameters of one or more control resource sets (CORESET). For example, the one or more control parameters may comprise the parameters of a first common CORESET #0 (controlResourceSetZero), and/or a first common CORESET (commonControlResourceSet). The one or more control parameters may further comprise one or more search space sets. For example, the one or more control parameters may comprise the parameters of a first search space for the system information block (searchSpaceSIB1), and/or a first common search space #0

(searchSpaceZero), and/or a first random access search space (ra-SearchSpace), and/or a first paging search space (pagingSearchSpace). For example, the wireless device may use the one or more control parameters to acquire the one or more downlink control channels.

For example, a wireless device may monitor a set of candidates for the one or more downlink control channels in the one or more control resource sets. The one or more control resource sets may be on a first active downlink frequency band, e.g., an active bandwidth part (BWP), on a first activated serving cell. For example, the first activated serving cell may be configured with the one or more control parameters according to the one or more search space sets. For example, the wireless device may decode each of the one or more downlink control channels in the set of candidates for the one or more downlink control channels according to a first format of a first downlink control information (DCI). For example, the set of candidates for the one or more downlink control channels may be defined in terms of the one or more search space sets. For example, the one or more search space sets may be one or more common search space sets (e.g., Type0-PDCCH, Type0A-PDCCH, Type1-PDCCH, Type2-PDCCH, Type3-PDCCH), and/or one or more wireless device-specific search space sets.

For example, a wireless device may monitor a set of candidates for the one or more downlink control channels in a Type0-PDCCH common search space set. For example, a Type0-PDCCH common search space set may be configured by at least one information element, e.g., PDCCH-ConfigSIB1 in a MIB. For example, the Type0-PDCCH common search space set may be configured by one or more search space sets, e.g., a searchSpaceSIB1 in PDCCH-ConfigCommon, or searchSpaceZero in PDCCH-ConfigCommon. For example, the Type0-PDCCH common search space set may be configured for a first format of a first downlink control information scrambled by a first radio network temporary identifier, e.g., a system information-radio network temporary identifier (SI-RNTI).

For example, a wireless device may monitor a set of candidates for one or more downlink control channels in a Type1-PDCCH common search space set. For example, the Type1-PDCCH common search space set may be configured by one or more search space sets, e.g., a ra-searchSpace in a PDCCH-ConfigCommon. For example, the Type1-PDCCH common search space set may be configured for a second format of a second downlink control information scrambled by a second radio network temporary identifier, e.g., a random access-radio network temporary identifier (RA-RNTI), or a temporary cell-radio network temporary identifier (TC-RNTI).

A wireless device may determine, for example during a cell search, that a first control resource set for a first common search space (e.g., Type0-PDCCH) is present. The first control resource set may comprise one or more resource blocks and one or more symbols. One or more RRC messages may comprise one or more parameters indicating one or more monitoring occasions of the one or more downlink control channels. For example, the wireless device may determine a number of consecutive resource blocks and a number of consecutive symbols for the first control resource set of the first common search space. For example, one or more bits (e.g., a four most significant bits) of the at least one information element (e.g., PDCCH-ConfigSIB1) may indicate the number of consecutive resource blocks and the number of consecutive symbols. For example, the wireless device may determine the one or more monitoring occasions of the one or more downlink control channels from one or more bits (e.g., a four least significant bits) of the at least one information element (e.g., PDCCH-ConfigSIB1). For example, the one or more monitoring occasions of the one or more downlink control channels associated with the first downlink reference signal may be determined based on one or more system frame numbers and one or more slot indexes of the first control resource set. For example, the first downlink reference signal with a first index may overlap in time with the first frame number and the first slot index.

A wireless device may determine a first downlink channel among the one or more downlink control channels, based on a first downlink reference signal. For example, the first downlink channel may be a first downlink control channel, or a first system information block (e.g., SIB1). The wireless device may assume that a demodulation reference signal antenna port associated with a reception of the first downlink channel is quasi co-located (QCL) with the first downlink reference signal. For example, the demodulation reference signal antenna port associated with the reception of the first downlink channel and the first downlink reference signal (e.g., the corresponding SS/PBCH block) may be quasi co-located with respect to at least one of the following: an average gain, QCL-TypeA, and/or QCL-TypeD.

A physical layer of the wireless device may receive from higher layers, among other information, one or more SS/PBCH block indexes. For example, the physical layer may receive one or more configuration parameters of one or more physical random access channel (PRACH) transmission parameters (e.g., the one or more PRACH transmission parameters may indicate PRACH preamble format, preamble index, a corresponding RA-RNTI, time resources, and/or frequency resources for PRACH transmission), and/or parameters for determining one or more sequences and their shifts in the PRACH preamble sequence set (e.g., set type). The physical layer may provide to higher layers one or more corresponding sets of reference signal received power (RSRP) measurements.

A random access procedure may comprise one or more transmissions of a random access preamble (e.g., Msg1) in one or more PRACH occasions. The random access procedure may further comprise one or more transmissions of one or more random access response (RAR) messages, for example, with one or more physical downlink channels (e.g., Msg2). The random access procedure may further comprise one or more Msg3 in one or more physical uplink channels (e.g., PUSCH), and one or more physical downlink channels (PDSCH) for contention resolution. The random access procedure may be triggered upon request of one or more PRACH transmissions, for example, by higher layers or by one or more control orders (e.g., PDCCH order).

A MAC entity of the wireless device may select one or more random access resources for a random access procedure initiated. The MAC entity may select a first downlink reference signal. For example, the MAC entity may select the first downlink reference signal (e.g., a first SS/PBCH block (SSB), or a first channel state information-reference signal (CSI-RS)) with the first reference signal received power (RSRP) above a first reference signal received power threshold. For example, the first reference signal received power threshold may be defined per a type of reference signal (e.g., rsrp-ThresholdSSB may for a SSB, and rsrp-ThresholdCSI-RS for a CSI-RS). The first reference signal received power threshold may be broadcast, semi-statically configured, and/or predefined. For example, the MAC entity may select the first downlink reference signal for contention-free random access procedure, for example for beam failure recovery, or system information request. For example, the MAC entity may select the first downlink reference signal for contention-based random access procedure.

A wireless device may select one or more random access resources. The one or more random access resources may, for example, comprise one or more random access preambles, one or more time resources, and/or one or more frequency resources for PRACH transmission. The one or more random access resources may be predefined. The one or more random access resources may be provided by one or more RRC messages. The one or more random access resources may be provided by one or more downlink control orders (e.g., PDCCH order). The one or more random access resources may be determined based on the first downlink reference signal. For example, the wireless device may set a first preamble index to a parameter (e.g., ra-PreambleIndex) corresponding to the first downlink reference signal.

A wireless device may transmit at least one random access preamble in one or more random access resources. For example, the wireless device may transmit a first preamble with a first preamble index. The first preamble may be transmitted using a first PRACH format with a first transmission power on one or more PRACH resources. The one or more PRACH resources may comprise one or more PRACH occasions.

One or more RRC messages may comprise one or more random access parameters. For example, a cell specific random access configuration message (e.g., RACH-Config-Common and/or RACH-ConfigGeneric) may comprise, among other parameters, at least one of following: a total number of random access preambles (e.g., totalNumberOfRA-Preambles), one or more PRACH configuration index (e.g., prach-ConfigurationIndex), a number of PRACH occasions that may be multiplexed in frequency domain (FDMed) in a time instance (e.g., msg1-FDM), an offset of a lowest PRACH occasion in frequency domain with respect to a first resource block (e.g., msg1-FrequencyStart), a power ramping step for PRACH (e.g., powerRampingStep), a target power level at the network receiver side (preambleReceivedTargetPower), a maximum number of random access preamble transmission that may be performed (e.g., preambleTransMax), a window length for a random access response (i.e., RAR, e.g., Msg2) (e.g., ra-ResponseWindow), a number of SSBs per random access channel (RACH) occasion and a number of contention-based preambles per SSB (e.g., ssb-perRACH-OccasionAndCB-PreamblesPerSSB). For example, the total number of random access preambles may be a multiple of the number of SSBs per RACH occasion. For example, the window length for RAR may be in number of slots. For example, a dedicated random access configuration message (e.g., RACH-ConfigDedicated) may comprise, among other parameters, one or more RACH occasions for contention-free random access (e.g., occasions), and one or more PRACH mask index for random access resource selection (e.g., ra-ssb-OccasionMaskIndex).

One or more random access parameters (e.g., ssb-per-RACH-OccasionAndCB-PreamblesPerSSB) may provide a wireless device with a first number (e.g., N) of one or more downlink reference signals (e.g., SS/PBCH blocks) that may be associated with a first PRACH occasion. The one or more random access parameters (e.g., ssb-perRACH-OccasionAndCB-PreamblesPerSSB) may provide the wireless device with a second number (e.g., R) of the one or more random access preambles for a first downlink reference signal and for a first PRACH occasion. The one or more random access preambles may be contention based preambles. The first downlink reference signal may be a first SS/PBCH block. For example, according to the first number (e.g., if N<1), the first SS/PBCH block may be mapped to at least one (e.g., 1/N) consecutive valid PRACH occasions. For example, according to the second number (e.g., R), at least one preamble with consecutive indexes associated with the first SS/PBCH block may start from the first preamble index for the first valid PRACH occasion.

For example, one or more PRACH configuration indexes (e.g., prach-ConfigurationIndex), may indicate, among other things, a preamble format, a periodicity for one or more PRACH time resources, one or more PRACH subframe numbers, a number of PRACH slots within the one or more PRACH subframes, a PRACH starting symbol number, and a number of time domain PRACH occasions within first PRACH slot.

One or more random access parameters may further comprise an association period for mapping one or more SS/PBCH blocks to one or more PRACH occasions. For example, one or more SS/PBCH block indexes may be mapped to the one or more PRACH occasions based on an order. For example, the order may be as follows: In increasing order of indexes of at least one preamble in a first PRACH occasion. In increasing order of indexes of one or more frequency resources (e.g., for frequency multiplexed PRACH occasions). In increasing order of indexes of one or more time resources (e.g., for time multiplexed PRACH occasions) in the first PRACH slot. In increasing order of indexes for one or more PRACH slots.

A base station may trigger a PRACH transmission by transmitting one or more control orders (e.g., PDCCH order). One or more PRACH mask indexes (e.g., ra-ssb-OccasionMaskIndex) may indicate one or more PRACH occasions. The one or more PRACH occasions may be associated with a first SS/PBCH block index indicated by the one or more control orders. The one or more PRACH occasions may be mapped (e.g., consecutively) for the first SS/PBCH block index. The wireless device may select a first PRACH occasion indicated by a first PRACH mask index value for the first SS/PBCH block index in the first association period. The first association period may be a first mapping cycle. The wireless device may reset the one or more indexes of the one or more PRACH occasions for the first mapping cycle.

A wireless device may determine a first PRACH occasion for transmitting a first preamble. The wireless device may determine a random access-radio network temporary identifier (e.g., RA-RNTI) associated with the first PRACH occasion. The random access-radio network temporary identifier may be, among other things, a function of at least one of PRACH symbol, and a slot index of a PRACH occasion in a system frame, and a frequency index of the PRACH occasion in frequency domain, and an uplink carrier index. For example, the random access-radio network temporary identifier may be computed as: RA-RNTI=1+s_id+14×t_id+14×80×f_id+14×80×8×ul_carrier_id. For example, s_id may be a PRACH starting symbol, t_id may be an index of a first slot of a first PRACH occasion I a system frame, f_id may be an index of the first PRACH occasion in frequency domain, and ul_carrier_id may be an uplink carrier index.

A wireless device may determine a parameter indicating a first preamble target power (e.g., PREAMBLE_RECEIVED_TARGET_POWER). The wireless device may transmit a first preamble using a first PRACH occasion, with a first preamble transmission power (e.g., $P_{PRACH,b,f,c}(i)$). The first preamble transmission power may be determined based on the first preamble target power.

In response to a PRACH transmission, a wireless device may receive one or more random access responses (RARs) (e.g., Msg2). The one or more random access responses may be scrambled by a particular radio network temporary identifier (e.g., RA-RNTI). The wireless device may monitor a search space set (e.g., the Type1-PDCCH common search space) for a first downlink control information (e.g., DCI format 1_0). The first downlink control information may comprise the one or more RARs. For example, a base station may transmit the one or more RARs in a form of DCI format 1_0 for a random access procedure initiated by PDCCH order, MAC layer, and/or RRC layer. For example, the DCI format 1_0 may comprise at least one of the following fields: one or more random access preamble index, SS/PBCH index, PRACH mask index, UL/SUL indicator, frequency and time domain resource assignments, modulation and/or coding schemes.

A wireless device may monitor for a first downlink control information (e.g., DCI format 1_0) during a time window. The time window may be indicated by the one or more RRC messages. The time window may start at a first symbol of a first control resource set. The wireless device may be configured by the one or more parameters in the one or more RRC messages to receive the first downlink control information on the first control resource set. The wireless device may determine a length of the time window based on the one or more parameters in the one or more RRC messages (e.g., ra-ResponseWindow). The length of the time window may be in number of slots.

A wireless device may stop a time window after or in response to a reception of one or more random access responses being determined as successful. A reception of the one or more random access responses may be determined as successful, for example, when the one or more random access responses comprise a preamble index (e.g., a random access preamble identity: RAPID) corresponding to a preamble that the wireless device transmits to a base station. For example, the RAPID may be associated with the PRACH transmission. The one or more random access responses may comprise an uplink grant indicating one or more uplink resources granted for the wireless device. The wireless device may transmit one or more transport blocks (e.g., Message 3) via the one or more uplink resources.

In an example, a gNB may transmit a DCI via a PDCCH for at least one of: scheduling assignment/grant; slot format notification; pre-emption indication; and/or power-control commends. More specifically, the DCI may comprise at least one of: identifier of a DCI format; downlink scheduling assignment(s); uplink scheduling grant(s); slot format indicator; pre-emption indication; power-control for PUCCH/PUSCH; and/or power-control for SRS.

In an example, a downlink scheduling assignment DCI may comprise parameters indicating at least one of: identifier of a DCI format; PDSCH resource indication; transport format; HARQ information; control information related to multiple antenna schemes; and/or a command for power control of the PUCCH.

In an example, an uplink scheduling grant DCI may comprise parameters indicating at least one of: identifier of a DCI format; PUSCH resource indication; transport format; HARQ related information; and/or a power control command of the PUSCH.

In an example, different types of control information may correspond to different DCI message sizes. For example, supporting multiple beams and/or spatial multiplexing in the spatial domain and noncontiguous allocation of RBs in the frequency domain may require a larger scheduling message, in comparison with an uplink grant allowing for frequency-contiguous allocation. DCI may be categorized into different DCI formats, where a format corresponds to a certain message size and/or usage.

In an example, a wireless device may monitor one or more PDCCH for detecting one or more DCI with one or more DCI format, in common search space or wireless device-specific search space. In an example, a wireless device may monitor PDCCH with a limited set of DCI format, to save power consumption. The more DCI format to be detected, the more power be consumed at the wireless device.

In an example, the information in the DCI formats for downlink scheduling may comprise at least one of: identifier of a DCI format; carrier indicator; frequency domain resource assignment; time domain resource assignment; bandwidth part indicator; HARQ process number; one or more MCS; one or more NDI; one or more RV; MIMO related information; Downlink assignment index (DAI); PUCCH resource indicator; PDSCH-to-HARQ_feedback timing indicator; TPC for PUCCH; SRS request; and padding if necessary. In an example, the MIMO related information may comprise at least one of: PMI; precoding information; transport block swap flag; power offset between PDSCH and reference signal; reference-signal scrambling sequence; number of layers; and/or antenna ports for the transmission; and/or Transmission Configuration Indication (TCI).

In an example, the information in the DCI formats used for uplink scheduling may comprise at least one of: an identifier of a DCI format; carrier indicator; bandwidth part indication; resource allocation type; frequency domain resource assignment; time domain resource assignment; MCS; NDI; Phase rotation of the uplink DMRS; precoding information; CSI request; SRS request; Uplink index/DAI; TPC for PUSCH; and/or padding if necessary.

In an example, a gNB may perform CRC scrambling for a DCI, before transmitting the DCI via a PDCCH. The gNB may perform CRC scrambling by binary addition of multiple bits of at least one wireless device identifier (e.g., C-RNTI, CS-RNTI, TPC-CS-RNTI, TPC-PUCCH-RNTI, TPC-PUSCH-RNTI, SP CSI C-RNTI, or TPC-SRS-RNTI) and the CRC bits of the DCI. The wireless device may check the CRC bits of the DCI, when detecting the DCI. The wireless device may receive the DCI when the CRC is scrambled by a sequence of bits that is the same as the at least one wireless device identifier.

In an example, in order to support wide bandwidth operation, a gNB may transmit one or more PDCCH in different control resource sets (coresets). A gNB may transmit one or more RRC message comprising configuration parameters of one or more coresets. A coreset may comprise at least one of: a first OFDM symbol; a number of consecutive OFDM symbols; a set of resource blocks; a CCE-to-REG mapping. In an example, a gNB may transmit a PDCCH in a dedicated coreset for particular purpose, for example, for beam failure recovery confirmation.

In an example, a wireless device may monitor PDCCH for detecting DCI in one or more configured coresets, to reduce the power consumption.

In an example, a DCI format (e.g., DCI format 1_0) may be used for a scheduling of PDSCH in one DL cell. The DCI format for downlink scheduling may comprise CRC bits scrambled by at least one wireless device identifier (e.g., C-RNTI, CS-RNTI, or MCS-C-RNTI). The information in the DCI format for downlink scheduling may comprise at least one of: identifier of a DCI format; frequency domain resource assignment; time domain resource assignment;

VRB-to-PRB mapping; modulation and coding scheme; new data indicator; redundancy version; HARQ process number; downlink assignment index; TPC command for scheduled PUCCH; PUCCH resource indicator; and/or PDSCH-to-HARQ_feedback timing indicator.

In an example, a DCI format for downlink scheduling may be for random access procedure initiated by a PDCCH order. For example, the CRC bits of the DCI format for downlink scheduling may be scrambled by a first radio network temporary identifier (e.g., C-RNTI), and the frequency domain resource assignment field may be a first value (e.g., all ones), indicating that the DCI format is for random access procedure. The information in the DCI format may then comprise at least one of: identifier for DCI format; frequency domain resource assignments; random access preamble index; UL/SUL indicator; SS/PBCH index; PRACH mask index; and/or reserved bits. The random access preamble index field may indicate a preamble sequence to be used for the random access procedure. The SS/PBCH index field may indicate the SS/PBCH (SSB) that may be used to determine one or more RACH occasions for the PRACH transmission. The PRACH mask index field may indicate the one or more RACH occasions associated with the SS/PBCH indicated by the SS/PBCH index for PRACH transmission.

A random access procedure may be initiated by a PDCCH order, or by a MAC entity, or by RRC. There may be only one random access procedure ongoing at a time in a MAC entity. The random access procedure on an SCell may only be initiated by the PDCCH order with a first random access preamble index field, wherein the first random access preamble index field may not be all zeros. For example, when a new random access procedure is triggered while another is already ongoing in the MAC entity, it may be up to a wireless device implementation whether to continue with the ongoing procedure or start with the new procedure (e.g. for SI request).

A wireless device may receive one or more RRC messages for a random access procedure comprising at least one of parameters: PRACH configuration index (prach-ConfigurationIndex; one or more PRACH occasions for a transmission of a random access preamble); initial random access preamble power (preambleReceivedTargetPower); a list of one or more reference signals (CSI-RS and/or SSB) identifying one or more candidate beams for recovery and/or the random access parameters (candidateBeamRSList); RSRP threshold for selection of a reference downlink signal (e.g., SSB, and/or CSI-RS); a search space identity for monitoring a response of a beam failure recovery request; a power-ramping factor (powerRampingStep); a scaling factor for a prioritized random access procedure (scalingFactorBI); a random access preamble (ra-PreambleIndex); an association between the one or more PRACH occasions and the reference signal (CSI-RS and/or SSB: ra-ssb-OccasionMaskIndex/ra-OccasionList); a maximum number of random access preamble transmission (reambleTransMax); and/or a first number of SSBs mapped to each one of the one or more PRACH occasions and a second number of contention-based random access preambles mapped to each one of the one or more SSBs (ssb-perRACH-OccasionAndCB-PreamblesPerSSB). At least one of the following wireless device variables may be used for the random access procedure: preamble index (PREAMBLE_INDEX); preamble transmission counter (PREAMBLE_TRANSMISSION_COUNTER); transmission power ramping counter (PREAMBLE_POWER_RAMPING_COUNTER); preamble power ramping step (PREAMBLE_POWER_RAMPING_STEP); preamble received target power (PREAMBLE_RECEIVED_TARGET_POWER); preamble backoff (PREAMBLE_BACKOFF); maximum transmission power (PCMAX); scaling factor for backoff indicator (SCALING_FACTOR_BI); and/or temporary identifier (TC-RNTI).

In an example, a random access procedure may be initiated on a serving cell. A MAC entity of a wireless device may initialize one or more random access parameters. The wireless device may then perform a random access resource selection procedure.

In an example, a random access procedure may be initiated by a PDCCH order. The PDCCH order may comprise a random access preamble index. The wireless device may set the preamble index to the random access preamble index signaled by the PDCCH order. The wireless device may select an SSB signaled by the PDCCH order.

In an example, a contention-free random access procedure may be initiated, wherein a wireless device receives one or more messages comprising parameters of contention-free random access resources. The contention-free random access resources may be associated with one or more reference signals (CSI-RS and/or SSB), wherein at least one reference signal of the one or more reference signals may have RSRP above a threshold. The wireless device may select a reference signal (CSI-RS and/or SSB) amongst the at least one reference signals with RSRP above the threshold. The wireless device may set a preamble index to a random access preamble index corresponding to the reference signal (CSI-RS and/or SSB).

In an example, a contention-based random access procedure may be initiated, wherein a wireless device receives one or more messages comprising parameters of contention-based random access resources. The wireless device may select an SSB from one or more SSBs, wherein the one or more SSBs have RSRP above a threshold, or may select any SSB. The wireless device may select a random access preamble, for example randomly with equal probability, from one or more random access preambles associated with the SSB.

A wireless device may determine a first PRACH occasion from one or more PRACH occasions corresponding to a first SSB or a first CSI-RS. For example, the first SSB may be quasi-collocated with the first CSI-RS. For example, the one or more PRACH occasions may be configured by RRC messages comprising parameters indicating an association between the one or more PRACH occasions and the first SSB or the first CSI-RS. For example, the one or more random access occasions may be indicated by PDCCH. A MAC entity of the wireless device may select a PRACH occasion, for example randomly with equal probability, amongst one or more consecutive PRACH occasions corresponding to the first SSB or the first CSI-RS. The MAC entity may consider a possible occurrence of measurement gaps when determining the first PRACH occasion from the one or more PRACH occasions corresponding to the first SSB or the first CSI-RS. The wireless device may then perform a random access preamble transmission procedure.

A MAC entity of a wireless device may perform a random access preamble transmission procedure for each one of one or more random access preambles. The MAC entity may increment a preamble power ramping counter (PREAMBLE_POWER_RAMPING_COUNTER) by one. The MAC entity may select a delta preamble value (DELTA_PREAMBLE) for a power offset. The MAC entity may set a preamble received target power (PREAMBLE_RECEIVED_TARGET_POWER) to preambleReceivedTarget- Power+DELTA_PREAMBLE+(PREAMBLE_POWER_RAMPING_COUNTER−1)×PREAMBLE_POWER_RAMPING_STEP, wherein the parameters of preamble transmission power are configured as described above. The wireless device may determine a random access radio network temporary identifier (RA-RNTI) associated with a first PRACH occasion in which the random access preamble is transmitted. The RA-RNTI associated with the first PRACH occasion in which the random access preamble is transmitted is computed as: RA-RNTI=1+s_id+14×t_id+14×80×f_id+14×80×8×ul_carrier_id, where s_id is an index of a first OFDM symbol of the first PRACH occasion (0<s_id<14), t_id is an index of a first slot of the first PRACH occasion in a system frame (0<t_id<80), f_id is an index of the first PRACH occasion in the frequency domain (0<f_id<8), and ul_carrier_id is an UL carrier used for Random Access Preamble transmission (0 for NUL carrier, and 1 for SUL carrier). The MAC entity may instruct the physical layer to transmit the random access preamble via the first PRACH occasion, corresponding RA-RNTI, preamble index (PREAMBLE_INDEX), and PREAMBLE_RECEIVED_TARGET_POWER. Once a random access preamble is transmitted, a MAC entity may start a random access response window (ra-ResponseWindow) configured by RRC at a first PDCCH occasion. The MAC entity may monitor the PDCCH for random access response(s) (RAR) identified by the corresponding RA-RNTI, for example, while the random access response window is running. The MAC entity may receive a downlink assignment (the RAR message) on the PDCCH for the RA-RNTI and may successfully decode the received TB. The random access response (RAR message) may comprise a MAC subPDU with a random access preamble identifier corresponding to the preamble index (PREAMBLE_INDEX), and may consider the RAR reception successful. The RAR message may comprise a timing advance command. The MAC entity may process the timing advance command and may consider the random access procedure successfully completed, for example, for a contention-free random access procedure. For a contention-based random access procedure, the RAR message may comprise an UL grant, and the MAC entity may proceed with transmission of Msg3 for contention resolution.

Figure 16:
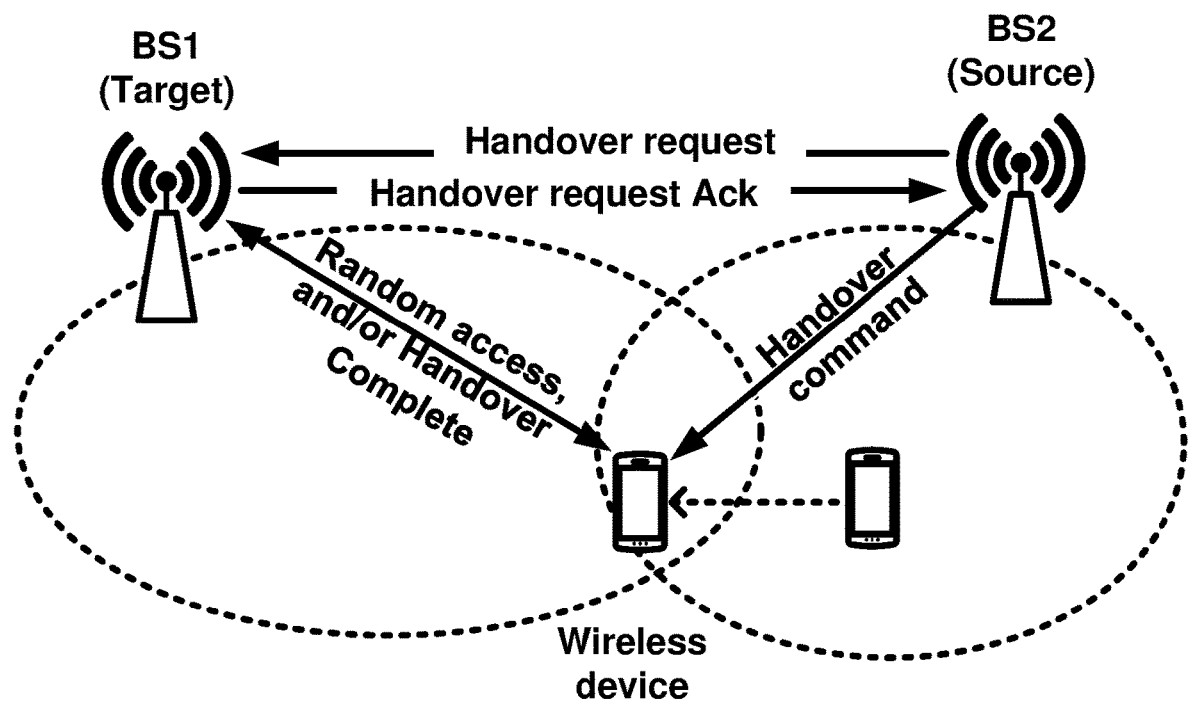
FIG. 16 is a diagram of example handover procedure as per an aspect of an embodiment of the present disclosure.

In RRC_CONNECTED state, the network may control wireless device mobility. For example, the network may decide when the wireless device connects to which cell(s) (e.g., E-UTRA cell(s), and/or NR cell(s), and/or inter-RAT cell(s)). Cell level mobility may require explicit RRC signaling to be triggered, e.g., handover. For network controlled mobility in cell level in RRC_CONNECTED, the PCell may be changed using an RRC Connection Reconfiguration message. The SCell(s) may be changed using the RRC Connection Reconfiguration message. For inter-BS handover, as shown in FIG. 16, the signaling procedure may comprise at least one of the following: Handover Request; Handover Request Acknowledgement; Handover Command; Random Access and Handover Complete. A source base station (BS) may initiate handover and send, to a target BS, a Handover Request over a network interface (e.g., Xn and/or X2). The target BS may perform an admission control and provide an RRC configuration as part of the Handover Acknowledgement. The source BS may provide the RRC configuration to the wireless device in the Handover Command. The handover command message may comprise cell ID and all information required to access the target cell. The wireless device may access the target cell and may not need to read the system information of the target cell. For example, the information required for contention-based and contention-free random access can be included in the Handover Command message. The access information to the target cell may comprise beam specific information, if any. The wireless device may move the RRC connection to the target BS via initiating a random access procedure. The wireless device may reply the Handover Complete message to the target BS. The wireless device may also send user data if a grant is available.

The radio access network handover may perform the preparation and execution phase of the handover procedure without involvement of the core network, e.g., preparation messages may be directly exchanged between BSs. The target BS may trigger the release of the resources at the source BS during the handover completion phase.

The network may trigger the handover procedure, e.g., based on radio conditions, load, QoS, wireless device category/capability, and/or the like. To facilitate this, the network may configure the wireless device to perform measurement reporting (possibly including the configuration of measurement gaps). The network may also initiate handover blindly, for example, without having received measurement reports from the wireless device.

Before sending the handover message to the wireless device, the source BS may prepare one or more target cells. The source BS may select the target PCell. The source BS may also provide the target BS with a list of best cells on each frequency for which measurement information is available, for example, in order of decreasing RSRP. The source BS may also include available measurement information for the cells provided in the list. The target BS may decide which SCells are configured for use after handover, which may include cells other than the ones indicated by the source BS.

According to some of the various aspects of embodiments, the target BS may generate a message used to configure the wireless device for the handover. For example, the message may comprise the access stratum configuration to be used in the target cell(s). The source BS may transparently (for example, does not alter values/content) forward the handover message/information received from the target BS to the wireless device. When appropriate, the source BS may initiate data forwarding for (a subset of) the dedicated radio bearers. After receiving the handover message, the wireless device may attempt to access the target PCell at the available RACH occasion according to a random access resource selection. When allocating a dedicated preamble for the random access in the target PCell, the network (e.g., NR and/or E-UTRA) may ensure the preamble is available from the first RACH occasion the wireless device may use. Upon successful completion of the handover, the wireless device may send a message used to confirm the handover to the target BS.

According to some of the various aspects of embodiments, if the target BS does not support the release of RRC protocol which the source BS used to configure the wireless device, the target BS may be unable to comprehend the wireless device configuration provided by the source BS. In this case, the target BS may use the full configuration option to reconfigure the wireless device for handover and re-establishment. Full configuration option includes an initialization of the radio configuration, which makes the procedure independent of the configuration used in the source cell(s) with the exception that the security algorithms are continued for the RRC re-establishment.

According to some of the various aspects of embodiments, the handover mechanism triggered by RRC may require the wireless device to reset the MAC entity and re-establish RLC. RRC managed handovers with and without PDCP entity re-establishment may both be supported. After the successful completion of handover, PDCP SDUs may be re-transmitted in the target cell(s). This may apply for dedicated radio bearers using RLC-AM mode and/or for handovers not involving full configuration option. For DRBs using RLC AM mode, PDCP may either be re-established together with a security key change or initiate a data recovery procedure without a key change. For DRBs using RLC UM mode and for SRBs, PDCP may either be re-established together with a security key change or remain as it is without a key change. Data forwarding, in-sequence delivery and duplication avoidance at handover may be guaranteed when the target BS uses the same DRB configuration as the source BS. After the successful completion of handover not involving full configuration option, the SN (sequence number) and/or the HFN (hyper frame number) may be reset for some radio bearers. For the dedicated radio bearers using RLC-AM mode both SN and HFN may continue. For reconfigurations involving the full configuration option, the PDCP entities may be newly established (SN and HFN may not continue) for dedicated radio bearers irrespective of the RLC mode. The wireless device behavior to be performed upon handover may be the same regardless of the handover procedures used within the network (e.g. whether the handover includes X2/Xn or N2/S1 signaling procedures).

The network may support timer based handover failure procedure. RRC connection re-establishment procedure may be used for recovering from handover failure. The source BS may, for some time, maintain a context to enable the wireless device to return in case of handover failure. After having detected handover failure, the wireless device may attempt to resume the RRC connection either in the source PCell or in another cell using the RRC re-establishment procedure. This connection resumption may succeed if the accessed cell is prepared. For example, when the access cell is a cell of the source BS or of another BS towards which handover preparation has been performed. The cell in which the re-establishment procedure succeeds becomes the PCell while SCells, if configured, may be released.

Normal measurement and mobility procedures may be used to support handover to cells broadcasting a CSG (closed subscriber group) identity. In addition, a network (e.g., E-UTRAN/NR) may configure the wireless device to report that it is entering or leaving the proximity of cell(s) included in its CSG whitelist. a network (e.g., E-UTRAN/NR) may request the wireless device to provide additional information broadcast by the handover candidate cell e.g. cell global identity, CSG identity, CSG membership status. A network (e.g., E-UTRAN/NR) may use the proximity report to configure measurements as well as to decide whether or not to request additional information broadcast by the handover candidate cell. The additional information may be used to verify whether or not the wireless device is authorized to access the target PCell and may also be needed to identify handover candidate cell. This may involve resolving PCI confusion, for example, when the physical layer identity that is included in the measurement report may not uniquely identify the cell.

The purpose of RRC connection reconfiguration procedure may be to modify an RRC connection, e.g. to establish, modify and/or release RBs, to perform handover, to setup, modify, and/or release measurements, to add, modify, and/or release SCells. As part of the procedure, NAS dedicated information may be transferred from a network (e.g., E-UTRAN/NR) to the wireless device. If the received RRC Connection Reconfiguration message includes the sCellToReleaseList, the wireless device performs SCell release. If the received RRC Connection Reconfiguration message includes the sCellToAddModList, the wireless device performs SCell additions or modification.

The wireless device context within the source BS may comprise information regarding roaming/handover/access restrictions which may be provided either at connection establishment or at the last TA (registration/tracking area) update process. The source BS may configure the wireless device measurement procedures employing at least one RRC connection reconfiguration message. The wireless device may be triggered to send at least one measurement report by the rules set by, for example, system information, RRC configuration, and/or the like. The source BS may make a handover decision based on many parameters, for example, the measurement reports, RRM information, traffic and load, a combination of the above, and/or the like. The source BS may initiate the handover procedure by sending a handover request message to one or more potential target BSs. When the source BS sends the handover request message, it may start a handover preparation timer. Upon reception of the handover request acknowledgement message the source BS may stop the handover preparation timer.

In a network interface (e.g. X2/Xn) handover process, the source BS (e.g. eNB/gNB) may transmit a handover request message to one or more potential target BSs to initiate the handover. The handover request message may comprise a transparent RRC container with necessary information to prepare the handover at the target side. In an example embodiment, a handover request message may comprise: a target cell ID, a C-RNTI of the wireless device in the source BS, RRM-configuration including wireless device inactive time, basic AS-configuration including antenna information and DL carrier frequency, the current QoS flow to DRB mapping rules applied to the wireless device, the SIB1 from source BS, the wireless device capabilities for different RATs, and PDU session related information. In an example embodiment, handover request message may further comprise the wireless device reported measurement information including beam-related information if available. After issuing a handover request, the source BS may not reconfigure the wireless device.

In a core network interface (e.g., S1/N2, and/or NG interface that may comprise an NG user-plane part and/or an NG control-plane part) handover process without AMF/MME relocation, the source BS may transmit a handover required message to an AMF/MME for one or more potential target BSs, and the AMF/MME may transmit a handover request message to the potential target BSs. The handover required message and/or the handover request message may pass information to prepare the handover at the target side. In a core network interface (e.g., S1/N2, and/or NG interface) handover process relocating an AMF/MME, a source BS may transmit a handover required message to a source AMF/MME for one or more potential target BSs, the source AMF/MME may transmit a forward relocation request message to one or more potential target AMFs/MMEs serving the potential target BSs, and the potential target AMFs/MMEs may transmit a handover request message to the potential target BSs. The handover required message, the forward relocation request message, and/or the handover request message may pass information to prepare the handover at the target side. During the handover preparation phase, the serving BS may transmit the handover request message to one or more potential target BSs. This information may be employed, at least in part, by the potential target BS, for example, to configure the wireless device after completing the handover.

A target BS may employ admission control in order to properly prepare before the wireless device connects to the target BS. Handover admission control may be performed by the target BS depending on many factors, e.g., QoS required for wireless device bearers, wireless device capabilities, wireless device configuration, target BS load, a combination of the above, and/or the like. The target BS may configure the required resources according to the received information from the serving (source) BS and may reserve a C-RNTI and/or a RACH preamble. The access stratum configuration to be used in the target cell may be specified independently (for example, as an establishment) or as a delta compared to the access stratum-configuration used in the source cell (for example as a reconfiguration). Slice-aware admission control may be performed if the slice information is sent to the target BS. The target BS may reject PDU sessions, for example when the PDU sessions are associated with non-supported slices.

A target BS may prepare handover with L1/L2 and may send the handover request acknowledge message to the source BS. In an X2/Xn handover procedure, the handover request acknowledge message may include a transparent container to be sent to the wireless device as an RRC message to perform the handover. In an S1/N2 handover procedure without MME/AMF relocation, the handover request acknowledge message from the target BS to the MME/AMF and/or the handover command message from the MME/AMF to the source BS may include a transparent container to be sent to the wireless device as an RRC message to perform the handover. In an S1/N2 handover procedure relocating an MME/AMF, the handover request acknowledge message from the target BS to the target MME/AMF, the forward relocation response message from the target MME/AMF to the source MME/AMF, and/or the handover command message from the source MME/AMF to the source BS may include a transparent container to be sent to the wireless device as an RRC message to perform the handover. The container may include a new C-RNTI, target BS security algorithm identifiers for the selected security algorithms, a dedicated RACH preamble, access parameters, SIB s, and/or other configuration parameters. The target BS may generate the RRC message to perform the handover, for example, RRC connection reconfiguration message including the mobility control information. The RRC message may be sent by the source BS towards the wireless device.

The source BS may trigger the wireless device handover by sending an RRC reconfiguration message to the wireless device, comprising the information required to access the target cell, e.g., target cell ID, new C-RNTI, target BS security algorithm identifiers for the selected security algorithms. The RRC reconfiguration message may also comprise at least one of following: a set of dedicated RACH resources, the association between RACH resources and SSB(s), the association between RACH resources and wireless device-specific CSI-RS configuration(s), common RACH resources, and/or system information of the target cell.

The source BS may send SN status transfer message to the target BS. The source BS may perform the necessary integrity protection and ciphering of the message. The wireless device may receive the RRC connection reconfiguration message from the source BS and may start performing the handover. The wireless device may not need to delay the handover execution for delivering the HARQ/ARQ responses to the source BS.

After receiving the RRC connection reconfiguration message that may include the mobility control information, the wireless device may perform synchronization to the target BS and accesse the target cell via RACH on the primary cell. The wireless device Random access procedure may employ a contention-free procedure if a dedicated RACH preamble was indicated in the RRC connection reconfiguration message. The wireless device random access procedure may employ a contention-based procedure if no dedicated preamble was indicated. The wireless device may derive target BS specific keys and may configure the selected security algorithms to be used in the target cell. The target BS may respond with uplink allocation and timing advance.

After the wireless device has successfully accessed the target cell, the wireless device may complete the RRC handover procedure by sending an RRC connection reconfiguration complete message (C-RNTI) to the target BS to confirm the handover and to indicate that the handover procedure is completed for the wireless device. The wireless device may transmit a MAC uplink Buffer Status Report (BSR) Control Element (CE) along with the uplink RRC Connection Reconfiguration Complete message or may transmit a MAC uplink BSR CE whenever possible to the target BS. The target BS may verify the C-RNTI sent in the RRC Connection Reconfiguration Complete message. The target BS may now begin sending data to the wireless device and receiving data from the wireless device.

The target BS may send a path switch request message to AMF/MME to trigger the core network (e.g., 5GC) to switch the DL data path towards the target BS and to establish an interface (e.g., NG-C interface) towards the target BS. The core network may switch the DL data path towards the target BS. The UPF may send one or more end marker packets on the old path to the source BS per PDU session/tunnel and then may release any U-plane/TNL resources towards the source BS. The AMF/MME may confirm the path switch request message with a path switch request acknowledgement message. Upon reception of the path switch request acknowledgment message from the AMF/MME, the target BS may send the wireless device context release to inform the source BS about the success of the handover. The source BS may then release radio and C-plane related resources associated to the wireless device context. Any ongoing data forwarding may continue.

The RRM configuration may include both beam measurement information (for layer 3 mobility) associated to SSB(s) and CSI-RS(s) for the reported cell(s) if both types of measurements are available. Also, if CA is configured, the RRM configuration may comprise the list of best cells on each frequency for which measurement information is available. And the RRM measurement information may also comprise the beam measurement for the listed cells that belong to the target BS.

The common RACH configuration for beams in the target cell may only be associated to the SSB(s). The network may have dedicated RACH configurations associated to the SSB(s) and/or have dedicated RACH configurations associated to CSI-RS(s) within a cell. The target BS may only include one of the following RACH configurations in the Handover Command to enable the wireless device to access the target cell: common RACH configuration; Common RACH configuration+Dedicated RACH configuration associated with SSB; Common RACH configuration+Dedicated RACH configuration associated with CSI-RS. The dedicated RACH configuration allocates RACH resource(s) together with a quality threshold to use them. When dedicated RACH resources are provided, they are prioritized by the wireless device and the wireless device may not switch to contention-based RACH resources as long as the quality threshold of those dedicated resources is met. The order to access the dedicated RACH resources may be up to wireless device implementation.

Figure 17:
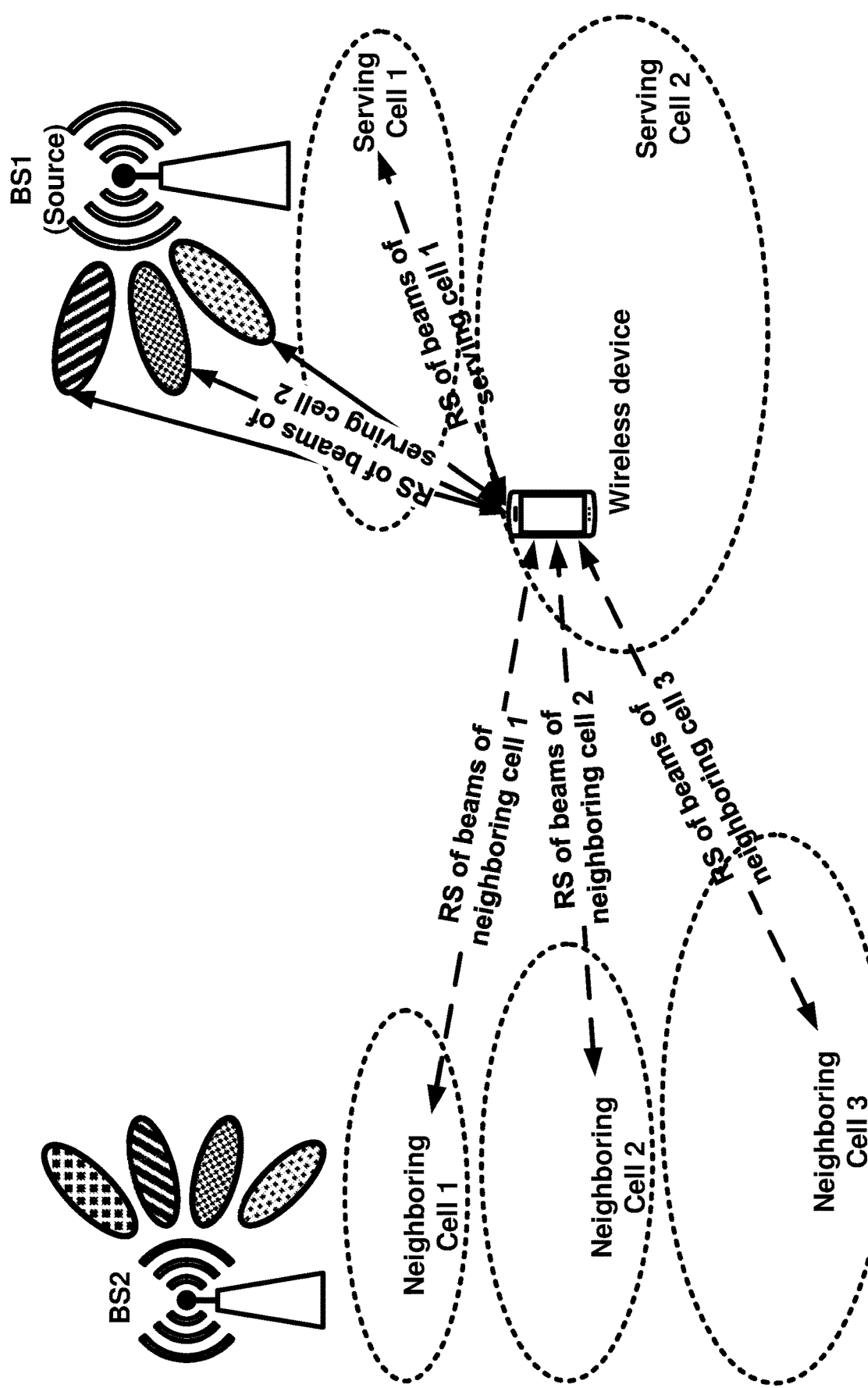
FIG. 17 is a diagram of example cell and/or beam measurements as per an aspect of an embodiment of the present disclosure.

As shown in FIG. 17, the wireless device may measure at least one beam of a cell (e.g., serving cell and/or neighboring non-serving cell(s)). The measurement results (e.g., RSRP values) may be averaged to derive the cell quality. The wireless device may be configured to consider a subset of the detected beams. The wireless device may perform filtering at two different levels: at the physical layer to derive beam quality and then at RRC level to derive cell quality from the at least on beam. Cell quality from beam measurements is derived in the same way for the serving cell(s) and for the non-serving cell(s). Measurement reports may contain the measurement results of the X best beams if the wireless device is configured to do so by the BS.

Figure 18:
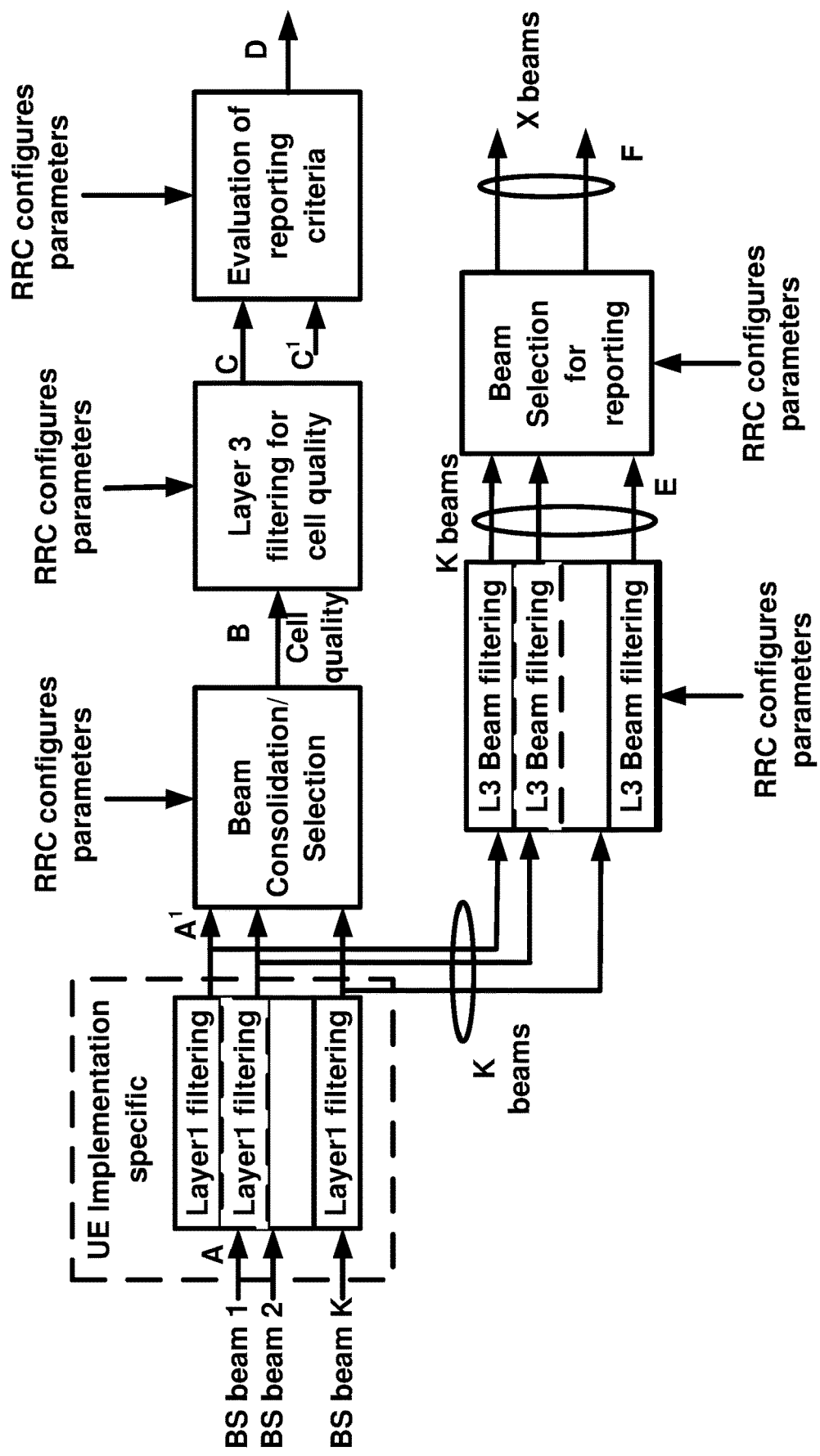
FIG. 18 is a diagram of example beam-based measurement model as per an aspect of an embodiment of the present disclosure.

FIG. 18 demonstrates a high-level measurement model. K beams may correspond to the measurements on SSB and/or CSI-RS resources configured for L3 mobility by BS and detected by the wireless device at L1. As shown in FIG. 18, at point A measurements (e.g., beam specific samples) may inter to the physical layer. The inputs measures at point A may inter layer 1 filtering. The exact filtering may be implementation dependent. Measurements (e.g., beam specific measurements) may be reported by layer 1 to layer 3 after layer 1 filtering at point $A^1$. beam specific measurements may be consolidated to derive cell quality. The behavior of the Beam consolidation/selection may be standardized and the configuration of this module is provided by RRC signaling. Reporting period at B may equal one measurement period at A1. A measurement (e.g. cell quality) derived from beam-specific measurements may be reported to layer 3 after beam consolidation/selection at point B. Filtering may be performed on the measurements provided at point B. The behavior of the Layer 3 filters may be standardized and the configuration of the layer 3 filters may be provided by RRC signaling. Filtering reporting period at C may equal one measurement period at B. A measurement after processing in the layer 3 filter is at point C. The reporting rate is identical to the reporting rate at point B. This measurement may be used as input for one or more evaluation of reporting criteria. The one or more evaluation of reporting criteria may check whether actual measurement reporting is necessary at point D. The evaluation may be based on more than one flow of measurements at reference point C, e.g. to compare between different measurements. This is illustrated by input C and C1. The wireless device may evaluate the reporting criteria at least every time a new measurement result is reported at point C, C1. The reporting criteria may be standardized and the configuration is provided by RRC signaling (wireless device measurements). Measurement report information (message) may be sent on the radio interface at point D. Filtering performed on the measurements (e.g., beam specific measurements) may be provided at point A1. The behavior of the beam filters may be standardized and the configuration of the beam filters may be provided by RRC signaling. Filtering reporting period at E may equal one measurement period at A1. A measurement (e.g. beam-specific measurement) after processing in the beam filter is at point E. The reporting rate may be identical to the reporting rate at point A1. This measurement may be used as input for selecting the X measurements to be reported. Beam Selection for beam reporting may select the X measurements from the measurements provided at point E. The behavior of the beam selection may be standardized and the configuration of this module may be provided by RRC signaling. Beam measurement information may be included in measurement report (sent) on the radio interface at point F.

Layer 1 filtering may introduce a certain level of measurement averaging. How and when the wireless device may perform the required measurements may be implementation specific to the point that the output at B fulfils the performance. Layer 3 filtering for cell quality and related parameters used may not introduce any delay in the sample availability between B and C. Measurement at point C, C1 may be the input used in the event evaluation. L3 Beam filtering and related parameters used may not introduce any delay in the sample availability between E and F. Measurement reports may be characterized by the following: Measurement reports may include the measurement identity of the associated measurement configuration that triggered the reporting; Cell and beam measurement quantities to be included in measurement reports may be configured by the network; The number of non-serving cells to be reported may be limited through configuration by the network; Cells belonging to a blacklist configured by the network may not be used in event evaluation and reporting, and conversely when a whitelist is configured by the network, only the cells belonging to the whitelist may be used in event evaluation and reporting; Beam measurements to be included in measurement reports may be configured by the network (beam identifier only, measurement result and beam identifier, or no beam reporting). Intra-frequency neighbor (cell) measurements and inter-frequency neighbor (cell) measurements may be defined as follows: SSB based intra-frequency measurement: a measurement may be defined as an SSB based intra-frequency measurement provided the center frequency of the SSB of the serving cell and the center frequency of the SSB of the neighbor cell are the same, and the subcarrier spacing of the two SSBs is also the same. SSB based inter-frequency measurement: a measurement may be defined as an SSB based inter-frequency measurement provided the center frequency of the SSB of the serving cell and the center frequency of the SSB of the neighbor cell are different, or the subcarrier spacing of the two SSBs is different. For SSB based measurements, one measurement object may correspond to one SSB and the wireless device may consider different SSBs as different cells. CSI-RS based intra-frequency measurement: a measurement may be defined as a CSI-RS based intra-frequency measurement provided the bandwidth of the CSI-RS resource on the neighbor cell configured for measurement is within the bandwidth of the CSI-RS resource on the serving cell configured for measurement, and the subcarrier spacing of the two CSI-RS resources is the same. CSI-RS based inter-frequency measurement: a measurement may be defined as a CSI-RS based inter-frequency measurement provided the bandwidth of the CSI-RS resource on the neighbor cell configured for measurement is not within the bandwidth of the CSI-RS resource on the serving cell configured for measurement, or the subcarrier spacing of the two CSI-RS resources is different.

Handover in high radio frequency range with beamforming may increase mobility interruption time due to beam sweep delay. Mobility interruption time may refer to a time duration (e.g., a shortest time duration) during which a wireless device may not exchange user plane packets with any base station during a transition. It may be of interest to minimize the mobility interruption time (e.g., to 0 ms). Reliability of communications may be reduced due to beamforming characteristics providing smaller coverage. The wireless device may experience very fast signal degradation when moving or rotating. Channel conditions may vary significantly in high frequency. For example, pathloss fluctuation may be tens of dB different in signal strength in beams, or between line of sight (LoS) and non-LoS, which may result in higher handover failure and large ping-pong rate.

Mobility performance is an important performance metrics for radio access technologies (e.g., LTE, NR). It is important to identify handover solutions to achieve high handover performance with low mobility interruption time (e.g., 0 ms), low latency (e.g., an average time between a transmission of a packet and a reception of an acknowledgement), and high reliability to provide a seamless handover experience for the wireless device. Low mobility interruption time may be achieved by using intra-cell beam mobility and/or addition/release of SCell(s) for CA operation. Even though these techniques may reduce mobility interruption time, there is still a need to further reduce mobility interruption time in many instances (e.g., for ultra-reliable low-latency communications (URLLC) type of service), which may require low end-to-end delay (e.g., 1 ms). Therefore, radio technologies may require reduced handover (HO)/SCG change mobility interruption time and improved handover reliability. The mobility enhancement may be applied to both inter-/intra-frequency HO/SCG change. The mobility enhancements may not be limited to high frequency range. Solutions to reduce HO/SCG change mobility interruption time and to improve HO reliability may also be beneficial to high speed trains and aerial use cases where channel situation becomes challenging in terms of HO performance.

Existing solutions to reduce mobility interruption time during HO may comprise: HO with simultaneous connectivity with source cell and target cell; make-before-break; RACH-less (also known as RACH-skip) handover. Existing solutions to improve HO reliability and robustness may comprise: conditional handover; fast handover failure recovery.

A wireless device may receive an RRC reconfiguration message indicating a make-before-break handover. When make-before-break handover is configured, the wireless device connection to the source base station may be maintained after reception of the RRC reconfiguration message before the wireless device executes an initial uplink transmission to the target base station. The source base station may decide when to stop transmitting to the wireless device. The wireless device may be simultaneously configured with make-before-break handover and RACH-less handover.

A wireless device may perform a RACH procedure during handover to obtain a timing advance (TA) value and an UL grant for PUSCH transmission (e.g., RRC reconfiguration complete message) to the target cell. In a RACH-less (RACH-skip) handover, the wireless device may skip the RACH procedure during handover. A RACH-less handover may be used to eliminate RACH related latencies during HO and thus reduce mobility interruption time. RACH-less handover may be used when the source cell may know the TA of the target cell, for example, in synchronous deployments, scenarios when the target cell TA is zero or negligible, or scenarios when the target cell TA is the same as the source cell TA.

A wireless device may get the TA information without a RACH procedure. For example, a wireless device may estimate the TA to the target cell based on measuring the timing offset between the received reference signal from the source cell and the target cell. However, the target cell TA obtained by this solution may not be accurate because, for example, the timing offset between the reference signals form the source cell and the target cell may not reflect the propagation delay difference between the source node to the wireless device and the target node to the wireless device. The TA value of a wireless device is location dependent. In deployment scenarios with multi-beam operation, the beam/TRP coverage may be small and fixed as long as their TX beam direction and/or power is fixed. A delta difference of the exact TAs at the different locations within the small coverage of a beam/TRP may be considered small enough, for example within the Cyclic Prefix (CP). A fixed default TA value associated with a beam may be accurate enough, for example, as long as the diameter of the beam/TRP coverage is less than an equivalent distance of the cyclic prefix duration. So, the timing inaccuracy offset from the default TA at any location within the coverage may be tolerated by CP. For example, wireless device positioning technique may be another method for more accurate location based TA estimation, implemented at the network. The network implementation may determine the TA associated with a candidate target beam and configure the pre-determined TA to the wireless device.

A wireless device may receive an RRC reconfiguration message. The RRC reconfiguration messages may comprise one or more parameters for the wireless device to perform handover to a target base station, for example, a new C-RNTI, target base station security algorithm identifiers, dedicated RACH preamble, target base station SIB s, etc. The wireless device may be configured with RACH-less handover. When RACH-less handover is configured, the RRC reconfiguration message may comprise a timing adjustment indication (e.g., TA), and pre-allocated uplink grant for the wireless device to access the target base station. The pre-allocated uplink grant may be periodic. The per-allocated uplink grant configuration may comprise a scheduling offset and/or interval (e.g., configured grant type 1), and a number of configured HARQ processes. The pre-allocated uplink grant resource may be released when a timer (e.g., T304) expires, and/or upon a successful RACH-less procedure completion. The wireless device may monitor PDCCH of the target base station to receive an uplink grant when, for example, the pre-allocated uplink grant is not configured.

The wireless device may perform synchronization to the target base station. The wireless device may use a first available uplink grant after synchronization to the target cell. The wireless device may use the uplink grant to transmit an RRC reconfiguration complete message (C-RNTI) to the target base station to confirm the handover, along with an uplink buffer status report (BSR), and/or UL data. The target base station may verify the C-RNTI in the RRC reconfiguration complete message and begin sending data to the wireless device. The handover procedure may be completed for the wireless device when the wireless device receives the wireless device contention resolution identity MAC control element from the target base station.

In existing technologies (e.g., LTE and/or NR), a RACH attempt procedure during handover may take a long time (e.g., ~10-12 ms in LTE and may be longer in NR). RACH-less handover may be performed to eliminate RACH-related latencies when, for example, the target cell and the source cell are synchronous, and/or no timing advance is needed at the target cell (e.g., in small cells that TA=0). In some deployment scenarios, multi-beam operation may be supported, and one or more beams may degrade quickly. The transmission of first PUSCH in target cell for RACH-less may fail when, for example, only the one or more beams are provided and the one or more beams are outdated (e.g., due to wireless device high mobility). So, the RRC reconfiguration message (HO command) may provide multiple candidate beams information of the target cell, and the wireless device may select a suitable beam to transmit PUSCH in the target cell.

A PUSCH transmission in a RACH-less handover may fail, for example due to channel degradation, and/or beam expiration, and/or low transmission power, and/or interference caused by TA expiration, etc. For example, the base station may not be able to decode the PUSCH that the wireless device transmits during a RACH-less handover procedure. The wireless device may determine that the RACH-less (PUSCH) transmission has failed, for example when it does not receive any downlink control information (e.g. PDCCH and/or HARQ) during a monitoring window and/or receives a NACK from the target base station (if HARQ is configured). When a first PUSCH transmission in a RACH-less HO fails, the wireless device may perform power ramping and retransmit the PUSCH. For example, the RRC message comprising the HO command may indicate parameters of power ramping and resources for PUSCH retransmission. A timer and/or a counter may be running in the wireless device side to control PUSCH retransmissions. A RACH-less procedure may fail when, for example, the timer and/or the counter expires. RACH-less handover failure may result in long mobility interruption time. When the RACH-less procedure fails, the wireless device may fallback to perform a random access (e.g., a contention-based and/or a contention-free random access) procedure in the target cell. Staring and/or ending points in time may be configured for RACH-less configuration (that may include pre-allocated UL grants in the target cell), using target cell SFN values. The wireless device may use a RACH procedure when, for example, the handover is not completed at the ending point in time for the RACH-less configuration.

In case RACH-less handover is configured using PDCCH scheduling of UL grants, the target base station may need to transmit the corresponding PDCCH in the direction where the wireless device is located, in order to reach the wireless device. The base station may need to perform sweeping of those transmissions in different DL beams when, for example, the position of the wireless device is not known on single DL beam level. The DL TX beam sweeping may result in an increase in interruption time during the handover. If a RACH-less handover is configured with pre-allocated UL grants, the wireless device may transmit in the pre-allocated UL grants using a TX beam that is directed towards the base station using e.g. beam correspondence. If the base station however only supports analogue RX beamforming, the base station may need to perform RX sweeping in the pre-allocated resources in order to receive the UL transmissions. The UL RX beam sweeping may also result in longer interruption time, and/or more Msg3 transmissions from the wireless device. The RACH-less configuration may be restricted to a single or a few DL beam(s), thus, the need for beam sweeping in the above cases may be avoided or limited. However, the wireless device may end up in a different DL beam without RACH-less configuration. The wireless device may then use the RACH procedure. Since the best DL beam may be determined from the measurement results, it is possible for the base station to determine what beam(s) to include in the RACH-less configuration.

A wireless device may need to select a DL beam for initial access to a target cell. In existing technologies (e.g., NR), the UL to DL correspondence may be created via a RACH procedure. For example, a transmitted PRACH (preamble and/or occasion) may be associated to a specific SSB and/or CSI-RS. The wireless device may select a first DL beam when, for example, the RSRP of the first DL beam is above a configured threshold. In the RACH-less procedure there is no PRACH transmission, and the UL to DL correspondence may be created via the PUSCH transmission. The PUSCH resource (UL grant) may be associated to a specific DL beam. For example, the PUSCH resource of the RACH-less procedure may be associated to a specific SSB and/or CSI-RS. The wireless device may select the DL beam similar to the RACH procedure (e.g., based on the RSRP measurement being above a threshold).

The wireless device may be configured to report beam measurements in RACH-less handover to assist the target base station in setting its TX/RX beams for, for example, sending PDCCH allocating the UL grant for PUSCH transmission (e.g., Msg3), and/or receiving the PUSCH transmission, respectively. The source base station may forward the reported beam measurements to the target base station during handover preparation phase. This solution may work well as long as the reported SS/PBCH block or CSI-RS measurements are still valid when sending Msg3. However, in some cases the reported SS/PBCH blocks or CSI-RS may no longer be sufficiently strong to be detected by the wireless device, for example due to user movement, and/or variations in propagation channel (e.g., shadowing caused by obstructions). Moreover, the reported SS/PBCH or CSI-RS measurements are subject to fluctuations caused by measurement errors and small-scale fading which can lead to erroneous setting of the RX/TX beams at target base station. This is typically improved by L3 filtering and TTT, which, however, delay the measurements, i.e., the measurement may be already outdated at the moment of reporting. Failure to set properly the RX/TX beams at target base station for receiving Msg3 may lead to HO failure and to RRC re-establishment if no other action is taken by the wireless device.

In contention-free RACH access, if none of SS/PBCH blocks or CSI-RSs that are associated with dedicated RACH resources has a received signal measurement (e.g., RSRP) above a certain threshold, the wireless device may perform contention-based RACH access. The same approach may be adopted for RACH-less HO to avoid HO failure. For example, if none of the SS/PBCH blocks or CSI-RSs that are associated with UL grants, pre-allocated in the HO command or scheduled dynamically by PDCCH, have a received signal measurement above a certain threshold, the wireless device may fallback to ordinary RA procedure. The RACH to target cell can be either contention-based or contention-free depending on whether dedicated RACH resources are delivered in the HO command.

A 4-step RA procedure in FIG. 12 may have an associated latency, which may be at least (e.g., minimum of) fourteen transmission time intervals (TTI). As an example, 3GPP TR 38.804 v14.0.0 indicates a minimum latency of fourteen TTIs comprising, e.g., 3 TTIs after a message from step 1 (e.g., Msg1 1220) of a 4-step RA procedure, 1 TTI for a message from step 2 (e.g., Msg2 1230) of a 4-step RA procedure, 5 TTIs after the message from step 2, 1 TTI for a message from step 3 (e.g., Msg 3 1240) of a 4-step RA procedure, 3 TTIs after the message from step 3, and 1 TTI for a message from step 4 (e.g., contention Resolution 1250) of a 4-step procedure (e.g., 3+1+5+1+3+1=14). Reducing the number of steps in an RA procedure may reduce latency.

By using parallel transmissions, a 4-step RA procedure may be reduced to a 2-step RA procedure. A 2-step RA procedure may have an associated latency, which may be a minimum of four TTIs and which may be less than an associated latency for a 4-step RA procedure. As an example, 3GPP TR 38.804 v14.0.0 indicates a minimum latency of four TTIs comprising, e.g., 3 TTIs after a message from step 1 of a 2-step RA procedure and 1 TTI for a message from step 2 of a 2-step RA procedure.

A random access procedure (e.g., a 4-step RACH) may comprise four steps for preamble transmission (Msg1), random access response reception (RAR/Msg2), uplink data transmission with a wireless device identity (Msg3), and contention resolution (Msg4). A random access procedure may comprise only two steps, e.g., a 2-step RACH. In a 2-step random access procedure, the wireless device may transmit a preamble sequence and a data signal in one transmission (MsgA; the first step). In response to detecting a MsgA, the base station may respond to the wireless device via a MsgB. The MsgB may comprise the detected preamble index, the wireless device identity, and a timing advance. A 2-step RACH procedure my result in reduced delay for RACH transmission and/or reduced signaling overhead, for both licensed and unlicensed bands.

Figure 19:
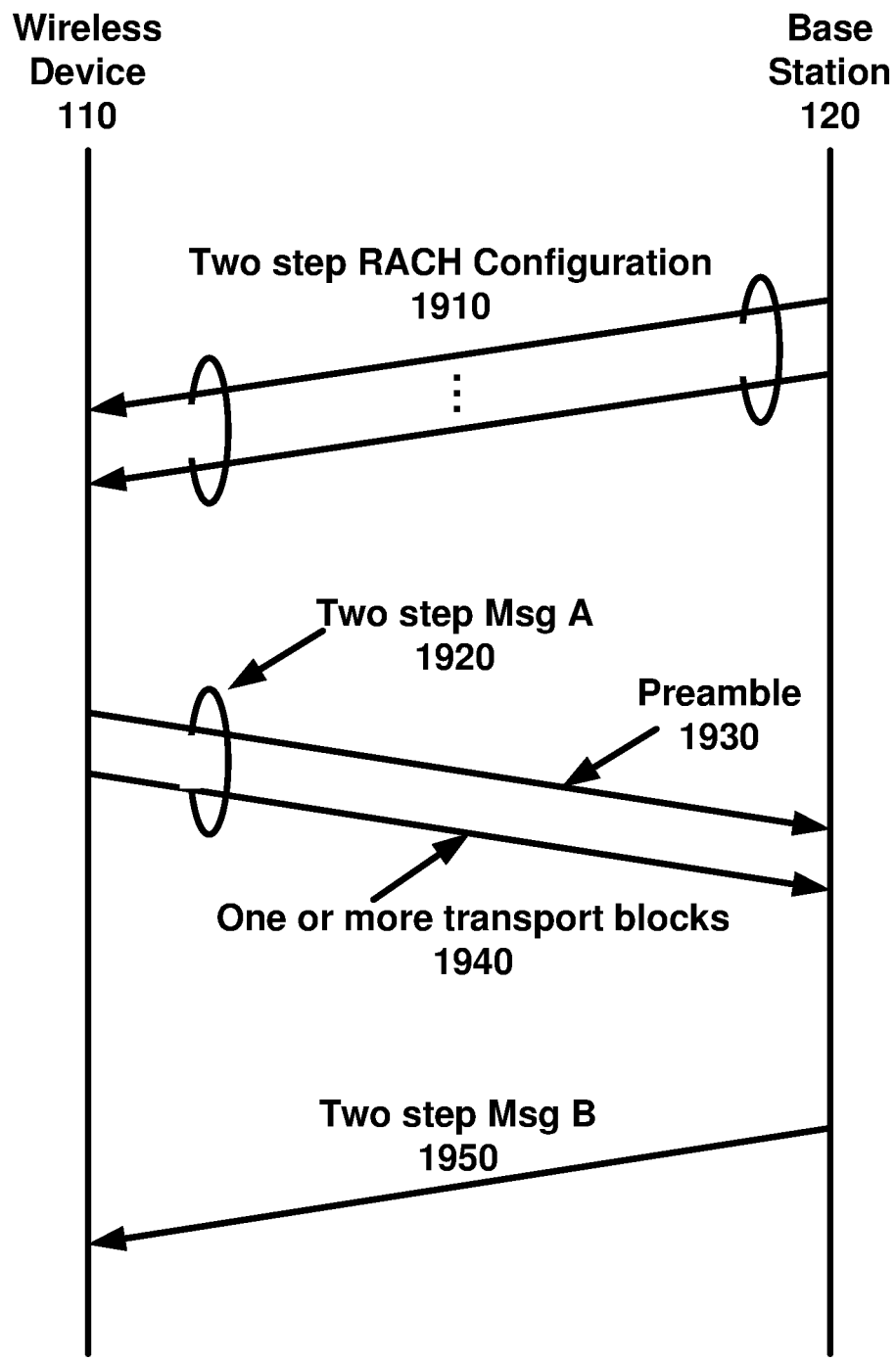
FIG. 19 is a diagram of example signaling for a 2-step RACH procedure as per an aspect of an embodiment of the present disclosure.

FIG. 19 is an example of a 2-step RA procedure that may comprise an uplink (UL) transmission of a 2-step MsgA 1920 that may comprise a random access preamble (RAP) transmission 1930 and one or more transport blocks transmission 1940, followed by a downlink (DL) transmission of a 2-step MsgB 1950 that may comprise a response, e.g., random access response (RAR), corresponding to the uplink transmission. The response may comprise contention resolution information.

2-step RACH may be able to operate regardless of whether the wireless device has a valid TA or not. 2-step RACH may be applicable to any cell size. 2-step RACH may be applied for RRC_INACTIVE and/or RRC_CONNECTED and/or RRC_IDLE states. 2-step RACH may support contention-based random access. Channel structure of MsgA may comprise preamble and PUSCH carrying payload. For example, existing PRACH preamble design may be used for 2-step RACH. For example, PUSCH including DMRS for transmission of payload of MsgA may be used for 2-step RACH. The PRACH preamble and the PUSCH in a MsgA may be TDMed. It may be important for the wireless device operating in unlicensed bands, that the gap between the preamble and PUSCH short enough such that the MsgA can be transmitted using one LBT. The PRACH preamble and/or RO and the time-frequency resource of PUSCH in MsgA plus DMRS may be mapped. The MsgA configuration in 2-step RACH may be broadcast by the base station to the wireless device (e.g., via system information) and/or configured using dedicated signaling (e.g., RRC signaling). For example, a base station may transmit one or more RRC messages to configure a wireless device with one or more parameters of a 2-step RACH configuration. The one or more RRC messages may comprise parameters required for transmitting a 2-step RACH MsgA. For example, the parameters may indicate at least one of following: PRACH resource allocation, preamble format, SSB information (e.g., total number of SSBs, downlink resource allocation of SSB transmission, transmission power of SSB transmission, and/or other information), and uplink radio resources for one or more transport block transmissions (e.g., UL grant). The same PRACH resources may be shared for 4-step RACH and 2-step RACH. 4-step RACH resources may be configured regardless whether 2-step RACH is configured or not. The configuration of 2-step RACH may reuse the configuration of 4-step RACH with one or more additional information (e.g., UL grant, and/or UL grant to SSB association, and/or UL grant to PRACH occasion mapping, and/or UL grant to preamble mapping, etc.), for example to save duplicated signaling.

Figure 20:
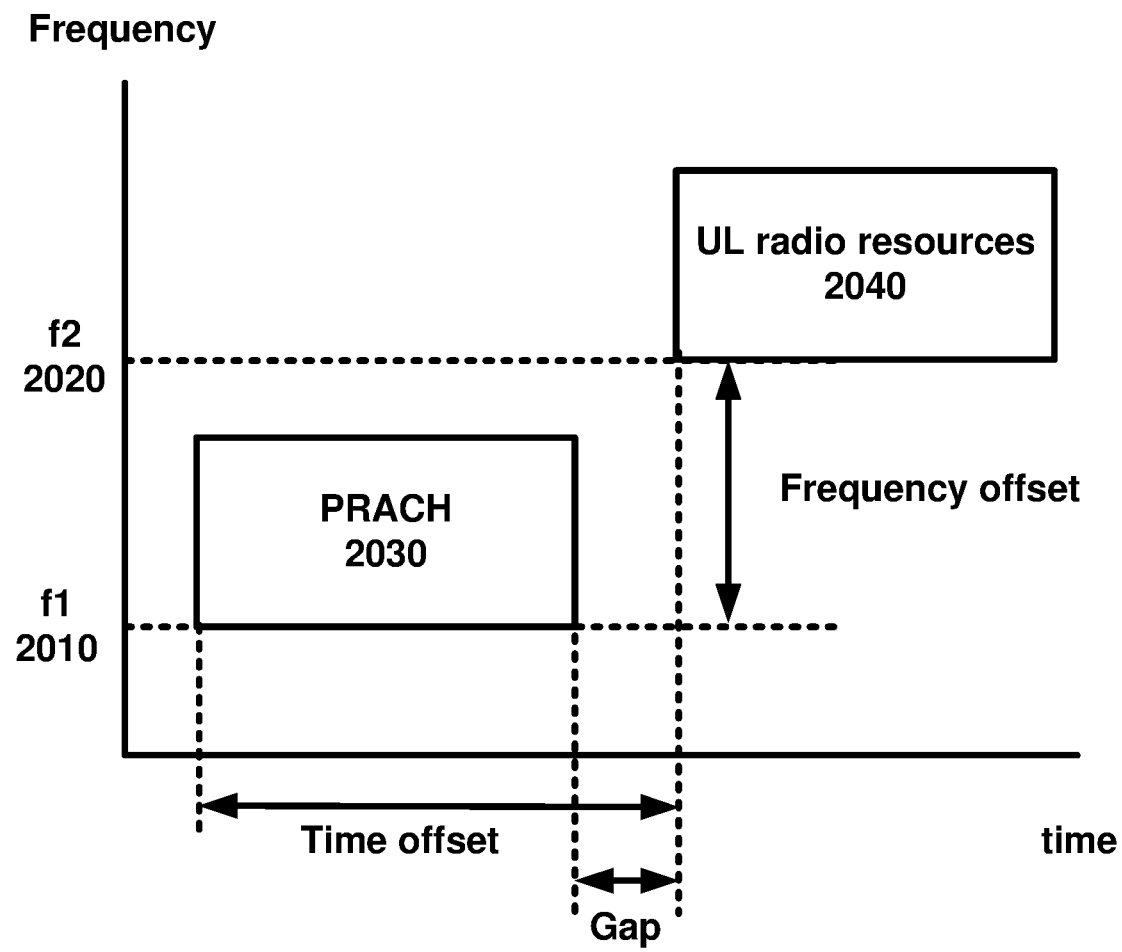
FIG. 20 is a diagram of example 2-step RACH resource allocation as per an aspect of an embodiment of the present disclosure.

FIG. 20 is an example of radio resource allocation for a 2-step RA procedure. If a frequency offset in FIG. 20 is zero, PRACH 2030 and UL radio resources 2040 may be time-multiplexed. If a time offset in FIG. 20 is zero, PRACH 2030 and UL radio resources 2040 may be frequency-multiplexed. The frequency offset in FIG. 20 may be an absolute number in terms of Hz, MHz, and GHz, and/or a relative number, e.g., one of frequency indices predefined/preconfigured. The time offset in FIG. 20 may be an absolute number in terms of micro-second, milli-second, or second and/or a relative number, e.g., in terms of subframe, slot, mini-slot, OFDM symbol.

In 2-step RACH procedure, preamble and payload may be both transmitted in MsgA. However, the receiver sensitivity for the preamble and payload may be different. Hence, it is possible that the base station may detect the preamble successfully but fail to detect the payload part, although the base station may configure the payload transmitting power offset to the preamble to compensate the different receiver sensitivity. In this situation, there may be two possible alternatives for next step: fall back to 4-step RACH, and retransmission of payload in MsgA.

Fallback from 2-step RACH to 4-step RACH procedure may work as follows: when the base station only detects the preamble and has no correct knowledge of the payload, the base station may send the content identical with the Msg2 to the wireless device at the second step. The wireless device may take the same behavior on the reception of message at second step as the Msg2 reception in 4-step RACH procedure. Once the MsgB identical with Msg2 is received by the wireless device, the wireless device may transmit the Msg3 according to the UL grant in the received RAR. The fallback mechanism may avoid the retransmission of CBRA preamble and keep the same latency of the 4-step RA procedure.

When the base station only detects the preamble and not the payload, the wireless device may retransmit the payload part from the payload PHY layer buffer based on the NACK indication in MsgB, e.g., in case the payload is not successfully decoded. The re-transmission of payload may be treated as the HARQ of payload. The payload retransmission may introduce the HARQ process for payload and introduce a new MsgC except for the Msg2 and MsgB. There may be no benefit in terms of performance latency, but the RACH procedure may become more complicated. The way of falling back to 4-step RACH may be easy and preferable. Furthermore, the wireless device may fall back to 4-step RACH when, for example, the counter of 2-step RACH MsgA failed transmission expires.

MsgB may be sent when the preamble in MsgA is detected. The content of MsgB may be different depending on whether the payload in MsgA is successfully decoded or not. For the case both the MsgA preamble and payload are successfully detected and decoded, the message of the second step is the MsgB for 2-step RACH contention resolution. The RAPID in RAR may be redundant as contention resolution ID e.g. C-RNTI disclosed in the payload may fulfill contention resolution purpose. The UL grant may be optional in this case and may be used to schedule the possible uplink data packets after the RACH procedure, for example when BSR is reported in MsgA. For the case that the preamble is successfully detected but the payload is not successfully decoded, the wireless device may fall back to 4-step RACH, where the message of second step may be identical to Msg2, comprising RAR that indicates RAPID and a TC-RNTI, and an UL grant for Msg3. The wireless device may alternatively retransmit the payload in MsgA. In this case a NACK may be indicated in the message of the second step. The message may further comprise an UL grant for retransmission, TA (timing advance) command, TC-RNTI, power control command and other HARQ information if necessary.

Triggers for 4-step RACH may be applied for 2-step RACH as well. The most promising use cases for 2-step RACH may comprise unlicensed band, small cell, and handover. In unlicensed band, a wireless device may need to perform LBT before accessing the channel. When the 4-step RACH is adopted, there may be multiple LBT at either wireless device and/or base station side, which also results in higher channel access failure probability during random access procedure. Therefore, it is important to simplify RACH procedure to reduce the number of LBT in unlicensed band. 2-step RACH was proposed to apply for unlicensed band. Different from the 4-step RACH, the simplified procedure of 2-step RACH can be beneficial to complete RACH procedure more quickly. In a small cell, the transmission propagation delay of the wireless devices may be small, such that it may be compensated by normal CP for data transmission. In such case, 2-step RACH can be useful to reduce the signaling overhead of RACH procedure. Besides, there may be no TA issue for wireless devices operating in small cell, for example because TA is zero/negligible. For these wireless devices, 2-step RACH may be beneficial to quickly get ready for data transmission. Moreover, in unlicensed band, small cells are most likely to be deployed. Therefore, 2-step RACH may be most promising in this case.

When a wireless device is during a handover, the TA of target cell may be informed by network in the HO command, e.g. if the wireless device is handing over from SCell to PCell. In this case, there may be no TA issue for the wireless device and TA may not be necessary to obtain by RACH procedure. Therefore, 2-step RACH may be beneficial to quickly complete the handover procedure. For example, 2-step RACH with PUSCH only in MsgA may be considered. However, considering the cell range may not be limited, the TA may be useful when using the 2-step RACH. The wireless device may omit the preamble in MsgA when, for example, the wireless device receives the TA value of the target cell during the handover. So, MsgA may only consist of the PUSCH payload when, for example, the TA is acquired by the HO command. The design of 2-step RACH may be reused for the 2-step RACH without preamble (RACH-less or RACH-skip), retaining the benefit of low latency. MsgA in 2-step RACH may comprise PRACH preamble and PUSCH. MsgA in 2-step RACH may comprise PUSCH.

The base station may perform beam sweeping to receive the PUSCH transmission of MsgA. For PUSCH transmission of MsgA, beam correspondence may need to be addressed, for example to avoid beam sweeping. It may be necessary for FR2 to associate the PUSCH of MsgA and the received SSB. For FR1, although wide beam may be used, association between the time and frequency resource of the PUSCH (PUSCH occasion) and SSB may be beneficial for the base station, because it may reduce the power consumption for beam sweeping. The PUSCH occasion may be associated with a given SSB. The association between SSB and PUSCH occasion may be configured by SIB/MIB. The beam or SSB index information may be explicitly carried in the payload in MsgA, however, the base station may not be able to decide the right beam of Msg2/MsgB in case the payload is not successfully decoded.

2-steop RACH may support short and long PRACH preamble formats. 2-step RACH may support PRACH configuration with multiple ROs within a PRACH slot. 2-step RACH may support PRACH preamble mapping to multiple PUSCH allocations, where the PUSCH allocations may be FDM and/or TDM. 2-step RACH may support PRACH and PUSCH in a single slot. One or more PRACH preambles may be mapped to one DMRS. The base station may use DMRS of the PUSCH in MsgA for channel estimation. The base station may use the PRACH preamble for channel estimation of the PUSCH in MsgA when, for example, the PRACH and the PUSCH resources are close in time and/or frequency. Thus, the base station may detect whether the DMRS collided, and thus, whether to use the DMRS for the channel estimation, for example, based on the detected PRACH preamble. The ratio of the PRACH/DMRS used in the mapping of the PRACH preambles to the PUSCH DMRS may be selected based on the proximity of the PRACH and the PUSCH resources. One or more preambles may be mapped to a PUSCH in a unique time and frequency resource. This may reduce the likelihood of failed PUSCH decoding due to collision but may increase the 2-step RACH physical layer overhead in the uplink.

A wireless device may be configured with a 4-step RACH configuration regardless of whether 2-step RACH configuration exists or not. Thus, when the base station configures the wireless device with both 4-step and 2-step RACH resources, the wireless device may need to select know which type of RACH to use to initiate a RACH procedure. The base station may indicate which type of PRACH to use to the wireless device, and/or the wireless device may select which type of PRACH to use based on, for example, the trigger event, and/or prioritized rule, etc. It may not matter to the network which type of RACH the wireless device selects, for example because trigger events of 2-step and 4-step RACH may be the same, and/or cell radiuses supported by 2-step and 4-step RACH may be the same. Therefore, the wireless device may select whether to initiate a 2-step RACH or 4-step RACH (e.g. in initial access), and the base station may give assistive guide and/or some predefined rule to help the wireless device make the selection. The wireless device supporting 2-step RACH may always select 2-step RACH as long as a received target power for the preamble and PUSCH transmission may be achieved. The wireless device may select between a 2-step RACH and a 4-step RACH based on RSRP. The wireless device may select 2-step RACH, for example in case the measured RSRP exceeds a threshold (e.g., a pre-defined or a pre-configured threshold). The base station may select 4-step RACH, for example in case the measured RSRP is below the threshold.

In a RACH-less (RACH-skip) handover procedure, RRC reconfiguration message may comprise parameters to indicate multiple candidate beams configured with resources for RACH-less handover. The parameters may comprise a TA value for the uplink timing alignment of the wireless device with the target base station. The resources for RACH-less handover may comprise one or more physical uplink channel (PUSCH) resources in time and frequency domain. The wireless device may transmit one or more transport blocks (comprising, for example, RRC reconfiguration complete message, and/or contention resolution identity of the wireless device, and/or uplink data, etc.) using the one or more PUSCH resources and based on the TA value to the target base station. However, the PUSCH transmissions may fail. For example, the target base station may not be able to decode the PUSCH transmissions comprising the one or more transport blocks. PUSCH transmission failure may be due to, for example, channel degradation, and/or beam expiration, and/or low transmission power, and/or interference caused by timing unalignment and TA expiration, etc.

In existing solutions, the wireless device may perform power ramping and retransmit the one or more transport blocks via configured PUSCH resources for RACH-less HO. However, PUSCH retransmissions may continue to fail as long as the configured UL grants and/or the TA value are associated with the candidate beams that may not be valid anymore. For example, the wireless device may move or rotate during the handover such that it ends up in a different DL beam, and the candidate beams configured via RRC message may not be valid anymore. For example, the wireless device may move out of the coverage area of the configured beams. The configured TA value may not be valid. For example, the cell size may not be small enough for the TA to be zero/negligible. In most cases, the source cell may not know the TA of the target cell, for example in asynchronous deployments. The TA may be location dependent. A fixed configured TA value associated with a beam may be accurate enough, for example, as long as the diameter of the beam/TRP coverage is less than an equivalent distance of the cyclic prefix duration. So, the timing inaccuracy offset from the configured TA at any location within the coverage may be tolerated by CP. For example, the wireless device may move during a handover procedure such that the configured TA may not be tolerated by CP, and thus, not valid. Therefore, PUSCH retransmission may not be a proper solution for RACH-less procedure failure. In this situation, power ramping and increasing UL power may not only fail to help with the PUSCH transmission, but may also introduce significant interference to other wireless devices in the target cell, and considerably increase the wireless device power consumption without resulting in handover success.

In existing solutions, the wireless device may run a timer and/or counter for PUSCH retransmissions. The wireless device may consider the RACH-less procedure has failed if, for example, the timer and/or counter expires without receiving a downlink control information (e.g., PDCCH addressed to the wireless device identifier (e.g., C-RNTI)) from the target base station. The wireless device may fall back to a random access (RACH) procedure when the RACH-less procedure fails. However, the delay due to PUSCH retransmissions may result in an increased latency and/or mobility interruption time, which may lead to handover failure. The problem may be more challenging in unlicensed bands, where the wireless device may perform LBT and find the channel busy and not succeed in transmitting/retransmitting PUSCH in the pre-configured resources, resulting in significantly increased latency in the RACH-less HO procedure. Also, PUSCH retransmissions may be unnecessary and only increase the wireless device power consumption without resulting in handover success, for example when the wireless device moves out of the coverage area of the configured beams, and/or the configured TA is not valid.

Additionally, the fallback random access procedure may also fail, because, for example, the configured RACH resources may be associated with the one or more candidate beams that may not be valid due to the wireless device mobility. As a result, the increased latency in accessing the target base station and/or mobility interruption time may lead to handover failure and/or an RLF condition.

In existing solutions, the target base station may configure RACH-less PUSCH resources on a plurality of (e.g. all) DL beams. For example, the RACH-less resource allocation may be such that one or more PUSCH resources are associated with one or more SSBs, covering the plurality of DL beams. In that case, if the wireless device moves out of the coverage area of one or more configured (via a dedicated (e.g. RRC) signaling) beams, the wireless device may continue the handover procedure with PUSCH (and/or preamble e.g. in case of fallback) transmission on the other candidate beams. For example, PUSCH (and/or PRACH) resources on the plurality of beams may be configured via common/broadcast system information. For example, the target base station may perform beam sweeping in the UL RX direction during a RACH-less handover procedure. For example, the target base station may perform RX sweeping in the pre-allocated PUSCH resources on the plurality of beams in order to receive the UL transmissions. However, the UL RX beam sweeping may result in long interruption time and extra signaling overhead that may not be possible to implement. In existing radio access technologies (e.g., 4G and/or 5G), configuration of all types of resources (e.g., RACH-less PUSCH resources, and/or 2-step RACH resources, and/or 4-step RACH resources) on a plurality of (e.g. all) beams may not be feasible.

The likelihood of a wireless device moving out of the coverage area of configured beams may be high, for example in high mobility and/or high frequency scenarios. Consequently, the likelihood of PUSCH (re)transmission failure in a RACH-less HO may be high. On the other hand, when the wireless device falls back to RACH procedure, the RACH related latencies may result in intolerable mobility interruption time, and/or handover failure, and/or RLF. There is still a need to reduce the long delay in accessing the target cell during a handover procedure to avoid situations such as handover failure and/or RFL conditions. It may be of interest to design a mechanism that enables RACH-less (RACH-skip) handover procedure and at the same time, resolves and/or avoids RACH-less procedure failure caused by mobility in multi-beam operation scenarios.

Example embodiments may provide a selection mechanism of the wireless device, when accessing to a target cell, between a RACH-less procedure and a RACH procedure depending on radio status of the wireless device. Based on the selection mechanism, the wireless device may reduce the handover delay and/or the power consumption by using the RACH procedure for the handover when the radio quality is not good enough to perform a RACH-less handover.

Embodiments of the present disclosure may provide one or more mechanisms and/or parameters to enhance accessing a target cell within a handover procedure, especially in multi-beam operation deployments. Embodiments of the present disclosure may improve a likelihood that an access procedure is successfully completed in a timely manner, resulting in an enhanced handover performance with low mobility interruption time, low latency, and high reliability. Thereby, a battery power consumption of the wireless device may be improved.

As per one or more embodiments of the present disclosure, a wireless device may select an access procedure during a handover procedure. For example, the wireless device may select a RACH-skip (RACH-less) handover procedure or a RACH-based (RACH) handover procedure. The wireless device may perform the selection based on one or more criteria. For example, the wireless device may select the access procedure based on a measured power (e.g., RSRP) of one or more downlink reference signals of a target base station. For example, the one or more downlink reference signals may be associated with one or more beams of the target base station. For example, the wireless device may select the access procedure based on a presence of a TA value in the handover command (RRC reconfiguration message). For example, the wireless device may select the access procedure based on validation of the TA provided in the handover command. For example, in an unlicensed band deployment, the wireless device may select the access procedure based on a received signal strength indication (RSSI).

A wireless device may receive from a first (source) base station, one or more RRC messages comprising a handover command. The one or more RRC messages may indicate one or more downlink reference signals (e.g., SSBs and/or CSI-RSs) of a second (target) base station (beams configured via dedicated signaling). The wireless device may measure a received power of a plurality of downlink reference signals of the target base station, comprising the one or more downlink reference signals (RSRP), before and/or after receiving the one or more messages. For example, the wireless device may send measurement reports to the source base station. For example, the target base station may indicate the one or more downlink reference signals based on the measurement reports forwarded from the source base station. The one or more RRC messages may indicate a threshold. The wireless device may compare the RSRP of the one or more downlink reference signals with the threshold. The wireless device may determine whether the received power of at least one downlink reference signal of the one or more downlink reference signals is above the threshold. The wireless device may select an access procedure for the handover procedure based on the result of the determining. For example, the wireless device may select one of a RACH-skip procedure or a RACH procedure to access a target cell of the target base station. The wireless device may perform the handover to the target cell using the selected access procedure, e.g., one of the RACH-skip procedure and/or the RACH procedure.

The wireless device may measure the received power of the one or more downlink reference signals and determine that the received power of at least one downlink reference signal of the one or more downlink reference signals is above the threshold (e.g., pre-defined and/or pre-configured). The wireless device may select the RACH-skip procedure based on the determining. For example, the one or more RRC messages may comprise configuration parameters of one or more uplink channel resources associated with the at least one downlink reference signal. The one or more RRC messages may comprise a wireless device identifier (e.g., a C-RNTI). The one or more uplink channel resources may comprise one or more time resources and one or more frequency resources. The one or more RRC messages may indicate a timer value (e.g., T304). The wireless device may start a timer (a handover timer) in response to receiving the one or more RRC messages and for a duration indicated by the timer value. The one or more RRC messages may comprise a TA for the target cell that the wireless device may use for the target PTAG of handover. For example, the TA may be zero, and/or equal to the latest TA value of the PTAG associated with MCG, and/or equal to the latest TA value of the PTAG associated with SCG, and/or equal to the latest TA value of the MCG STAG indicated by the STAG Id, and/or equal to the latest TA value of the SCG STAG indicted by the STAG Id. The wireless device may synchronize in the UL direction to a timing of the target base station based on the TA.

In the RACH-skip handover procedure, the wireless device may transmit to the target cell, one or more transport blocks via the one or more uplink channel resources. For example, the one or more transport blocks may comprise the RRC reconfiguration complete message. The one or more uplink channel resources may be dedicated resources configured via RRC signaling and associated to the at least one downlink reference signal (e.g., SSB) whose received power is above the threshold. Therefore, the uplink transmission is sent via an UL beam corresponding to a DL beam that may be directed towards the wireless device. Thus, a likelihood of a successful transmission of the one or more transport blocks may be high. So, the target base station may successfully receive and decode the one or more transport blocks.

The one or more RRC messages may further comprise configuration parameters indicating one or more downlink control channels comprising one or more monitoring occasions, and a monitoring window. The one or more downlink control channels may be associated with the at least one downlink reference signal. For example, demodulation reference signal antenna port associated with the reception of the one or more downlink control channels may be quasi co-located with the at least one downlink reference signal. The wireless device may monitor the one or more monitoring occasions in response to (e.g., after) transmitting the one or more transport blocks. The wireless device may monitor during the monitoring window for a downlink control information (e.g., a PDCCH addressed to the wireless device identifier (e.g., C-RNTI)). The wireless device may receive the downlink control information via the one or more downlink control channels. The wireless device may receive the downlink control information from the target cell based on the wireless device identifier.

The wireless device may determine, based on the received downlink control information, that the handover procedure is successfully completed. For example, the MAC entity of the wireless device may indicate successful reception of the downlink control information addressed to the wireless device identifier. The wireless device may then stop the timer (the handover timer, e.g. T304) in response to receiving the downlink control information. The wireless device may release the one or more uplink channel resources in response to the handover procedure being successfully completed.

The wireless device may measure the received power of the one or more downlink reference signals and determine that the received power of at least one downlink reference signal of the one or more downlink reference signals is not above the threshold (e.g., pre-defined and/or pre-configured). For example, none of the configured beams associated with the one or more downlink reference signals may have RSRP above the threshold, e.g., due to the wireless device mobility and/or rotation. The wireless device may select the RACH procedure based on the determining.

The one or more RRC messages may further indicate a plurality of downlink reference signals (e.g., all SSBs) of the target base station, comprising the one or more (dedicated) downlink reference signals. The one or more RRC messages may further comprise: configuration parameters of one or more random access channel resources associated with the plurality of downlink reference signals (e.g., common random access resources); a plurality of indices of preambles associated with the plurality of downlink reference signals;

and a wireless device identifier (e.g., C-RNTI, and/or RA-RNTI, and/or TC-RNTI). The one or more random access channel resources may comprise one or more time resources, and one or more frequency resources, and one or more preamble sequences. The one or more RRC messages may indicate a timer value (e.g., T304). The wireless device may start a timer (a handover timer) in response to receiving the one or more RRC messages and for a duration indicated by the timer value. The one or more RRC messages may comprise a TA. The wireless device may or may not synchronize in the UL direction to a timing of the target base station based on the TA. For example, the wireless device may not synchronize if the TA is not validated.

A wireless device may initiate a random access procedure in a cell. For example, the random access procedure may be initiated by a PDCCH order, and/or by the MAC entity of the wireless device, and/or by RRC (e.g. during a handover procedure). The wireless device may select a random access type selection between a 2-step random access and a 4-step random access when initiating a random access procedure. In some existing technologies, the wireless device may always select 2-step random access. For example, the wireless device may fall back to 4-step random access if 2-step random access is not available (e.g. 2-step random access resources are not configured). However, a fallback procedure may result in increased latency during the random access procedure and may not be desired. For example, the wireless device may switch to a different BWP with configured 2-step random access resources if 2-step random access is not available in the current active BWP (e.g. 2-step random access resources are not configured on the active UL BWP). However, BWP switching may result in increased latency as well as undesired power consumption for the wireless device, and may not be desired from a network perspective (e.g. may result in increased congestion in a common BWP). So it may not be desired to always select (start off with) 2-step random access.

Existing technologies, the wireless device may select the random access type between 2-step random access and 4-step random access based on received signal strength. For example, the wireless device may select a 2-step random access if a measured RSRP of a downlink reference signal is above a threshold. For example, the wireless device may select a 4-step random access if a measured RSRP of a downlink reference signal is below or equal to the threshold. However, this random access type selection may not be efficient and may lead to a waste of radio resources. For example, the wireless device does not take configurations into account when selecting the random access type. For example, the wireless device may select 4-step random access based on the RSRP being below the threshold, even though dedicated (UE-specific) RACH resources for 2-step random access are configured for the wireless device. This may result in waste of dedicated resources and/or increased latency due to the extra signaling of the 4-step random access procedure compared to the 2-step random access procedure. Following, the existing technology, the wireless device may go back and forth between 2-step and 4-step random access types during a random access procedure depending on the RSRP measurements. However, since parameters of 2-step and 4-step random access are separately configured and maintained within the wireless device processor, every time the wireless device switches the random access type, it may have to reset/reconfigure the configurations and/or parameters (e.g. counters and/or timers, etc.), which yields to increased inefficiency and/or latency.

Existing technologies may not specify random access type selection for initiating a random access procedure when the wireless device is configured with dedicated resources (e.g. contention-free random access (CFRA) resources). Random access type selection based on merely RSRP may cause a wireless device to select 4-step CBRA over 2-step CFRA or unnecessary BWP switching when the selected random access type resources are not configured/available, which at least yields to increased latency and/or waste of resources. It may be of interest in wireless systems to implement and enable a random access type selection that takes dedicated configurations into account.

One or more embodiments of the present disclosure provide the wireless device with a selection mechanism between a 2-step random access type and a 4-step random access type when a random access procedure is initiated. Based on the one or more embodiments, the wireless device may select a 2-step random access type if dedicated random access resources for 2-step RACH (e.g. 2-step CFRA resources) are configured for the active UL BWP. Based on the one or more embodiments, the random access type selection may be independent of the RSRP measurements when 2-step CFRA resources are configured for the wireless device. Embodiments may result in avoiding unnecessary BWP switching for initiating a random access procedure and/or switching back and forth between 2-step random access and 4-step random access during a random access procedure based on RSRP measurements, and thus result in reducing a latency associated with random access procedure.

For example, a measured RSRP may be below the threshold, but when dedicated 2-step random access (2-step contention-free random access (CFRA)) resources are configured for the wireless device, even if the transmission of the transport block of MsgA may fail due to bad channel condition, the base station may still be able to successfully receive the preamble part of MsgA, since the MsgA resources are dedicated. For example, a likelihood of successful transmission of preamble part of MsgA may be higher than the transport block part of it (e.g. because preamble is a sequence but transport block is a modulated signal). For example, the base station may configure a dedicated (CFRA) preamble and RACH occasion for MsgA transmission of the wireless device, and by receiving the dedicated preamble, the base station may be able to identify the wireless device based on the dedicated preamble, and may respond to the preamble transmission. Thus, the random access procedure may survive even though the transport block transmission of MsgA may fail. So, according to the embodiments of the present disclosure, when 2-step CFRA resources are configured, the wireless device may select 2-step random access type, e.g. irrespective of RSRP measurements.

The RACH procedure selected for the handover procedure may be a 2-step RACH procedure or a 4-step RACH procedure. For example, the wireless device may select the 2-step RACH procedure in response to a presence and/or validation of the TA. For example, the wireless device may select the 4-step RACH in response to an absence and/or invalidation of the TA. For example, the wireless device may always select the 2-step RACH, if configured. For example, the wireless device may select the 2-step RACH as long as the target received power of the preamble and the PUSCH may be available.

The wireless device may select the 4-step RACH for the handover procedure. For example, the wireless device may not be able to supply transmission power for preamble and PUSCH transmissions. For example, the wireless device may not have/validate a TA value for PUSCH transmission. The wireless device may select a downlink reference signal among the plurality of downlink reference signals indicated by the one or more RRC messages. For example, the received power of the downlink reference signal may be above a second threshold (e.g. configured by the one or more RRC messages). The wireless device may select a preamble among the preambles. For example, the index of the preamble may be associated with the downlink reference signal. The wireless device may transmit the preamble to the target cell, via at least one random access channel resource of the one or more random access channel resources. The at least one random access channel resource may be associated with the downlink reference signal, for example, by a mapping parameter comprised in the one or more RRC messages (e.g., PRACH configuration index and/or PRACH mask index). The at least one random access channel resource may be a dedicated and/or a common resource. Transmitting a preamble via dedicated and/or common PRACH resources may increase the likelihood of accessing the target base station, for example because the preamble transmission is more reliable and more immune to interference than the PUSCH transmission, and the target base station may have higher probability to receive it successfully. So, the handover procedure may survive/succeed even in scenarios that the beam configuration may not be valid due to mobility. For example, a power consumption of the wireless device may be saved and not wasted on useless PUSCH transmissions for a RACH-less and/or a 2-step RACH procedure.

The one or more RRC messages may further comprise configuration parameters indicating one or more downlink control channels comprising one or more monitoring occasions; and a monitoring window (e.g., RAR window). The one or more downlink control channels may be associated with the downlink reference signal. For example, demodulation reference signal antenna port associated with the reception of the one or more downlink control channels may be quasi co-located with the downlink reference signal. The wireless device may monitor the one or more monitoring occasions in response to (e.g., after) transmitting the preamble. The wireless device may monitor during the monitoring window for a downlink control information (a PDCCH addressed to the wireless device identifier, e.g., RAR message). The wireless device may receive the downlink control information via the one or more downlink control channels. The wireless device may receive the downlink control information from the target cell based on the wireless device identifier.

The wireless device may determine, based on the received downlink control information, that the handover procedure is successfully completed. For example, the MAC entity of the wireless device may indicate successful reception of the downlink control information addressed to the wireless device identifier. The wireless device may then stop the timer (the handover timer, e.g. T304) in response to receiving the downlink control information. The wireless device may release the one or more random access channel resources in response to the handover procedure being successfully completed.

In response to determining that none of the (configured/dedicated) one or more downlink reference signals have RSRP above the threshold, the wireless device may select the 2-step RACH (MsgA, e.g., PRACH and PUSCH) for the handover procedure. For example, the wireless device may be able to supply transmission power for preamble and PUSCH transmissions. For example, the wireless device may have a valid TA value.

The one or more RRC messages may further comprise configuration parameters of one or more uplink channel resources associated with the downlink reference signal. The one or more uplink channel resources may be associated with the one or more random access channel resources and/or preambles. For example, the one or more RRC messages may comprise one or more parameters that indicate at least one mapping between an uplink channel resource (PUSCH occasion) and a RACH occasion (RO) and/or preamble. For example, single and/or multiple PUSCH occasions may be mapped to single and/or multiple ROs and/or preambles. For example, the one or more random access channel resources may be available/configured for 4-step RACH preamble (Msg1) transmissions. For example, the one or more uplink channel resources may be available/configured for RACH-less PUSCH transmissions.

The wireless device may select a downlink reference signal among the plurality of downlink reference signals indicated by the one or more RRC messages. For example, the received power of the downlink reference signal may be above the second threshold (e.g. configured by the one or more RRC messages). The wireless device may select a preamble among the preambles. For example, the index of the preamble may be associated with the downlink reference signal. The wireless device may determine a at least one random access channel resource (RO) among the one or more random access channel resources. The at least one random access channel resource may be associated with the downlink reference signal, for example, by a mapping parameter comprised in the one or more RRC messages (e.g., PRACH configuration index and/or PRACH mask index). The at least one random access channel resource may be a dedicated and/or a common resource. The wireless device may determine at least one uplink channel resource (PUSCH occasion, PO) among the one or more uplink channel resources. The at least one uplink channel resource may be associated with the at least one random access channel resource and/or the preamble, for example, by a mapping parameter comprised in the RRC message. The at least one uplink channel resource may be a dedicated and/or a common resource.

The one or more RRC messages may configure the wireless device with a TA value, for example, the TA may be zero, or equal to the TA of a serving cell. The wireless device may estimate/determine the TA value based on one or more measurements. The PRACH resource (RO) and the PUSCH resource (PO) may be TDMed. The wireless device may synchronize to the target base station using the TA prior to transmitting MsgA (e.g., the preamble and/or the PUSCH). The wireless device may transmit the preamble and the PUSCH (MsgA) using the configured TA value. The wireless device may transmit the preamble and/or the PUSCH using a zero value for TA (unsynchronized/unaligned timing/no time adjustment). The wireless device may transmit the preamble using a zero value for TA, and the PUSCH using a configured TA value indicated via the one or more RRC messages. The wireless device may transmit the preamble using a zero value for TA, and the PUSCH using a second TA value. The second TA value may depend on the configured TA value and/or the gap/time interval between the PRACH resource and the PUSCH resource in MsgA. An example of the gap is shown in FIG. 20. For example, if the configured TA is equal to or greater than the gap, the second TA value may be zero. For example, if the configured TA is equal to or greater than the gap, the second TA value may be equal to the gap. For example, if the configured TA value is equal to or greater than the gap, the second TA value may be a value between zero and the size of the gap. For example, if the configured TA value is less than the gap, the second TA value may be the configured TA value. The second TA value may be determined base on the wireless device capability.

The wireless device may transmit to the target cell, the preamble via the at least one random access channel resource, and one or more transport blocks via the at least one uplink channel resource. Transmitting the preamble with the PUSCH via dedicated and/or common resources may increase the likelihood of accessing the target base station. For example, because the preamble transmission is more reliable and immune to interference and may be used as a power reference signal (in the same way as DMRS, which may be subject to error and/or interference) for receiving and decoding PUSCH at the base station. So, the target base station may have higher probability to receive the PUSCH transmission successfully, and the handover procedure may succeed even in scenarios that the beam configuration may not be valid due to mobility. For example, when the wireless device can supply the transmission power of the preamble and the PUSCH, it may transmit both (2-step RACH MsgA). In this case, the PUSCH transmission may survive and/or RACH-less fallback may be avoided and/or unnecessary PUSCH re-transmissions may be avoided. Therefore, the latency of the handover and/or the mobility interruption time may be reduced, and the likelihood of handover success may be increased.

The one or more RRC messages may further comprise configuration parameters indicating one or more downlink control channels comprising one or more monitoring occasions, and a monitoring window. The one or more downlink control channels may be associated with the downlink reference signal. For example, demodulation reference signal antenna port associated with the reception of the one or more downlink control channels may be quasi co-located with the downlink reference signal. The wireless device may monitor the one or more monitoring occasions in response to (e.g., after) transmitting the preamble and/or the PUSCH (e.g., MsgA and/or Msg1). The wireless device may monitor during the monitoring window for a downlink control information (a PDCCH addressed to the wireless device identifier, e.g., RAR message and/or MsgB). The wireless device may receive the downlink control information via the one or more downlink control channels. The wireless device may receive the downlink control information from the target cell based on the wireless device identifier.

The wireless device may determine, based on the received downlink control information, that the handover procedure is successfully completed. For example, the MAC entity of the wireless device may indicate successful reception of the downlink control information addressed to the wireless device identifier. The wireless device may then stop the timer (the handover timer, e.g. T304) in response to receiving the downlink control information. The wireless device may release the one or more random access channel resources and/or the one or more uplink channel resources in response to the handover procedure being successfully completed.

The wireless device may select the access procedure between RACH-less (RACH-skip) and RACH (e.g., 2-step RACH) during a handover procedure, for example based on the RSRP of the one or more (configured) downlink reference signals. The wireless may determine whether to transmit a preamble with/prior to the PUSCH transmission or not, for example depending on whether the configured beams are good/valid or not during the handover. Therefore, a delay/latency of the handover procedure may be reduced by shortening the access procedure and avoiding RACH-related latencies and/or PUSCH retransmissions latencies. Besides, no PRACH transmission in MsgA (RACH-less procedure) may save power consumption of the wireless device when preamble transmission is not necessary.

Figure 21:
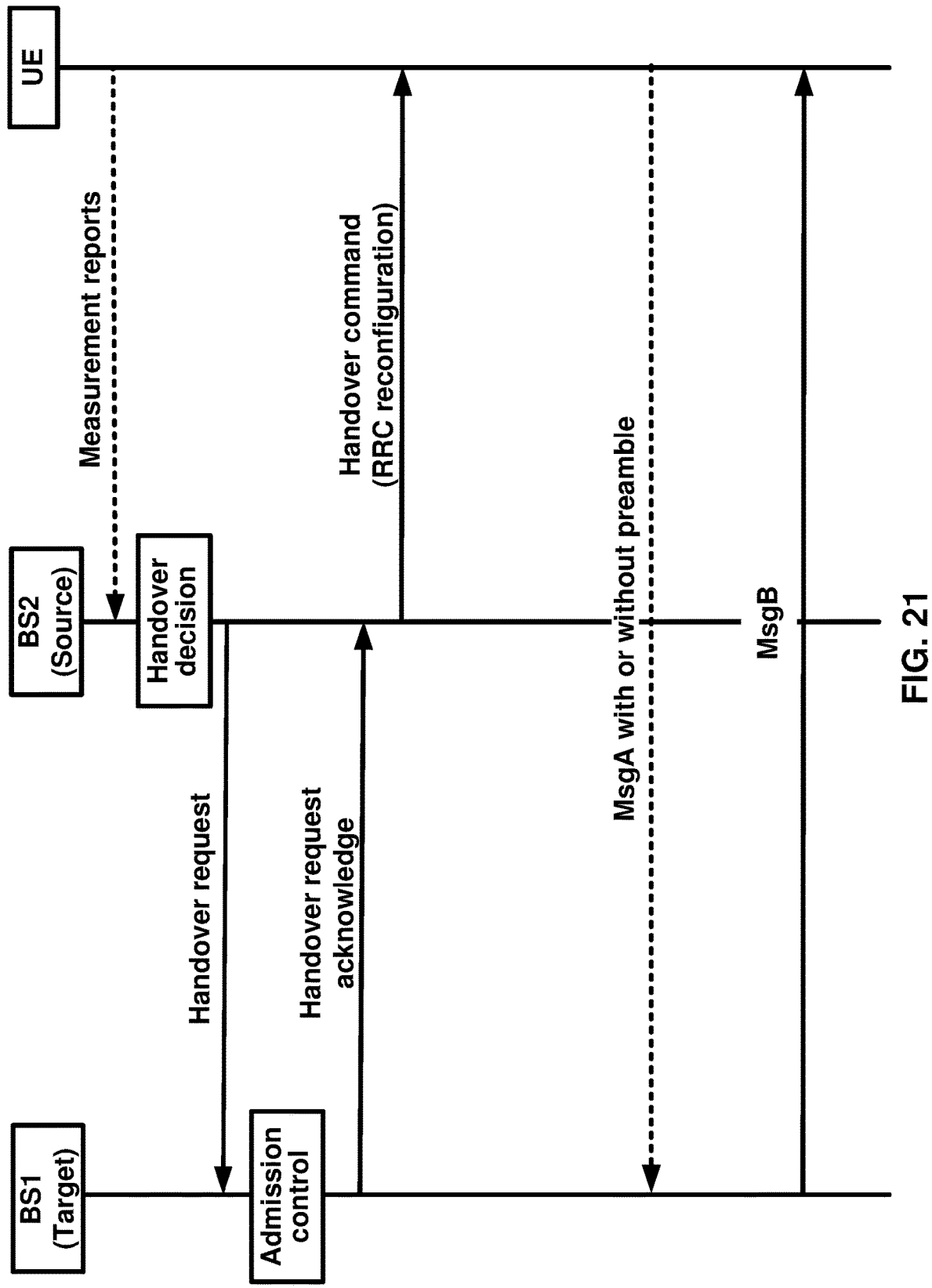
FIG. 21 is a diagram of example signaling for handover procedure with or without preamble transmission as per an aspect of an embodiment of the present disclosure.

FIG. 21 shows an example where a wireless device transmits measurement reports to a source base station. The source base station may decide a handover is required, for example based on the measurement reports. The source base station may send a handover request message to a target base station. The target base station may perform an admission control process and may confirm the handover request by sending a handover request acknowledgement, comprising RRC reconfiguration message, to the source base station. The source base station then forwards the RRC reconfiguration message (handover command) to the wireless device. The wireless device may be configured via he RRC reconfiguration message with parameters of one or more PRACH resources and/or one or more PUSCH resources (UL grants) of the target cell. The wireless device may select an access procedure from one of a RACH-skip (PUSCH transmission only) procedure or a RACH (Preamble and/or PUSCH transmission) procedure. The wireless may transmit a MsgA with or without a preamble to the target base station, via the one or more PRACH resources and/or the one or more PUSCH resources. For example, the wireless device may transmit the MsgA with the preamble if the wireless device selects the RACH (e.g., 2-step RACH) procedure. For example, the wireless device may transmit the MsgA without the preamble if the wireless device selects the RACH-skip procedure. The target base station may transmit a MsgB to the wireless device. The content of MsgB may depend on the content of MsgA and/or a reception of the preamble and/or the PUSCH in MsgA. For example, in case the PUSCH is not successfully received and/or decoded by the target base station, MsgB may comprise one or more UL grants (similar to RAR) and/or a TA. The wireless device may synchronize (e.g., in the UL direction based on the TA value) to the target cell.

Figure 22:
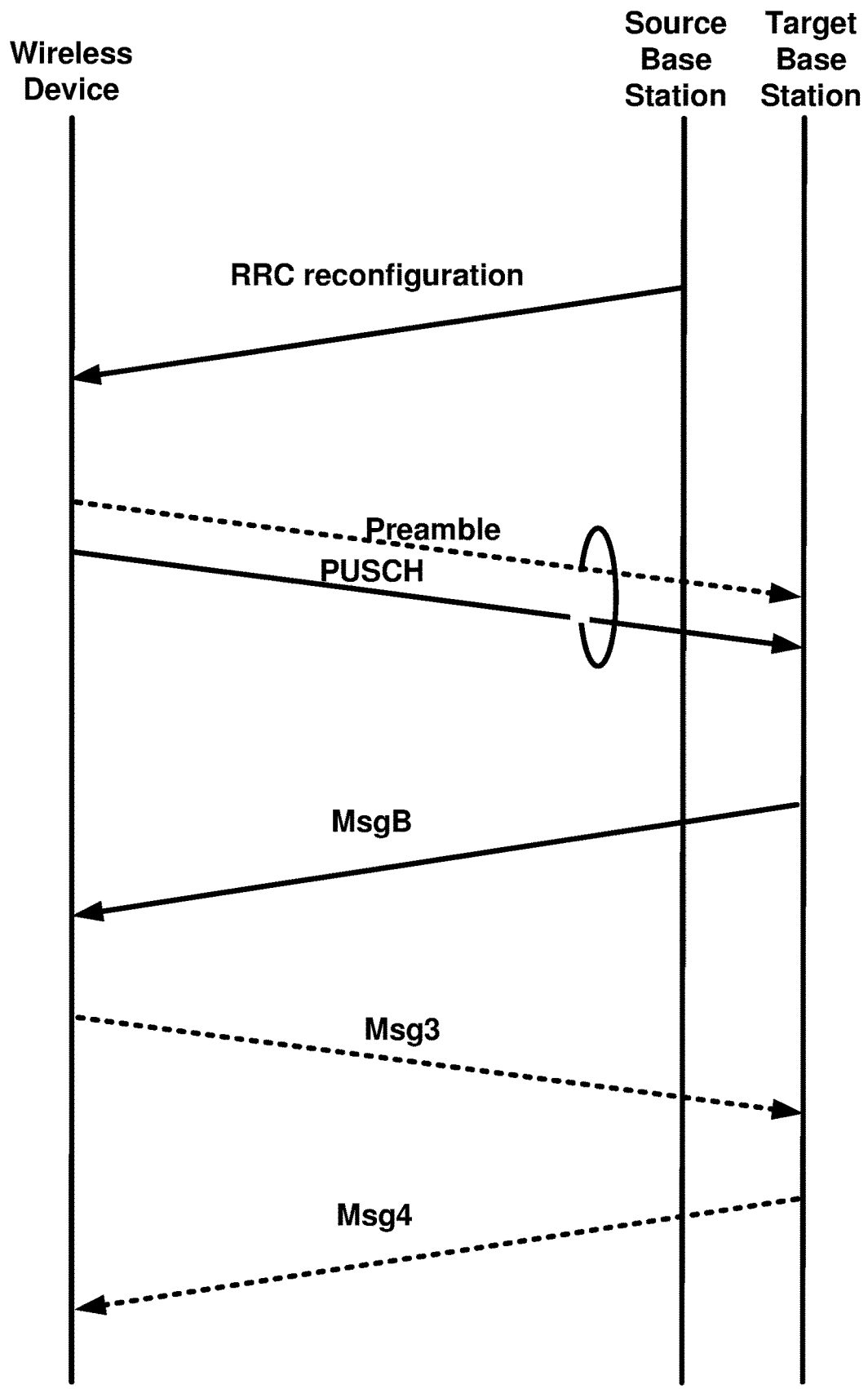
FIG. 22 is a diagram of example signaling for access procedure triggered by a handover as per an aspect of an embodiment of the present disclosure.

FIG. 22 shows the example signaling during a handover procedure. After receiving the RRC reconfiguration message, the wireless device may determine whether to transmit the preamble in MsgA with the PUSCH or not, for example, based on the RSRP of one or more configured SSBs. The wireless device may transmit the preamble and/or the PUSCH to the target base station. The target base station may transmit a MsgB to the wireless device in response to successful reception of MsgA. In case the PUSCH in MsgA is not successfully received at the target base station, MsgB may be identical to Msg2 (RAR). In that case, the wireless device may fall back to a 4-step RACH and transmit a Msg3 using the one or more UL grants and/or the TA in MsgB. The wireless device may transmit Msg3 using the pre-configured uplink channel resources (configured UL grants) indicated in the RRC reconfiguration message. In response to receiving the Msg3, the target base station may transmit a Msg4 (e.g., contention resolution) to the wireless device. The wireless device may determine based on the reception of MsgB/Msg4 addressed to the wireless device identifier that the handover is successfully completed.

Figure 23:
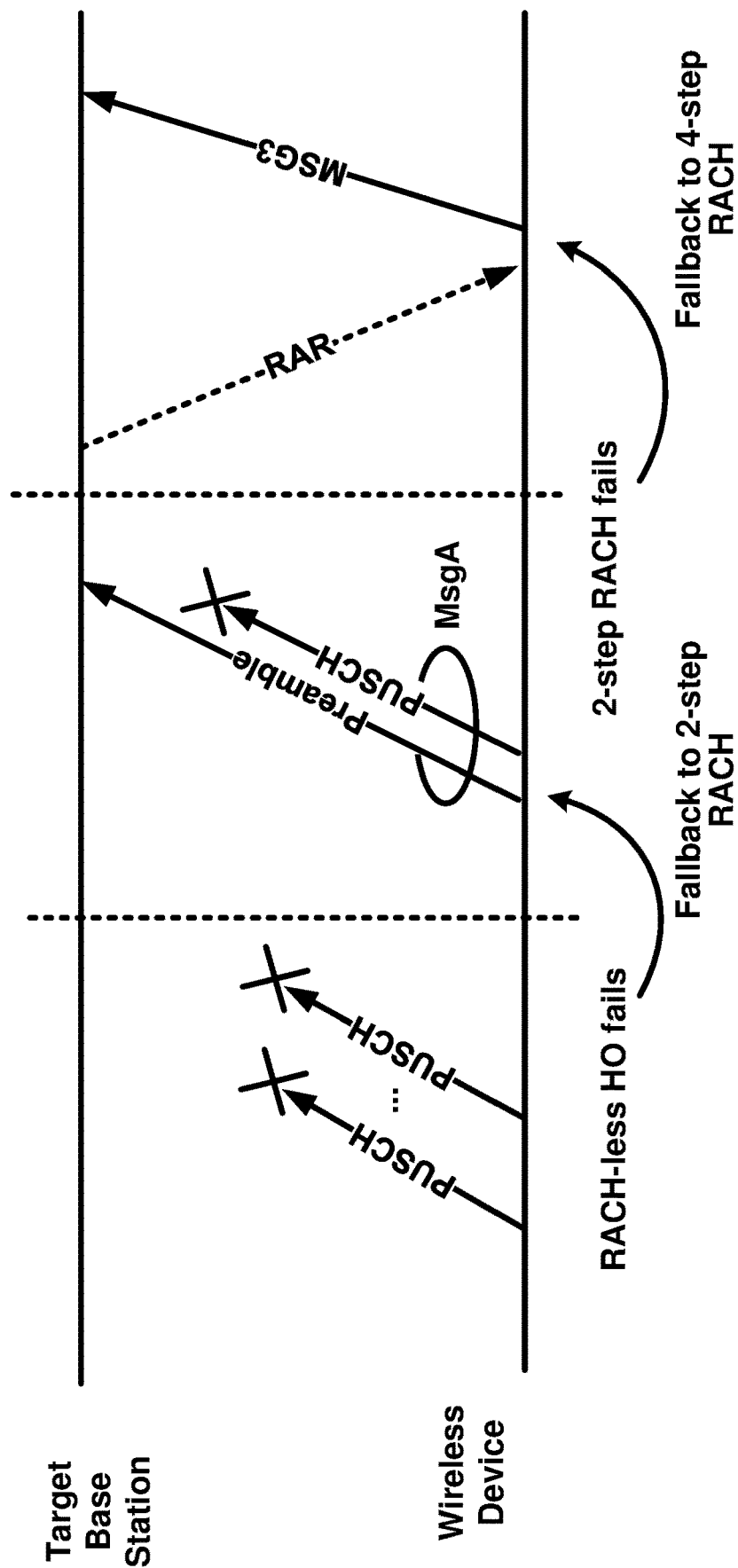
FIG. 23 is a diagram of example fallback procedure of one or more access procedures to the target base station during a handover procedure as per an aspect of an embodiment of the present disclosure.

FIG. 23 shows an example fallback procedure of one or more access procedures to the target base station during a handover procedure. As shown in the figure, the wireless device may initiate a RACH-less procedure for the handover procedure. The wireless device may transmit one or more PUSCH transmissions to the target base station. However, the RACH-less procedure may fail, for example, the one or more PUSCH transmissions may fail. The wireless device may fallback to a 2-step RACH procedure. For example, the wireless device may transmit a preamble with the PUSCH in a MsgA. The PUSCH transmission in MsgA may fail. Therefore, the wireless device may retransmit the PUSCH. The wireless device may fall back to a 4-step RACH, and may retransmit the PUSCH via an UL grant comprised in a received RAR message.

Figure 24:
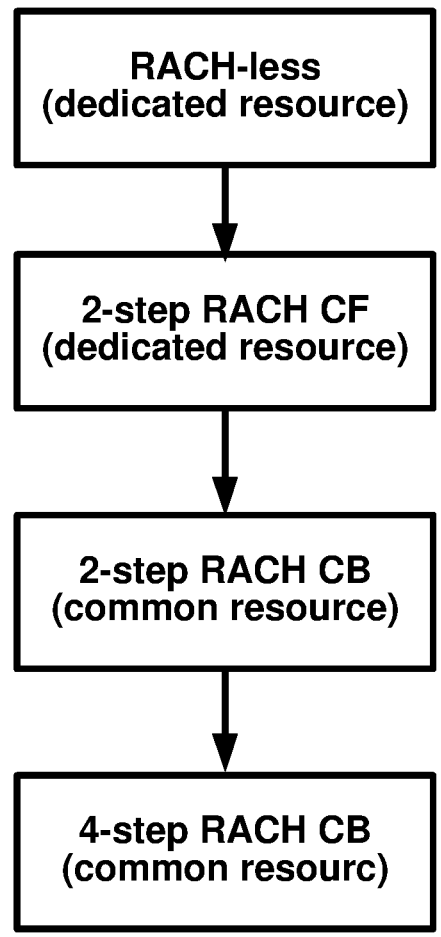
FIG. 24 is a diagram of example fallback and/or selection priority for one or more access procedures during a handover procedure as per an aspect of an embodiment of the present disclosure.

FIG. 24 shows an example fallback and/or selection priority for one or more access procedures, for example, during a handover procedure. For example, the wireless device may initiate a RACH-less procedure if the dedicated PUSCH (RACH-less) resources are configured and/or the RSRP of the configured downlink reference signal associated with the RACH-less resources is above a threshold. The wireless device may initiate a contention-free (CF) 2-step RACH procedure via dedicated 2-step RACH resources (PRACH and PUSCH and mapping of PRACH and PUSCH) if configured, and/or the RSRP of the configured downlink reference signals associated with the 2-step RACH resources is below the threshold, and/or the RACH-less procedure fails. The wireless device may initiate a contention-based (CB) 2-step RACH procedure via common 2-step RACH resources (PRACH and PUSCH and mapping of PRACH and PUSCH) if dedicated 2-step RACH resources are not configured, and/or the RSRPs of all of the configured downlink reference signals are below the threshold, and/or the RACH-less procedure fails. The wireless device may initiate a contention-based (CB) 4-step RACH procedure via common PRACH resources if 2-step RACH resources are not configured, and/or the RSRPs of all of the configured downlink reference signals are below the threshold, and/or the RACH-less procedure fails.

Figure 25A:
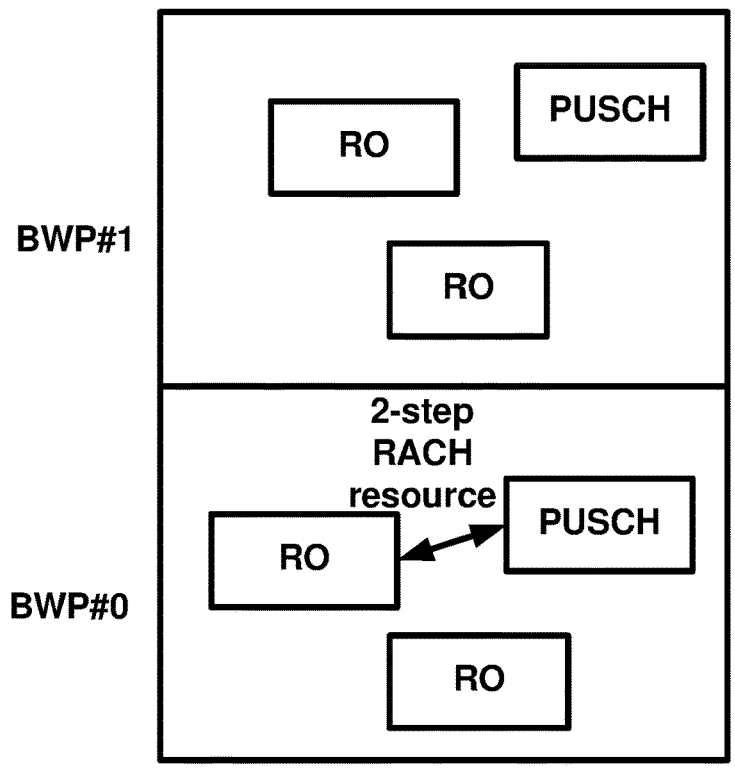
FIG. 25A and FIG. 25B are example diagrams of resource configuration for one or more access procedures as per an aspect of an embodiment of the present disclosure.
Figure 25B:
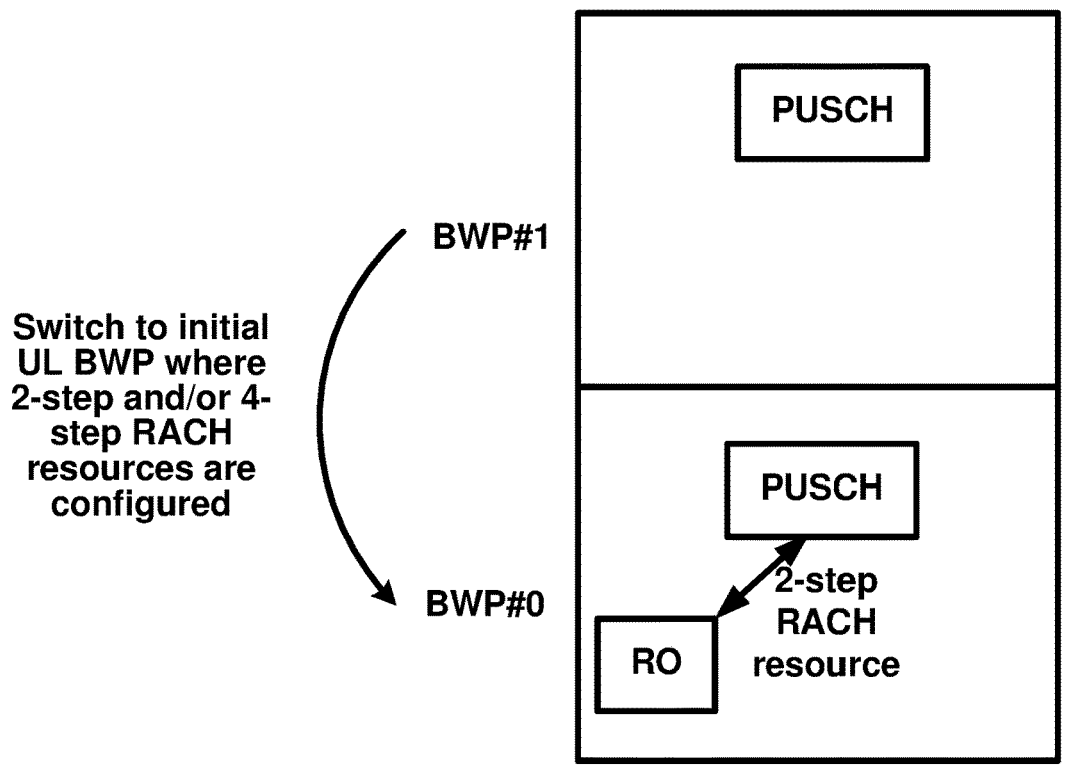

FIG. 25A shows example resource configuration for one or more access procedures comprising RACH-less procedure, and/or 2-step RACH procedure, and/or 4-step RACH procedure. As shown in the figure, PUSCH resources for RACH-less procedure may be configured for BWP #1. For example, 2-step RACH resources, comprising PRACH occasion (RO) and PUSCH occasion (PO) and a mapping between RO and PO, may be configured for BWP #0. PRACH occasions may be configured for BWP #0 and BWP #1. For example, BWP #1 may be configured by an RRC message as the (first) active uplink bandwidth part. For example, BWP #0 may be the initial uplink bandwidth part. As shown in FIG. 25B, the wireless device may switch the active UL BWP to BWP #0 (e.g., the initial UL BWP), for example, if the wireless device selects a RACH procedure and the 2-step RACH resources and/or 4-step RACH resources are not configured for the active UL BWP (e.g. BWP #1). The wireless device may initiate a 2-step RACH or a 4-step RACH on BWP #0.

FIG. 26A illustrates an embodiment of the present disclosure, where the wireless device is performing a handover to a target cell of the target base station. For example, two beams, B1 and B2, may be configured via dedicated signaling (RRC reconfiguration message) for the wireless device. For example, the RRC reconfiguration message may indicate the indices of SSBs associated with the B1 and B2 (e.g. SSB #1 and SSB #2). As shown in FIG. 26B, dedicated 2-step RACH resources associated with BI (SSB #1) and B2 (SSB #2) may be configured via dedicated signaling for the wireless device. For example, common 2-step RACH resources may be configured via broadcast information on a plurality of beams (e.g. B1 and/or B2 and/or B3 and/or B4). The wireless device may measure the RSRP of the reference signals (e.g. SSBs) associated with the configured beams and determine that at least one of them (e.g. B2) has an RSRP above a configured threshold as shown in FIG. 26C. The wireless device may select SSB #2 associated with B2 and a RACH-less procedure associated with that beam. For example, the wireless device may transmit one or more transport blocks via the PUSCH occasion (PO) of the dedicated 2-step RACH resources associated with SSB #2 (B2). FIG. 26B illustrates such RACH-less transmission.

However, the wireless device may move and/or rotate during a handover procedure, e.g. after receiving the RRC reconfiguration message (HO command). As shown in FIG. 27A, the wireless device may move out of the coverage area of the configured beams (B1 and B2). FIG. 27B shows the same 2-step RACH resource configuration as above. The wireless device may measure the RSRP of the reference signals (e.g. SSBs) associated with the configured beams and determine that none of them has an RSRP above the configured threshold as shown in FIG. 27C. The wireless device may select a downlink reference signal (e.g., SSB #4 associated with B4) and a RACH procedure associated with that beam. For example, the wireless device may transmit a preamble via the RO and/or one or more transport blocks via the PUSCH occasion (PO) of the 2-step RACH resources associated with SSB #4 (B4). In this case, as B4 and its associated resources were not configured via dedicated signaling and are common resources, the RACH procedure is contention-based (CBRA). FIG. 27B illustrates such RACH transmission.

As shown in FIG. 28A the wireless device may move out of the coverage area of the configured beams (B1 and B2), e.g., after receiving the RRC reconfiguration message. FIG. 28B shows an example with the same 2-step RACH resource and beam configuration as above. The wireless device may measure the RSRP of the reference signals (e.g. SSBs) associated with the configured beams and determine that none of them has an RSRP above the configured threshold as shown in FIG. 28C. The wireless device may select a downlink reference signal (e.g., SSB #2 associated with B2) and a RACH procedure associated with that beam. For example, the wireless device may transmit a preamble via the RO and/or one or more transport blocks via the PUSCH occasion (PO) of the 2-step RACH resources associated with SSB #2 (B2). In this case, as B2 and its associated resources were configured via dedicated signaling, the RACH procedure is contention-free (CFRA). FIG. 28B illustrates such RACH transmission.

Figure 29A:
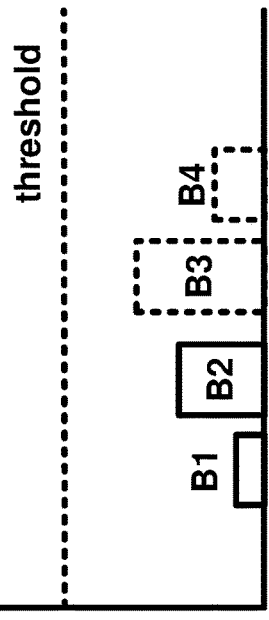
FIG. 29A, FIG. 29B, and FIG. 29C are example diagrams of an access procedure selection resulting in a 4-step RACH CBRA handover as per an aspect of an embodiment of the present disclosure.
Figure 29C:
Figure 29B:
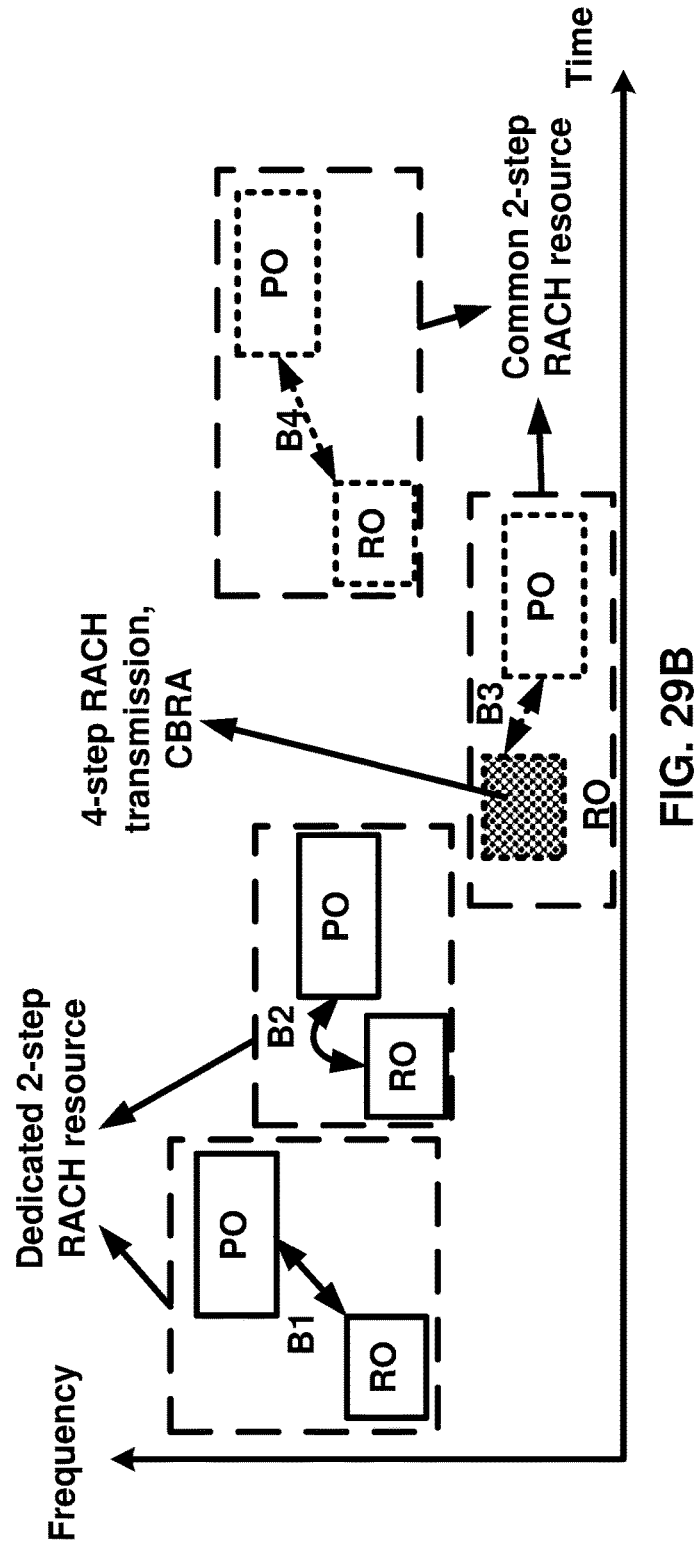

As shown in FIG. 29A the wireless device may move out of the coverage area of the configured beams (B1 and B2), e.g., after receiving the RRC reconfiguration message. FIG. 29B shows an example with the same 2-step RACH resource and beam configuration as above. The wireless device may measure the RSRP of the reference signals (e.g. SSBs) associated with the configured beams and determine that none of them has an RSRP above the configured threshold as shown in FIG. 29C. The wireless device may select a downlink reference signal (e.g., SSB #3 associated with B3) and a RACH procedure associated with that beam. For example, the wireless device may transmit a preamble via the RO of the 2-step RACH resources associated with SSB #3 (B3). In this case, as B3 and its associated resources were not configured via dedicated signaling and are common resources, the RACH procedure is contention-based (CBRA). FIG. 29B illustrates such RACH transmission.

Figure 30:
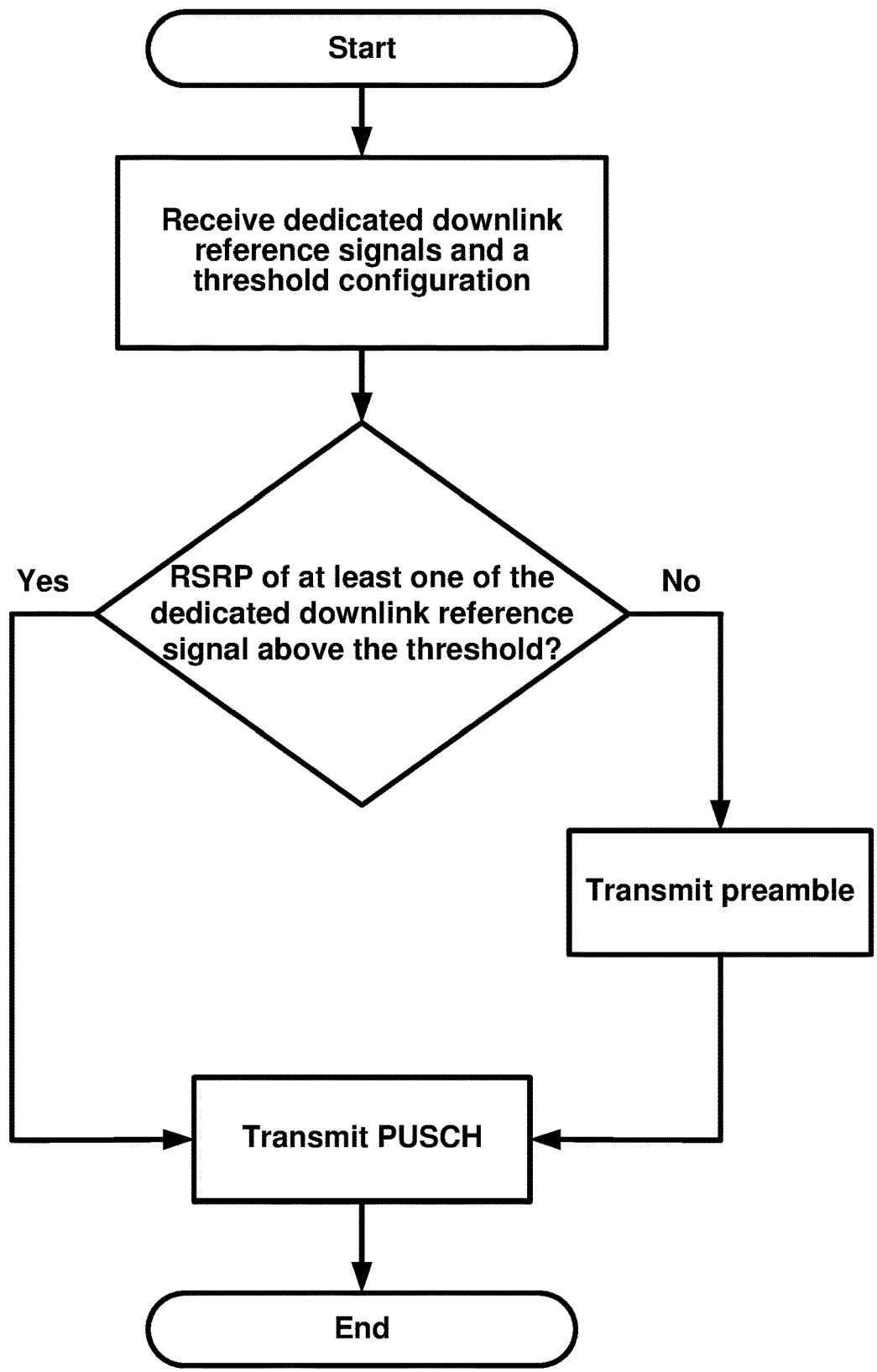
FIG. 30 is a flowchart of example access selection mechanism during a handover procedure as per an aspect of an embodiment of the present disclosure.

FIG. 30 shows a flowchart as per one or more embodiments of the present disclosure. As shown in FIG. 30, the wireless device may start by receiving from the source base station the RRC reconfiguration message indicating one or more downlink reference signals of the target base station and a threshold. For example, the wireless device may receive dedicated downlink reference signals (e.g., SSBs) configuration and a threshold configuration. The wireless device may determine whether the RSRP of at least one of the one or more downlink reference signals is above the threshold. The wireless device may select based on the determining an access procedure to perform the handover procedure to the target base station. For example, if the RSRP of at least one of the one or more downlink reference signals is above the threshold, the wireless device my select a RACH-skip (RACH-less) procedure and transmit one or more uplink transport blocks via a PUSCH resource (without PRACH) associated with the at least one downlink reference signal. But if the RSRP of none of the one or more downlink reference signals is above the threshold, the wireless device may select a RACH procedure and transmit a preamble and/or one or more uplink transport blocks via a PRACH and a corresponding PUSCH resource associated with one of a plurality of downlink reference signals comprising the one or more downlink reference signals.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 31:
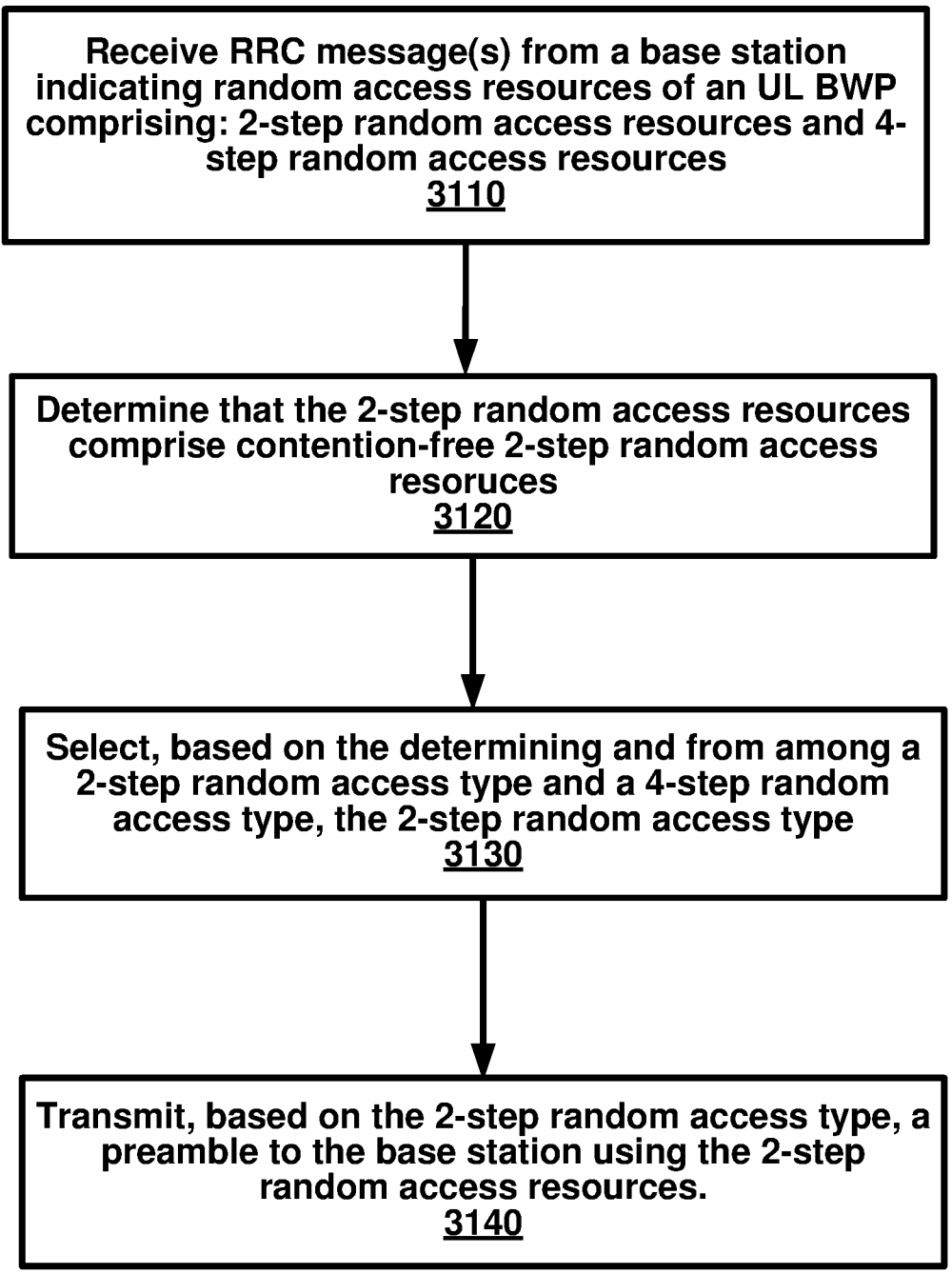
FIG. 31 is a flow diagram of an example embodiment for a wireless device to select a random access procedure type in a wireless system as per an aspect of the present disclosure.

FIG. 31 is a flow diagram of an example embodiment for a wireless device to select a random access procedure type in a wireless system as per an aspect of the present disclosure. As shown in FIG. 31, At 3110, the wireless device may receive one or more messages (e.g. RRC messages) from a base station. The one or more messages may indicate random access resources of an UL BWP of a cell. The random access resources may comprise 2-step random access resources and 4-step random access resources. The wireless device may initiate a random access procedure on the cell. The UL BWP may be an active UL BWP of the cell. At 3120, the wireless device may determine that the 2-step random access resources comprise contention-free 2-step random access resources. At 3130, the wireless device may select, based on the determining and from among a 2-step random access type and a 4-step random access type, the 2-step random access type. At 3140, the wireless device may transmit, based on the 2-step random access type, a preamble to the base station using the 2-step random resources. The one or more messages may further indicate a threshold for a received signal strength of at least one downlink reference signal. The wireless device may select the 2-step random access type further based on the received signal strength of the at least one downlink reference signal being below or equal to the threshold. The wireless device may further select a downlink reference signal at least based on the 2-step random access resources, wherein the preamble may be associated with the downlink reference signal. The 2-step random access resources may comprise at least one random access channel (RACH) occasion, corresponding to the downlink reference signal, for transmitting the preamble. The 2-step random access resources may comprise at least one uplink grant associated with the preamble and the at least one RACH occasion. The wireless device may transmit at least one transport block to the base station using the at least one uplink grant. The 2-step random access resources of the UL BWP may comprise contention-based 2-step random access resources. The one or more messages may further indicate a reconfiguration with synchronization for a handover if the wireless device to a second base station.

Figure 32:
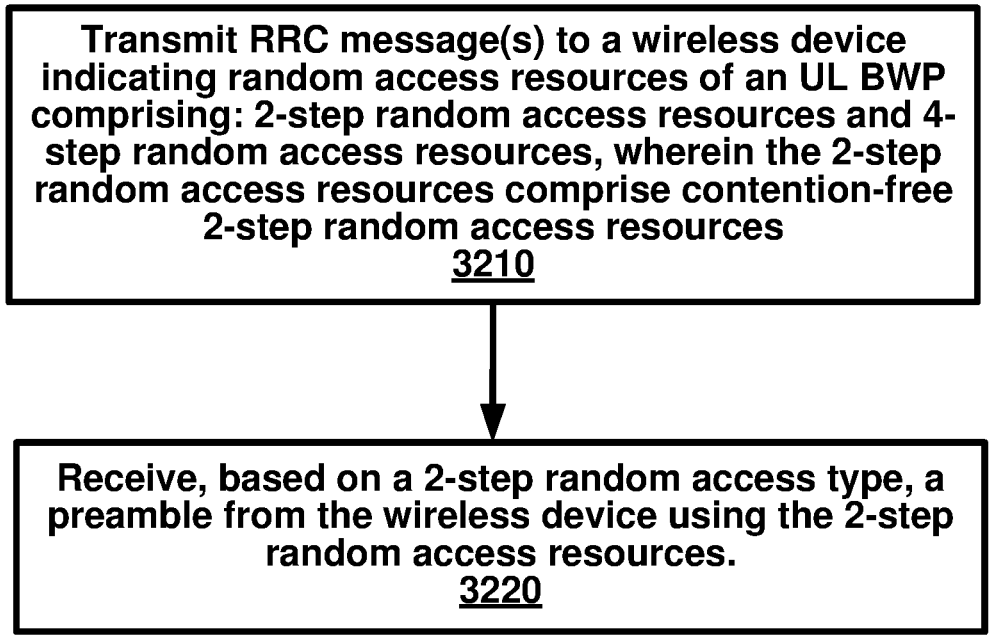
FIG. 32 is a flow diagram of an example embodiment for a base station regarding a wireless device selecting a random access procedure type in a wireless system as per an aspect of the present disclosure.

FIG. 32 is a flow diagram of an example embodiment for a base station regarding a wireless device selecting a random access procedure type in a wireless system as per an aspect of the present disclosure. At 3210, the base station may transmit one or more messages (e.g. RRC messages) to the wireless device indicating random access resources of an UL BWP of a cell. The random access resources may comprise 2-step random access resources and 4-step random access resources. The 2-step random access resources may comprise contention-free 2-step random access resources. At 3220, the base station may receive, based on a 2-step random access type, a preamble from the wireless device using the 2-step random access resources. The base station may further receive at least one transport block from the wireless device using the 2-step random access resources. The base station may receive the at least one transport block using one or more UL grants, wherein the one or more UL grants may be associated with the preamble.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, because those wireless devices or base stations perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

The invention claimed is:

1. A method comprising:
receiving, by a wireless device from a base station, one or more radio resource control (RRC) messages indicating random access resources, the random access resources comprising:
two-step random access resources, of a two-step random access type, of an uplink bandwidth part (UL BWP); and
four-step random access resources, of a four-step random access type, of the UL BWP;
determining, while the two-step random access type and the four-step random access type are available for transmitting a preamble, that the two-step random access resources comprise contention-free two-step random access resources;
selecting, based on the determining that the two-step random access resources comprise the contention-free two-step random access resources, the two-step random access type from among the two-step random access type and the four-step random access type; and
transmitting, based on the two-step random access type, the preamble using the contention-free two-step random access resources.

2. The method of claim 1, wherein the one or more RRC messages further indicate a threshold for a received signal strength of at least one downlink reference signal.

3. The method of claim 2, wherein the selecting is further based on the received signal strength of the at least one downlink reference signal being below or equal to the threshold.

4. The method of claim 1, wherein the UL BWP is an active UL BWP of a cell.

5. The method of claim 1, further comprising initiating a random access procedure on the UL BWP of a cell.

6. The method of claim 1, further comprising selecting a downlink reference signal at least based on the two-step random access resources, wherein the preamble is associated with the downlink reference signal.

7. The method of claim 6, wherein the two-step random access resources comprise:
at least one random access channel occasion, corresponding to the downlink reference signal, for the transmitting the preamble; and
at least one uplink grant associated with the preamble and the at least one random access channel occasion.

8. The method of claim 7, further comprising transmitting at least one transport block to the base station using the at least one uplink grant.

9. The method of claim 1, wherein the two-step random access resources of the UL BWP further comprise contention-based two-step random access resources.

10. The method of claim 1, wherein the one or more RRC messages further indicate a reconfiguration with synchronization for a handover of the wireless device.

11. A wireless device comprising one or more processors and memory storing instructions that, when executed by the one or more processors, cause the wireless device to:
receive, from a base station, one or more radio resource control (RRC) messages indicating random access resources, the random access resources comprising:
two-step random access resources, of a two-step random access type, of an uplink bandwidth part (UL BWP); and
four-step random access resources, of a four-step random access type, of the UL BWP;
determine, while the two-step random access type and the four-step random access type are available for transmitting a preamble, that the two-step random access resources comprise contention-free two-step random access resources;
select, based on the determining that the two-step random access resources comprise the contention-free two-step random access resources, the two-step random access type from among the two-step random access type and the four-step random access type; and
transmit, based on the two-step random access type, the preamble using the contention-free two-step random access resources.

12. The wireless device of claim 11, wherein the one or more RRC messages further indicate a threshold for a received signal strength of at least one downlink reference signal.

13. The wireless device of claim 12, wherein the instructions further cause the wireless device to select the two-step random access type based on the received signal strength of the at least one downlink reference signal being below or equal to the threshold.

14. The wireless device of claim 11, wherein the UL BWP is an active UL BWP of a cell.

15. The wireless device of claim 11, wherein the instructions further cause the wireless device to initiate a random access procedure on the UL BWP of a cell.

16. The wireless device of claim 11, wherein the instructions further cause the wireless device to select a downlink reference signal at least based on the two-step random access resources, wherein the preamble is associated with the downlink reference signal.

17. The wireless device of claim 16, wherein the two-step random access resources comprise:
at least one random access channel occasion, corresponding to the downlink reference signal, for transmitting the preamble; and
at least one uplink grant associated with the preamble and the at least one random access channel occasion.

18. The wireless device of claim 17, wherein the instructions further cause the wireless device to transmit at least one transport block to the base station using the at least one uplink grant.

19. The wireless device of claim 11, wherein the two-step random access resources of the UL BWP further comprise contention-based two-step random access resources.

20. A system comprising:
a base station comprising one or more first processors and first memory storing instructions that, when executed by the one or more first processors, cause the base station to:
transmit, to a wireless device, one or more radio resource control (RRC) messages indicating random access resources, the random access resources comprising:
two-step random access resources, of a two-step random access type, of an uplink bandwidth part (UL BWP), wherein the two-step random access resources comprise contention-free two-step random access resources; and
four-step random access resources, of a four-step random access type, of the UL BWP; and
receive a preamble using the two-step random access resources; and
the wireless device comprising one or more second processors and second memory storing instructions that, when executed by the one or more second processors, cause the wireless device to:

receive the one or more RRC messages;

determine, while the two-step random access type and the four-step random access type are available for transmitting a preamble, that the two-step random access resources comprise the contention-free two-step random access resources;

select, based on the determining that the two-step random access resources comprise the contention-free two-step random access resources, the two-step random access type from among the two-step random access type and the four-step random access type; and transmit, based on the two-step random access type, the preamble to the base station using the contention-free two-step random access resources.

\* \* \* \* \*